US012271583B2

(12) United States Patent
Tobias et al.

(10) Patent No.: US 12,271,583 B2
(45) Date of Patent: Apr. 8, 2025

(54) INTELLECTUAL-PROPERTY LANDSCAPING PLATFORM WITH INTERACTIVE GRAPHICAL ELEMENT

(71) Applicant: Moat Metrics, Inc., Spokane, WA (US)

(72) Inventors: Michael John Tobias, Spokane, WA (US); Samuel Cameron Fleming, Spokane, WA (US); Jared Dirk Sol, Spokane, WA (US); Louise Janice Luvina Bowman, Redmond, WA (US); Jeffrey Brendan Ryan, Liberty Lake, WA (US); Scott Randolph Brewer, Sleepy Hollow, IL (US); Lewis C. Lee, Seattle, WA (US)

(73) Assignee: Moat Metrics, Inc., Spokane, WA (US)

( * ) Notice: Subject to any disclaimer, the term of this patent is extended or adjusted under 35 U.S.C. 154(b) by 0 days.

(21) Appl. No.: 18/377,667

(22) Filed: Oct. 6, 2023

(65) Prior Publication Data
US 2024/0094887 A1 Mar. 21, 2024

Related U.S. Application Data

(63) Continuation of application No. 17/038,549, filed on Sep. 30, 2020, now Pat. No. 11,809,694.

(51) Int. Cl.
*G06F 3/04845* (2022.01)
*G06F 3/04847* (2022.01)
(Continued)

(52) U.S. Cl.
CPC ...... *G06F 3/04845* (2013.01); *G06F 3/04847* (2013.01); *G06F 9/451* (2018.02);
(Continued)

(58) Field of Classification Search
CPC .. G06F 3/04845; G06F 3/04847; G06F 9/451; G06F 16/285; G06F 2203/04806;
(Continued)

(56) References Cited

U.S. PATENT DOCUMENTS 8,027,900 B1    9/2011  Chaffee
10,242,066 B2   3/2019  Lundberg
(Continued)

OTHER PUBLICATIONS

Shanie et al., "Text Grouping in Patent Analysis using Adaptive K-Means clustering algorithm", AIP Conference Proceedings, published 2017, retrieved from <<https://pubs.aip.org/aip/acp/article-pdf/doi10.1063/1.4979457/13739031/020041_1_online.pdf>>.
(Continued)

*Primary Examiner* — Rami R Okasha
(74) *Attorney, Agent, or Firm* — Lee & Hayes, P.C.

(57) ABSTRACT

Systems and methods for generation and use of intellectual-property (IP) landscaping platform architectures are disclosed. A landscaping component may be utilized to produce refined clusters of IP assets using user seeded searches in varying areas of interest, such as, for example, target technical fields, targeted publications, targeted products, and/or competitor entity portfolios. The landscaping component may be further utilized to produce an interactive graphical element including a spatial representation of the clusters of IP assets. The interactive graphical element may include various functionalities and/or information associated with the clusters of IP assets. An exposure assessment component may be utilized to assess the level of exposure associated with a targeted entity by analyzing a mapping between IP assets and allocated funds of the targeted entity, generate a score representing the level of exposure, make determinations as to insurance offerings and/or alter rates associated with the insurance offerings.

13 Claims, 22 Drawing Sheets

(51) Int. Cl.

| | | |
|---|---|---|
| *G06F 9/451* | (2018.01) | |
| *G06F 16/28* | (2019.01) | |
| *G06Q 10/10* | (2023.01) | |
| *G06Q 50/18* | (2012.01) | |
| *G06T 11/20* | (2006.01) | |

(52) U.S. Cl.
CPC ........... *G06F 16/285* (2019.01); *G06Q 10/10* (2013.01); *G06Q 50/184* (2013.01); *G06T 11/206* (2013.01); *G06F 2203/04806* (2013.01); *G06T 2200/24* (2013.01)

(58) Field of Classification Search
CPC ....... G06F 16/26; G06F 16/287; G06Q 10/10; G06Q 50/184; G06T 11/206; G06T 2200/24
See application file for complete search history.

(56) References Cited

U.S. PATENT DOCUMENTS

| | | | |
|---|---|---|---|
| 10,438,167 B2 | 10/2019 | Summerfield | |
| 10,579,662 B2 | 3/2020 | Lundberg | |
| 10,803,073 B2 | 10/2020 | Lundberg | |
| 10,984,476 B2 | 4/2021 | Ouderkirk | |
| 11,354,344 B2 | 6/2022 | Lundberg | |
| 11,360,988 B2 | 6/2022 | Lundberg | |
| 11,392,651 B1 * | 7/2022 | McClusky | G06F 16/906 |
| 2003/0036945 A1 | 2/2003 | Del Vecchio | |
| 2003/0172020 A1 | 9/2003 | Davies | |
| 2003/0191654 A1 | 10/2003 | Panchal | |
| 2006/0248055 A1 | 11/2006 | Haslam | |
| 2008/0021750 A1 | 1/2008 | Masuyama | |
| 2008/0154848 A1 | 6/2008 | Haslam | |
| 2008/0195678 A1 * | 8/2008 | Chen | G06Q 30/02 |
| 2010/0191564 A1 * | 7/2010 | Lee | G06Q 10/1091 |
| | | | 705/310 |
| 2013/0132288 A1 | 5/2013 | Ng | |
| 2013/0282735 A1 | 10/2013 | Pedersen | |
| 2015/0331585 A1 | 11/2015 | Stading | |
| 2016/0048516 A1 | 2/2016 | Guiliano | |
| 2016/0148327 A1 | 5/2016 | Buchholz | |
| 2016/0350294 A1 * | 12/2016 | Nefedov | G06F 16/367 |
| 2019/0066219 A1 | 2/2019 | Ouderkirk | |
| 2020/0142916 A1 * | 5/2020 | Yishay | G06F 16/353 |
| 2020/0175626 A1 | 6/2020 | Bharti | |
| 2020/0210509 A1 * | 7/2020 | Lowe | G06F 16/93 |
| 2020/0233872 A1 * | 7/2020 | Vergo | G06Q 10/06393 |

OTHER PUBLICATIONS

Office Action for U.S. Appl. No. 17/038,477, mailed on Jan. 11, 2024, Tobias, "Intellectual-Property Landscaping Platform", 47 Pages.

Andrew R.O. Watson etc., "Intellectual Property Clustering", published in Jan. 2010, retrieved Feb. 21, 2024, at <<https://www.autm.net/AUTMMain/media/ThirdEditionPDFsN4/TTPV4_IP_Clustering.pdf>>, 2010, 20 pages.

Rob Srebrovic, "Expanding your patent set with ML and BigQuery", published on Aug. 30, 2019, retrieved Feb. 21, 2024, at <<https://cloud.google.com/blog/products/data-analytics/expanding-your-patent-set-with-ml-and-bigquery,>>, 2019, 14 pgs.

Office Action for U.S. Appl. No. 17/038,411, mailed on Oct. 24, 2023, Ryan, "Intellectual-Property Landscaping Platform", 49 Pages.

Office Action for U.S. Appl. No. 17/038,616, mailed on Oct. 19, 2023, Lee, "Intellectual-Property Landscaping Platform", 18 pages.

* cited by examiner

INTELLECTUAL-PROPERTY LANDSCAPING PLATFORM WITH INTERACTIVE GRAPHICAL ELEMENT

CROSS-REFERENCE TO RELATED APPLICATIONS

This application is a continuation of and claims the benefit of prior U.S. patent application Ser. No. 17/038,549, filed Sep. 30, 2020, all of which are hereby incorporated by reference.

BACKGROUND

Analyzing an intellectual-property portfolio of a particular entity with respect to one or more entities having a similar intellectual-property portfolio may provide various insights and can be valuable. However, determining that separate entities have similar intellectual-property portfolios, particularly with entities having large portfolios, is difficult. Disclosed herein are improvements in technology and solutions to technical problems that can be used to, among other things, analyze and generate visual representations of intellectual-property portfolios of various entities.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
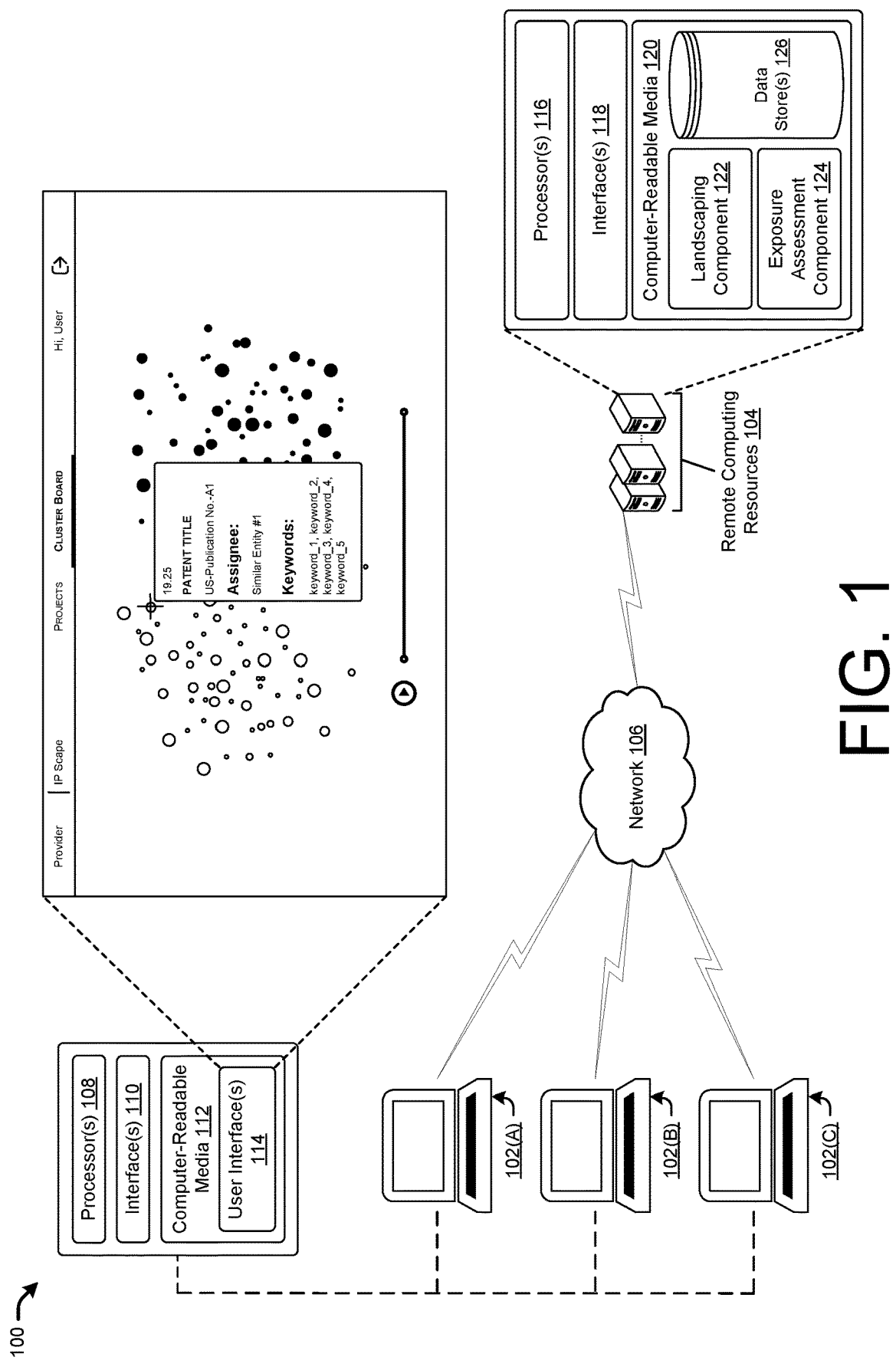
FIG. 1 illustrates a schematic diagram of an example environment for an intellectual-property landscaping platform architecture.

Systems and methods for generation and use of an intellectual-property landscaping platform are disclosed. Take, for example, an entity that would find it beneficial to utilize a platform to analyze a corpus of intellectual-property (IP) assets in an efficient manner by targeting technical fields, subject matters, and/or competitor entities and to determine an overall saturation and/or identify gaps in coverage associated with the IP assets included in the targeted technical fields, subject matters, and/or competitor entities portfolios. For example, an entity may desire to know how densely populated the IP assets associated with a technical field are for patentability determinations, for infringement determinations, for asset acquisition purposes, for research and development purposes, for insurance purposes, etc. Generally, a user may search a database of such documents using keyword searching, such as, for example, a technical term, a target product, or an identifier of a target entity. To gather a reasonable number of results that does not unduly limit the documents in those results, users may employ broad keyword searching and then review each document to determine whether each document should be considered in class or out of class for the purposes at hand. However, taking patents and patent applications as an example, the potential corpus of documents, even if looking just to patents and patent applications filed in the United States, easily numbers in the thousands if not tens of thousands or more. Additionally, grouping the patents into groupings based on one or more shared technical fields, subject matters, and/or by similar entities may become cumbersome, especially when dealing with a large corpus. In light of this, an IP landscaping platform that is configured to identify IP assets that may be determined to be similar to the IP portfolio of one or more target entities, one or more target publications, and/or one or more target products and/or services and generate multiple result sets of varying levels of granularity and having the intellectual-property assets clustered based on the technical aspects of the IP assets would be beneficial. Additionally, an interactive graphical element including a spatial representation of the clusters of the IP assets may be desirable to accurately and efficiently visualize a landscape of the clusters of IP assets.

Described herein is an IP landscaping platform that is configured to produce refined clusters of IP assets using user seeded searches in varying areas of interest, such as, for example, target technical fields, targeted publications, targeted products, and/or competitor entity portfolios. The platform may include a landscaping component, an exposure assessment component, and a data store. In some examples, the landscaping component may include various sub-components, such as, a seeding component, a user interface generation component, and/or a clustering component. Additionally, or alternatively, the seeding component may include various sub-components, such as, a similarity component, a vector component, and/or a ranking component. Generally, the landscaping component may utilize any number of its components to seed user driven IP searches, identify entities having similar IP portfolios, cluster IP assets with varying levels of granularity, and generate a spatial representation of the clusters of IP assets. The exposure assessment component may be utilized to assess the level of exposure associated with a targeted entity by analyzing a mapping between IP assets and allocated funds of the targeted entity, generate a score representing the level of exposure, make determinations as to insurance offerings and/or alter rates associated with the insurance offerings. The datastore may be a secure datastore accessible by the system and utilized to securely store user account data including a project library, an IP asset library including one or more IP assets, and/or historical data. The IP landscaping platform may be accessible to users via one or more user interfaces that may be configured to display information associated with project(s) associated with a user account of the user and/or one or more user account(s) associated with user account. Additionally, or alternatively, the user interface(s) may be configured to receive user input.

The IP landscaping platform may be configured to display a user interface for presenting information associated with the project(s) associated with the user account. For example, the user interface may include selectable portions that when selected, may present information associated with the landscaping component and or information associated with the exposure assessment component. Additionally, or alternatively, the IP landscaping platform may be configured to cause the user interface to present information associated with the landscaping component and/or information associated with the exposure assessment component using different views. Additionally, or alternatively, the user interface(s) may include one or more information windows for presenting information associated with the project(s) associated with the user account.

When a user accesses the IP landscaping platform using a user account, the user interface may be caused to display one or more pages that present portions of the information associated with the landscaping component and/or exposure assessment component using information windows that are relevant to that page. Pages that may be accessed by a user account may include for example, a projects listing page, a selected project page, a selected search page, a similar publication page, a similar entity page, a clustering results page, and/or a cluster board page. As mentioned above, each page presents information using information windows that are relevant to the that page.

When a user account accesses the projects listing page, the user interface may be caused to display an information window associated with the projects listing page and/or one or more actionable elements. For example, the user interface may be caused to display a projects listing window, an add project element, and/or a projects filter element. The projects listing window may include one or more listings of projects associated with the user account corresponding to a selection of the projects filter element.

In some examples, the projects listing window may include a listing of projects associated with a client account. For example, the projects listing window may include projects created by the user account, projects created by additional user accounts that are associated with the user account (i.e., user accounts associated with a similar entity), and/or pinned projects (i.e., projects that the user account has saved). In some examples, the listing of the projects may be presented using individual cells for each project. In some examples, each cell may include an indication of the name of the project, a description of the project, an indication of the user account that created the project, an indication of the date the project was created, and one or more actionable elements associated with the project. In some examples, the add project element may be configured such that, when selected, the user interface presents a window configured to receive user input required to create a new project. In some examples, the one or more actionable elements may include a pin project element, a copy project element, an edit project element, and/or a delete project element. Additionally, or alternatively, each cell may be actionable such that when the project is selected, the user interface may be caused to display a selected project page corresponding to the project that is selected.

When a user account accesses a selected project page, the user interface may be caused to display information windows associated with the project that was selected on the projects listing page. For example, the user interface may be caused to display a project information window and/or one or more view selection elements. The information window may present information associated with the selected project corresponding to the view specified by the selected view selection element.

In some examples, the project information window may include a number of views that may be presented in response to selection of a corresponding view selection element. For example, the project information window may include a search view, a similarities view, and/or a clusters view. In some examples, the one or more view selection elements may include a searches view element, a similarities view element, and/or a clusters view element. The one or more view selection elements may be configured such that, when selected, the project information window may present the view corresponding to the selected view selection element.

When a user account selects the searches view element, the user interface may be caused to display the searches view of the project information window. In some examples, the searches view of the project information window may include a listing of the searches associated with the project and/or a build new search element. The listing of the searches may be presented using individual cells for each search. In some examples, each cell may include an indication of a name of the search, a description of the search, an indication of the user account that created the search, and indication of when the search was created, and/or one or more actionable elements associated with the search. In some examples, the one or more actionable elements may include a copy search element, an edit search element, and/or a delete search element. In some examples, the build new search element may be configured such that, when selected, the user interface presents a window configured to receive user input required to build a new search. Additionally, or alternatively, each cell may be actionable such that when a search is selected, the user interface may be caused to display a search page corresponding to the search that is selected.

When a user account selects the similarities view element, the user interface may be caused to display the similarities view of the project information window. In some examples, the similarities view of the project information window may include a listing of the similarities associated with the project. The listing of the similarities may be presented using individual cells for each similarity. In some examples, each cell may include an indication of a name of the similarity, an indication of the type of the similarity (i.e., patent or assignee), a description of the similarity, an indication of the user account that created the similarity, an indication of the date the similarity was created, and/or a status indicator associated with the similarity. In some examples, the status indicator may provide an indication as to the status of the generation of the similarity, such as, for example, pending, completed, and/or failed. Additionally, or alternatively, each cell may be actionable such that when a similarity is selected, the user interface may be caused to display a publication similarity page corresponding to the publication similarity that is selected and/or the user interface may be caused to display an entity similarity page corresponding to the entity similarity that is selected.

When a user account selects the clusters view element, the user interface may be caused to display the clusters view of the project information window. In some examples, the clusters view of the project information window may include a listing of the clusters that are associated with the project. The listing of the clusters may be presented using individual cells for each cluster. In some examples, each cell may include an indication of a name of the cluster, a description of the cluster, an indication of the user account that created the cluster, an indication of the date the cluster was created, and/or a status indicator associated with the cluster. In some examples, the status indicator may provide an indication as to the status of the generation of the cluster, such as, for example, pending, completed, and/or failed. Additionally, or alternatively, each cell may be actionable such that when the cluster is selected, the user interface may be caused to display a cluster page corresponding to the cluster that is selected.

When a user account accesses the search page, the user interface may be caused to display information windows associated with the search page. For example, the user interface may be caused to display at least one search information window and/or one or more view selection elements. The search information window(s) may present information associated with the selected search corresponding to the view specified by the selected view selection element.

In some examples, the search information window(s) may include a number of views that may be presented in response to selection of a corresponding view selection element. For example, the search information window(s) may include an entity view and/or a publication view. In some examples, the one or more view selection elements may include an entity view element and/or a publication view element. The one or more view selection elements may be configured such that, when selected, the search information window(s) may present the view corresponding to the selected view selection element.

When a user account selects the entity view element, the user interface may be caused to display the entity view of the search information windows. In some examples, the entity view of the search information windows may include an entity search window, a selected entities window, a save element, and/or an actions element. In some examples, the entity search window may include a listing of similar entities and/or a search element. The listing of similar entities may be presented using individual cells for each similar entity. In some examples, each cell may include an indication of a name of the similar entity, an indication of the number of IP assets associated with the similar entity, and/or a select element. In some examples, the select element may be configured such that, when selected, the similar entity is removed from the entity search window and is added to the selected entities window. In some examples, the selected entities window may include a listing of selected entities and/or an indication of a total number of IP assets associated with the selected entities. The listing of selected entities may be presented using individual cells for each selected entity. In some examples, each cell may include an indication of a name of the selected entity, an indication of the number of IP assets associated with the selected entity, and/or a remove element. In some examples, the remove element may be configured such that, when selected, the selected entity is removed from the listing of selected entities and is added to the listing of similar entities in the entity search window. In some examples, the save element may be configured such that, when selected, the listing of selected entities is saved in association with the user account. In some examples, the actions element may be associated with one or more sub-elements. For example, the actions element may include a find similar assignees sub-element, a cluster patents sub-element, an export selected entity patents sub-element, and/or an export litigation for patents sub-element. In some examples, the find similar assignees sub-element may be configured such that, when selected, the user interface is caused to present the similar entity page. Additionally, or alternatively, the cluster patents sub-element may be configured such that, when selected, the user interface is caused to present the clustering results page. Additionally, or alternatively, the export selected entity patents sub-element may be configured such that, when selected, a file may be optionally downloaded by the user representing a listing of the IP assets associated with the selected entities and information associated with the one or more selected entities. Additionally, or alternatively, the export litigation for patents sub-element may be configured such that, when selected, a file may be optionally downloaded by the user representing litigation information associated with the IP assets associated with the selected entities.

When a user account selects the publication view element, the user interface may be caused to display the publication view of the search information window. In some examples, the publication view of the search information window may include a publication search window, a save element, and/or an actions element. In some examples, the publication search window may include a search element and/or an indication of a number of the saved publication numbers associated with the search element. In some examples, the search element may be configured to receive user input representing any number of publication numbers from 1-N, where N is any integer larger than 1. In some examples, the save element may be configured such that, when selected, the publication numbers entered into the search element are saved in association with the user account. In some examples, the actions element may be associated with one or more sub-elements. For example, the actions element may include a find similar publications sub-element, a cluster patents sub-element, an export patents sub-element, an export litigation for patents sub-element, and/or an export Patent Trial and Appeal Board (PTAB) for patents sub-element. In some examples, the find similar publications sub-element may be configured such that, when selected, the user interface is caused to present the similar publication page. Additionally, or alternatively, the cluster patents sub-element may be configured such that, when selected, the user interface is caused to present the clustering results page. Additionally, or alternatively, the export patents sub-element may be configured such that, when selected, a file may be optionally downloaded by the user representing a listing of the IP assets associated with the publication numbers saved in the search element. Additionally, or alternatively, the export litigation for patents sub-element may be configured such that, when selected, a file may be optionally downloaded by the user representing litigation information associated with the IP assets that are determined to be similar to the saved publication numbers included in the search element. Additionally, or alternatively, the export PTAB for patents sub-element may be configured such that, when selected, a file may be optionally downloaded by the user representing PTAB record information associated with the IP assets that are determined to be similar to the saved publication numbers included in the search element.

When a user account accesses the similar publication page, the user interface may be caused to display an information window presenting data associated with the similarity that was selected on the similarities page and/or presenting results from the actions element that was selected on the publication search view of the search page. For example, the user interface may be caused to display a similar publications window, an actions element, and/or one or more actionable elements.

In some examples, the similar publications window may include a listing of similar publications. The listing of similar publications may be presented using individual cells for each similar publication. In some examples, each cell may include an indication of a title of the similar publication, a publication number associated with the similar publication, an indication of an entity and/or assignee associated with the similar publication, a priority date associated with the similar publication, an indication of litigation matters associated with the similar publication, a proprietary score associated with the similar publication, and/or a selection indicator. In some examples, the actions element may include a cluster patents sub-element, an export patents sub-element, and/or an export litigation for patents sub-element. In some examples, the cluster patents sub-element may be configured such that, when selected, the user interface is caused to present the clustering results page. Additionally, or alternatively, the export patents sub-element may be configured such that, when selected, a file may be optionally downloaded by the user representing a listing of the similar publications. Additionally, or alternatively, the export litigation for patents sub-element may be configured such that, when selected, a file may be optionally downloaded by the user representing litigation information associated with the similar publications. In some examples, the one or more actionable elements may include a filter element, a sort element, and a column sort element. In some examples, the filter element may be configured to filter the listing of similar publications. Additionally, or alternatively, the sort element may be configured to sort the listing of similar publications based upon various user selected criteria. Additionally, or alternatively, the column sort element may be configured to sort the listing of similar publications based upon a column associated with the cells.

When a user account accesses the similar entity page, the user interface may be caused to display information windows presenting data associated with the similarity that was selected on the similarities page and/or presenting results from the actions element that was selected on the entity search view of the search page. For example, the user interface may be caused to display a targeted entities window, a similar entities window, and/or one or more actionable elements.

In some examples, the targeted entities window may include a listing of the targeted entities, an indication of a total number of IP assets associated with the targeted entities, and/or an edit target entities selection element. The listing of targeted entities may be presented using individual cells for each targeted entity. In some examples, each cell may include an indication of an identification of the targeted entity and/or an indication of a number of IP assets that are associated with the targeted entity. In some examples, the edit targeted entities selection may be configured such that, when selected, the user interface may be caused to present the entity view of the search page. In some examples, the similar entities window may include a listing of similar entities, a filter element, and/or an actions element. The listing of similar entities may be presented using individual cells for each similar entity. In some examples, each cell may include an indication of a ranking of the similar entity with respect to the other similar entities, an indication of an identification of the similar entity, a number of IP assets associated with the similar entity, and/or a proprietary score associated with the similar entity. In some examples, the filter element may be configured to receive a user input and filter the listing of the similar entities corresponding to text string input into the filter element. In some examples, the actions element may include a cluster patents sub-element, an export entities sub-element, an export top 50 k patents sub-element, and/or an export litigation for selected similar entities sub-element. In some examples, the cluster patents sub-element may be configured such that, when selected, the user interface is caused to present the clustering results page. Additionally, or alternatively, the export entities sub-element may be configured such that, when selected, a file may be optionally downloaded by the user representing the listing of the similar entities. Additionally, or alternatively, the export top 50 k patents sub-element may be configured such that, when selected, a file may be optionally downloaded by the user representing a listing of 50,000 IP assets associated with the top ranked similar entities. Additionally, or alternatively, the export litigation for selected similar entities sub-element may be configured such that, when selected, a file may be optionally downloaded by the user representing litigation information associated with the IP assets of the selected similar entities. In some examples, the one or more actionable elements may include a back to assignee selection element that may be configured such that, when selected, causes the user interface to present the entity view of the search page.

When a user account accesses the clustering results page, the user interface may be caused to display information windows presenting data associated with the cluster that was selected on the clusters page, and/or presenting results from the actions element that was selected on the entity search view of the search page, the actions element that was selected on the similar entity page, and/or the actions element that was selected on the similar publication page. For example, the user interface may be caused to display a targeted entities window and/or a clustering results window.

In some examples, the targeted entities window may include a listing of the targeted entities, an indication of a total number of IP assets associated with the targeted entities, and/or an edit target entities selection element. The listing of targeted entities may be presented using individual cells for each targeted entity. In some examples, each cell may include an indication of an identification of the targeted entity and/or an indication of a number of IP assets that are associated with the targeted entity. In some examples, the edit targeted entities selection may be configured such that, when selected, the user interface may be caused to present the entity view of the search page. In some examples, the clustering results window may include information associated with the selected result set, one or more cluster sub-windows, a result set selector, and/or an actions element. In some examples, the information associated with the selected result set may include an indication of the selected result set, an indication of the number of clusters associated with the selected result set, and/or an indication of a total number of IP assets associated with the clusters included in the selected result set. In some examples, each of the cluster sub-windows may include an indication of the cluster number, a total number of IP assets associated with the cluster, one or more keywords associated with the clusters, and/or a name cluster field configured to receive a user input to specify a name of the cluster. In some examples, the result set selector may include an indication of the currently selected result set, and/or a listing of all of the result sets and an indication of the number of clusters included in each respective result set. In some examples, the actions element may include a cluster board sub-element, an export to Comma Separated Values (CSV) file element, and/or an export litigation for patents sub-element. In some examples, the cluster board sub-element may be configured such that, when selected, the user interface may be caused to present the cluster board page. Additionally, or alternatively, the export to CSV file element may be configured such that, when selected, a file may be optionally downloaded by the user including a representation of the clusters in a .CSV file format. Additionally, or alternatively, the export litigation for patents sub-element may be configured such that, when selected, a file may be optionally downloaded by the user representing litigation information associated with the IP assets included in the clusters of the selected result set.

When a user account accesses the cluster board page, the user interface may be caused to display information presenting data associated with clusters included in a selected result set on the clustering results page. For example, the user interface may be caused to display an interactive graphical element and/or one or more information overlay windows.

In some examples, the interactive graphical element may include a spatial representation of the clusters. In some examples, the spatial representation may include a background represented by white space, graphical indicators associated with respective IP assets included in the clusters, keyword sets associated with respective clusters included in the result set, a slider filter control, and/or an animation sequence element. In some examples, the graphical indicators may be represented as dots having a size corresponding to the relevance of the associated IP asset with respect to the other IP assets included in the cluster. Additionally, or alternatively, the graphical indicators may be represented as dots having a size corresponding to a breadth score, indicating a claim strength and/or breadth of the claims included in the associated IP asset with respect to the other IP assets included in the cluster. Additionally, or alternatively, the graphical indicators may be color coded, such that IP assets that are included in a cluster of the selected result set may be represented by a graphical indicator having a color associated with the cluster. In some examples, graphical indicators belonging to separate clusters in a result set may have different colors that correspond to the respective cluster to which they belong. In some examples, the keyword sets may include one or more keywords associated with a respective cluster and may be presented at a central location of the cluster. Additionally, or alternatively, the keyword set may be represented in a color corresponding to the associated cluster. Additionally, or alternatively, the interactive graphical element may be configured to be manipulated by various user inputs, such as, for example, a zoom action configured to enlarge or shrink the view of the interactive graphical element to a desired location of the spatial representation and/or a click and drag action configured to focus the view of the interactive graphical element to a desired location of the spatial representation. In some examples, the slider filter control may be configured to receive user input representing a lower bound and/or an upper bound associated with a priority date and/or proprietary score associated with the IP assets included in the clusters of the selected result set. In some examples, the animation sequence element may be configured such that, when selected, the interactive graphical element may be caused to display an animated view of the spatial representation of the clusters. For example, the animated view may be configured as a time lapse animation, such that, the graphical elements included in the spatial representation may appear and/or disappear according to the range specified by the lower bound and the upper bound of the slider filter control.

In some examples, the one or more information overlay windows may include a filter overlay window, an IP asset overlay window, a cluster overlay window, and/or a quick information window. In some examples, the filter overlay window may include a search element configured to allow a user to search for an IP asset and/or a cluster, an indication of a number of IP assets included in the clusters, an indication of the IP assets visible on the current view of the spatial representation (e.g., the graphical elements in view), an indication of a number of IP assets that are included in the clusters but not presented on the interactive graphical element, a project selection control, a score filter slider, a cluster filter element, and/or a cluster color selector. In some examples, the project selection control may be configured such that, when selected, a user may select a project to visualize on the interactive graphical element representing the IP asset landscape. In some examples, the score filter slider may include a lower bound control and/or an upper bound control associated with a proprietary score associated with the IP assets included in the clusters of the selected result set. In some examples, the cluster filter element may be configured such that, when a cluster is selected, the selected cluster may be configured to appear and/or disappear from the spatial representation. In some examples, the cluster color selector may be configured to allow a user to change the colors associated with respective clusters of the selected result set. In some examples, the IP asset overlay window may be displayed in response to user input representing a selection of a graphical element in the spatial representation. The IP asset overlay window may include information associated with a selected IP asset and/or a proprietary score associated with a selected IP asset and generated by the IP landscaping platform. In some examples, the cluster overlay window may include information associated with the cluster, such as, for example, an indication of the color associated with the cluster, an indication of the keyword set associated with the cluster, a number of patents associated with the cluster, and an average of the proprietary scores associated with the IP assets included in the cluster and generated by the IP landscaping platform. In some examples, the quick information overlay window may be displayed in response to a user hovering over a graphical element in the spatial representation. The quick information window may include at least a portion of the information included in the IP asset overlay window.

As mentioned above, the IP landscaping platform may include a datastore. In some examples, the datastore may include data corresponding to user accounts, projects, IP assets, historical data, saved results from previous interactions the user account has made with the IP landscaping platform, and/or market data. The project(s) may include, for example, seeded search queries, similarity results, clustering results, and/or spatial representations of clusters. The project(s) may be stored with respect to the user account(s). Additionally, or alternatively, the saved result(s) may include, for example, seeded search queries, similarity results, clustering results, and/or spatial representations of clusters. The IP asset(s) may be stored with respect to an IP asset library. In some examples, the IP asset library may include data associated with IP assets and/or related to a corresponding IP asset, such as, for example, licensing data, and/or standard essential patent data. The historical data may be stored with respect to the user account(s) and/or independently in the data store(s). In some examples, the historical data may include historical data associated with an entity, a publication, an IP asset, and/or a user account. For example, the historical data may include data specific to mergers and acquisitions associated with a particular entity and/or IP asset. The market data may include market data associated with an entity, an IP asset, a technological area, a product and/or service, and/or standardized market data, and/or any other non-IP related data of the like.

As mentioned above, the IP landscaping platform may include a landscaping component utilized to generate seeded search queries using user targeted data, identify IP assets and/or entities determined to be similar to the targeted data, generate clusters of IP assets, and/or generate an interactive graphical element including a spatial representation of selected clusters. In some examples, the landscaping component may include one or more sub-components. For example, the landscaping component may include a seeding component, a user interface generation component, and/or a clustering component. In some examples, the landscaping component may utilize the one or more sub-components to make determinations and/or generate data to be displayed on the user interface.

In some examples, the seeding component may include one or more sub-components. For example, the seeding component may include a similarity component, a vector component, and/or a ranking component. The seeding component may utilize the one or more sub-components to make determinations and/or to generate data to be displayed on the user interface. Additionally, or alternatively, the seeding component may be configured to generate seeded search queries using user specified targeted data. For example, a user may specify one or more target entities, one or more target publications, and/or one or more target products that the seeding component may utilize to generate a seeded search. In some examples, the seeding component may be configured to identify one or more target entities utilizing data representing one or more target publications and/or one or more target products. The results of the seeded search may include a listing of entities having IP assets (e.g., an IP asset portfolio) that the similarity component has determined to include similarities to the targeted data.

In some examples, the similarity component may be configured to identify similarities between separate data. For example, given a target entity and/or target entities having IP assets (e.g., an IP asset portfolio), the similarity component may be configured to identify one or more additional entities having IP assets (e.g., an IP asset portfolio) that are similar to the IP assets of the target entity. In some examples, the similarity component may be configured to identify an entity having an IP asset portfolio that is similar to an additional IP asset portfolio of an additional entity. In some examples, the similarity component may compare words included in a text portion of IP assets to determine if two separate IP assets are similar to one another. Additionally, or alternatively, the landscaping component and/or similarity component may utilize any other word matching and/or document comparison techniques to determine if two separate IP assets are similar. Additionally, or alternatively, the similarity component may utilize the vector representations of publications and/or entities to determine if two separate IP assets and/or entities are similar to one another.

In some examples, the vector component may be configured to generate vector representations of publications and/or entities. For example, the vector component may be configured to generate a vector representation of a publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents. Additionally, or alternatively, the vector component may be configured to utilize the vector representations of the IP assets that are associated with an entity, such as, for example, a target entity and/or one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

In some examples, the ranking component may be configured to rank the results of the seeded search that may include a listing of entities having IP assets that the similarity component has determined to include similarities to the targeted data. For example, the ranking component may compare the vector representations generated by the vector component to determine which entities are most similar to a target entity and rank the entities accordingly.

The user interface generation component may be configured to generate user interface element(s) and/or user interface pages described above using data received from other components utilized by the system. In some examples, the user interface generation component may be communicatively coupled to the other components stored thereon the computer-readable media. In some examples, the user interface generation component may generate user interfaces configured to present information associated with user projects associated with a user account. Additionally, or alternatively, the user interface generation component may generate user interfaces including confidential information and may be configured to be accessible by only users with predetermined qualifications. For example, the user interface generation component may cause only a portion of information to be displayed based on the type of account that is accessing the system. For example, when a user accesses the system, the system may determine that the account type of the account that the user has utilized to access the system may be one of, for example, a client user account and/or an administrative user account. In some examples, the user interface generation component may generate interactive graphical elements and/or dynamic animation sequences associated with the interactive graphical elements.

The clustering component may be configured to generate result sets including one or more clusters of IP assets. In some examples, the clustering component may generate multiple result sets including any number of clusters from 1-N, where N is any integer larger than 1. In some examples, the result sets may be associated with varying levels of granularity. For example, a result set having 2 clusters may be less granular than a result set having 20 clusters. In some examples, the result sets may be generated using a vector form described above, such as, for example, the embedding. As mentioned above, the embedding may be used to calculate distance, and therefore similarity, between documents. The embeddings may also be utilized to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

In some examples, as mentioned above, the result sets generated by the clustering component may be associated with varying levels of granularity. In some examples, the varying levels of granularity may be achieved by utilizing various cluster specific techniques to assign IP assets into clusters, as described with more detail below. In some examples, hard clustering assignments may be made on IP assets where the cluster assignment by the system is uncertain. Additionally, or alternatively, IP assets that have an uncertain cluster assignment may be grouped with other IP assets that have an uncertain cluster assignment. Additionally, or alternatively, for each IP asset, its probability of belonging to every cluster may be calculated. In some examples, a vector may be generated representing the probabilities of its membership to every cluster. In some examples, this process may be repeated until the IP asset reaches a threshold probability of belonging to at least one of the clusters. Additionally, or alternatively, the IP asset may be assigned to a cluster in which the IP asset has the highest probability of belonging to. Additionally, or alternatively, an IP asset not belonging to a cluster may include very low probabilities of belonging to each of the clusters, and may be identified as a singleton IP asset, and/or may be identified as a novel IP asset among the IP assets included in the clusters. Additionally, or alternatively, user input may be provided to guide the assignment of an IP asset into a cluster grouping. In some examples, one or more models that are associated with the result sets may be saved in association with a user account such that the saved models may be applied later to new IP assets considered for cluster assignment.

Take for example, a user accessing the IP landscaping platform to interact with, conduct research, and/or create a new user project. The landscaping component may be configured to receive data representing a user project. Additionally, or alternatively, the landscaping component may be configured to receive data representing a research query that is unassociated with a project. It should be appreciated that the operations described herein may be executed in association with and/or standalone from user projects. The user project may be created by and associated with a user account and/or one or more user accounts that are associated with the user account. The user projects may be stored in association with the user account data in the secure datastore. In some examples, the user projects may be utilized to organize and/or separate seeded searches, identified similar IP assets and/or entities, and/or generated clusters. In some examples, users may utilize the seeding component to generate seeded searches, generate one or more result sets including clusters of IP assets, and/or generate a spatial representation of one or more of the clusters.

In some examples, the seeding component may be configured to receive data representing a seeded search query and may perform a search operation in a number of ways. A seeded search query may include one or more instances of target data as described in more detail below. In some examples, the seeded search query may indicate an identification of one or more target entities. Additionally, or alternatively, the seeded search query may indicate an identification of one or more target publications, such as, for example, an IP asset. Additionally, or alternatively, the seeded search query may indicate an identification of one or more target products and/or services. In some examples, the IP landscaping platform may be configured to receive additional data associated with the seeded search query. For example, the seeding component may be configured to receive additional data via one or more actionable elements included on a graphical user interface (GUI) presented on a computing device and accessible to a user account. Additionally, or alternatively, the seeding component may be configured to utilize the data representing a seeded search query to make various identifications and determinations associated with IP assets and/or entities, among other things.

In some examples, the seeded search query may indicate the identification of the one or more target entities, and the seeding component may utilize the data to identify IP assets that are associated with the target entity. In some examples, the seeding component may access one or more database(s) including a listing of all of the available IP assets associated with the target entity (e.g., an IP asset portfolio). Additionally, or alternatively, the seeding component may generate a result set including IP assets having an assignee associated with the entity.

Additionally, or alternatively, the seeded search query may indicate the identification of the one or more target publications, and the similarity component may utilize the data representing the seeded search query to identify IP assets (or IP asset portfolios) that are determined to be similar to the target publication. The similarity component may identify similar IP assets using various techniques. For example, the vector component may generate a vector representation of the target publication and use the vector representation to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents. Each of the IP assets may be associated with an entity, and the seeding component may identify a target entity from one or more entities associated with the similar IP assets. In some examples, seeding component may identify a first entity of the one or more entities as a target entity based on the first entity having a number of IP assets that satisfy a threshold number. Additionally, or alternatively, the seeding component may identify a first entity of the one or more entities as a target entity based on the first entity having a more favorable number of IP assets than the one or more additional entities. For example, if the first entity has the more IP assets than the additional entities, than the seeding component may determine that the first entity has a more favorable number of IP assets and select the first entity as the target entity.

Additionally, or alternatively, the seeded search query may indicate the identification of the one or more target products and/or services, and the similarity component may utilize the data representing the seeded search query to identify IP assets that are determined to be similar to the target product and/or service. The similarity component may identify similar IP assets using various techniques. For example, the similarity component may identify a technical feature associated with the target product and may identify IP assets that are associated with the product and/or service as the similar IP assets based on the technical feature. Each of the similar IP assets may be associated with an entity, and the similarity component may identify a target entity from one or more entities associated with the similar IP assets. In some examples, the seeding component may identify a first entity of the one or more entities as a target entity based on the first entity having a number of IP assets that satisfy a threshold number. Additionally, or alternatively, the seeding component may identify a first entity of the one or more entities as a target entity based on the first entity having a more favorable number of IP assets than the one or more additional entities. For example, if the first entity has the more IP assets than the additional entities, then the seeding component may determine that the first entity has a more favorable number of IP assets and select the first entity as the target entity.

Once the landscaping component identifies one or more target entities (also referred to as target entity), the landscaping component may identify, or gather, all of the IP assets associated with the target entity. Utilizing the target entity and the associated IP assets, the landscaping component and/or similarity component may be configured to identify additional entities having IP assets that are similar to the IP assets of the target entity. For example, the landscaping component and/or vector component may utilize the techniques described above to generate vectors representing the IP assets to determine if two separate IP assets are similar. Additionally, or alternatively, the landscaping component and/or similarity component may utilize any other word matching and/or document comparison techniques to determine if two separate IP assets are similar. The landscaping component and/or similarity component may then identify one or more additional entities having IP assets that are determined to be similar to the IP assets of the target entity.

The landscaping component and/or vector component may then generate a vector representation of the target entity and/or the one or more additional entities. For example, the landscaping component may be configured to utilize the vector representations of the individual ones of the IP assets that are associated with an entity, such as, for example, the target entity and/or the one or more additional entities, to generate a vector representation of the an entity. Techniques to generate vectors representing entities may include various vectorization techniques utilized to generate the vectors representing IP assets, and may aggregate the data to generate a vector representing the entity associated with the IP assets.

Once the landscaping component has identified a target entity, one or more additional entities having IP assets determined to be similar to the IP assets of the target entity, and the vector representations of the target entity and/or the one or more additional entities, the landscaping component and/or the ranking component may determine a ranking of the one or more additional entities to generate the seeded search results. In some examples, the ranking may be configured to rank a first entity higher than a second entity of the one or more additional entities if the first entity is determined to have IP assets that are more similar to the IP assets of the target entity. Additionally, or alternatively, the ranking may be configured to rank a first entity higher than a second entity of the one or more additional entities if the first entity has a more favorable vector representation than the second entity. For example, a first vector representation of a first entity may be determined to be more favorable than a second vector representation of a second entity if the first vector representation is determined to be closer to the vector representation of the target entity than the second vector representation.

As mentioned above, the landscaping component and/or user interface generation component may generate one or more graphical user interface(s) (GUIs) for presenting information on computing device(s) accessible by user accounts. In some examples, the IP landscaping platform may generate a user interface for presenting the seeded search results. The GUIs may be configured to receive one or more inputs from the computing device. In some examples, the GUI may receive an input representing a selection of at least one entity of the one or more additional entities included in the seeded search results as one or more selected entities. In some examples, the landscaping component and/or user interface generation component may be configured to generate any of the user interfaces described above.

In some examples, the landscaping component and/or clustering component may utilize the seeded search results to generate one or more result sets including clusters of IP assets. For example, the landscaping component may generate data representing the one or more result sets based at least in part on the IP assets that are associated with the one or more selected entities. In some examples, the one or more result sets may include one or more clusters of the IP assets that are associated with the one or more selected entities. The result sets may include any number of clusters from 1-N, where N is any integer larger than 1. In some examples, the result sets may be associated with varying levels of granularity. For example, a result set having 2 clusters may be less granular than a result set having 20 clusters. In some examples, the result sets may be generated using a vector form described above, such as, for example, the embedding. As mentioned above, the embedding may be used to calculate distance, and therefore similarity, between documents. The embeddings may also be utilized to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

Additionally, or alternatively, the landscaping component and/or user interface generation component may be configured to generate one or more GUIs for presenting the clustering results. In some examples, the GUIs may be configured to receive one or more user inputs associated with the clustering results. In some examples, a GUI may receive an input representing a selection of a result set of the one or more result sets and may present the clusters associated with the selected result set. Additionally, or alternatively, a GUI may receive an input representing a user specified name of a cluster. Additionally, or alternatively, a GUI may receive an input representing a request to generate an interactive graphical element including a spatial representation of the one or more clusters for the selected result set.

In some examples, the landscaping component and/or user interface generation component may generate an interactive graphical element including a spatial representation of one or more clusters included in a selected result set. For example, the landscaping component may generate the interactive graphical element to present on a GUI. In some examples, the landscaping component may include graphical indicators representing individual ones of the IP assets included in the one or more clusters of the selected result set. In some examples, the graphical indicators may be color coded, such that IP assets that are included in a first cluster of the result set may be represented by a graphical indicator having a first color, and IP assets that are included in a second cluster of the result set may be represented by a graphical indicator having a second color that is different from the first color. Additionally, or alternatively, the graphical indicators may be represented as dots of varying sizes representing an overall score and/or an overall relevance of the IP asset with respect to the other IP assets included in the result set. In some examples, the interactive graphical element may present the one or more keywords associated with a cluster on the spatial representation of the IP assets at a central portion of the associated cluster.

As mentioned above, the IP landscaping platform may include an exposure assessment component utilized to assess the level of exposure associated with a targeted entity, make determinations with respect to a targeted entities eligibility for insurance coverage, generate insurance quotes, and/or make changes to insurance premiums. In some examples, the exposure assessment component may be configured to determine a level of exposure, or risk, associated with individual clusters included in a result set. For example, the exposure assessment component may identify a product and/or service offered by an entity based on keywords associated with a particular cluster of IP assets associated with the entity, determine an amount of revenue associated with the product and/or service, and may determine a level of exposure associated with the particular cluster based on a number of IP assets included in the cluster and/or the amount of revenue associated with the product and/or service. For example, if an entity has a high amount of revenue associated with the product and/or service, and a low amount of IP assets included in a cluster having keywords that map to, or are associated with the product and/or service, the exposure assessment component may determine that the cluster has a high level of exposure. Additionally, or alternatively, the exposure assessment component may be configured to determine a level of exposure, or risk, associated with an entity. For example, the exposure assessment component may identify the levels of exposure associated with the result sets and/or clusters associated with an entity, and may aggregate the data indicating the levels of exposure associated with the result sets and/or clusters to determine an overall level of exposure for an entity. In some examples, the exposure assessment component may be utilized in combination with any of the components described above. Additionally, or alternatively, the exposure assessment component may make determinations and/or generate data to be displayed on the user interface.

In some examples, the exposure assessment component may be utilized to assess a target to determine a level of exposure associated with the target entity using at least some of the techniques described above. For example, the exposure assessment component may receive an input representing an identification of a target entity having IP assets. The exposure assessment component and/or landscaping component may then generate data representing one or more result sets of the IP assets. In some examples, the one or more result sets may include one or more clusters of the IP assets. In some examples, the one or more result sets may include clusters that correspond to product(s) and/or service(s) offered by the targeted entity, and thus the one or more result sets may have varying levels of granularity, as described above. For example, the result sets may be generated using a vector form described above, such as, for example, the embedding. As mentioned above, the embedding may be used to calculate distance, and therefore similarity, between documents. The embeddings may also be utilized to create thematic groups of documents. The thematic groups may be determined utilizing a set of keywords determined following analysis of a text portion of the IP assets, and the result may be a visual display of document groups (e.g., the clusters) that share similar themes. Each of the clusters may include at least a number of IP assets included in the cluster and/or the set of keywords associated with the cluster.

The exposure assessment component may then perform various operations on each of the clusters to assess the exposure of the targeted entity. For example, the exposure assessment component may be in communication with the landscaping component and may, for each cluster, identify a product or service offered by the first entity based upon the set of keywords that is associated with the corresponding cluster. The exposure assessment component may then, for each cluster, determine an amount of revenue that is associated with the identified product or service. For example, the exposure assessment component may determine an amount of funds that are allocated to the product or service and/or determine an amount of revenue that is generated by the product or service offered by the targeted entity. In some examples, the exposure assessment component may determine, for each cluster, a first level of exposure based upon the number of the IP assets that map to the product or service offered by the targeted entity and/or the amount of revenue that is associated with the product or service offered by the targeted entity. For example, a cluster that is associated with a product or service offered by an entity an entity that has a high amount of revenue associated with the product or service, but a low number of IP assets included in the cluster may have a high level of exposure, representing high risk for the cluster due to the high amount of revenue and low number of IP assets that map to the product or service.

The exposure assessment component may then determine a second level of exposure associated with the targeted entity. In some examples, the second level of exposure may be representative of an aggregated level of exposure based on the first level of exposure associated with each of the clusters included in the selected result set. That is, the second level of exposure may be an average of the first level of exposure that is associated with each of the clusters included in the selected result set. Additionally, or alternatively, the second level of exposure may be determined using any other algorithm configured to aggregate multiple scores determined on the same scoring scale. The exposure assessment component may be in communication with the user interface generation component to generate one or more GUI(s) to present the clusters on computing devices accessible by a user account, as described above. Additionally, or alternatively, the user interface generation component may generate an interactive graphical element, utilizing the techniques described above, to present a spatial representation of the clustered results on the one or more GUI(s).

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment 100 for an IP landscaping platform architecture. The architecture 100 may include, for example, one or more user devices 102(a)-(c), also described herein as electronic devices 102(a)-(c), and/or a remote computing resources 104 associated with a vendor management platform. Some or all of the devices and systems may be configured to communicate with each other via a network 106.

The electronic devices 102 may include components such as, for example, one or more processors 108, one or more network interfaces 110, and/or computer-readable media 112. The computer-readable media 112 may include components such as, for example, one or more user interfaces 114. As shown in FIG. 1, the electronic devices 102 may include, for example, a computing device, a mobile phone, a tablet, a laptop, and/or one or more servers. The components of the electronic device 102 will be described below by way of example. It should be understood that the example provided herein is illustrative and should not be considered the exclusive example of the components of the electronic device 102.

By way of example, the user interface(s) 114 may include one or more of the user interfaces described elsewhere herein, such as the user interfaces described with respect to FIGS. 3-11, corresponding to a projects user interface, a search view project user interface, a similarities view project user interface, a publication search user interface, an entity search user interface, a similar publication user interface, a similar entity user interface, a clustering results user interface, and/or a cluster board user interface, etc. It should be understood that while the user interface(s) 114 are depicted as being a component of the computer-readable media 112 of the electronic devices 102(a)-(c), the user interface(s) 114 may additionally or alternatively be associated with the remote computing resources 104. The user interface(s) 114 may be configured to display information associated with the IP landscaping platform and to receive user input associated with the IP landscaping platform.

The remote computing resources 104 may include one or more components such as, for example, one or more processors 116, one or more network interfaces 118, and/or computer-readable media 120. The computer-readable media 120 may include one or more components, such as, for example, a landscaping component 122, an exposure assessment component 124, and/or one or more data store(s) 126. The landscaping component 122 may be configured to receive user input data as described herein for indicating target data representing at least one of an entity, publication, and/or product utilized to generate seeded search queries that utilize the target data to determine a representative entity and return results including one or more entities that have IP assets that are determined to be similar to the IP assets of the representative entity. The landscaping component 122 may also be configured to generate vector representations of the entities and/or IP assets such that the landscaping component 122 may rank the results from the search query by utilizing vector representations. The landscaping component 122 may also be configured to utilize the vector representations of the entities to generate result sets including clusters of selected entities associated with technical fields, products or technologies of interest, etc. The landscaping component 122 may also be configured to generate an interactive graphical element, that may be configured to respond to various user inputs representing manipulations to the interactive graphical element, for presenting a spatial representation of the one or more clusters included in a selected result set.

The exposure assessment component 124 may be configured to determine a level of exposure associated with a targeted entity by performing one or more of the clustering techniques described herein to generate result sets of varying levels of granularity that include one or more clusters that may map to various products and/or services offered by the target entity. The exposure assessment component 124 may be configured to determine a first level of exposure associated with each cluster of a result set based on a number of IP assets included in a particular cluster and an amount of revenue associated with a product or service offered by the target entity that is associated with the particular cluster. The exposure assessment component 124 may be configured to determine a second level of exposure associated with the target entity based on the first level of exposure associated with each of the clusters included in the selected result set. The exposure assessment component 124 may be configured to generate the interactive graphical element including a spatial representation of the clusters included in the selected result set.

The data store(s) 126 of the remote computing resources 104 may include data corresponding to user accounts, user projects, historical data, and/or intellectual-property assets The user projects may include, for example, seeded search queries, similar entity and/or publication results, clustering results, and/or the spatial representation of the clustering results. The user projects may be stored with respect to the user account of the data store 126. The IP assets may be stored with respect to an IP asset library of the data store 126.

Figure 2:
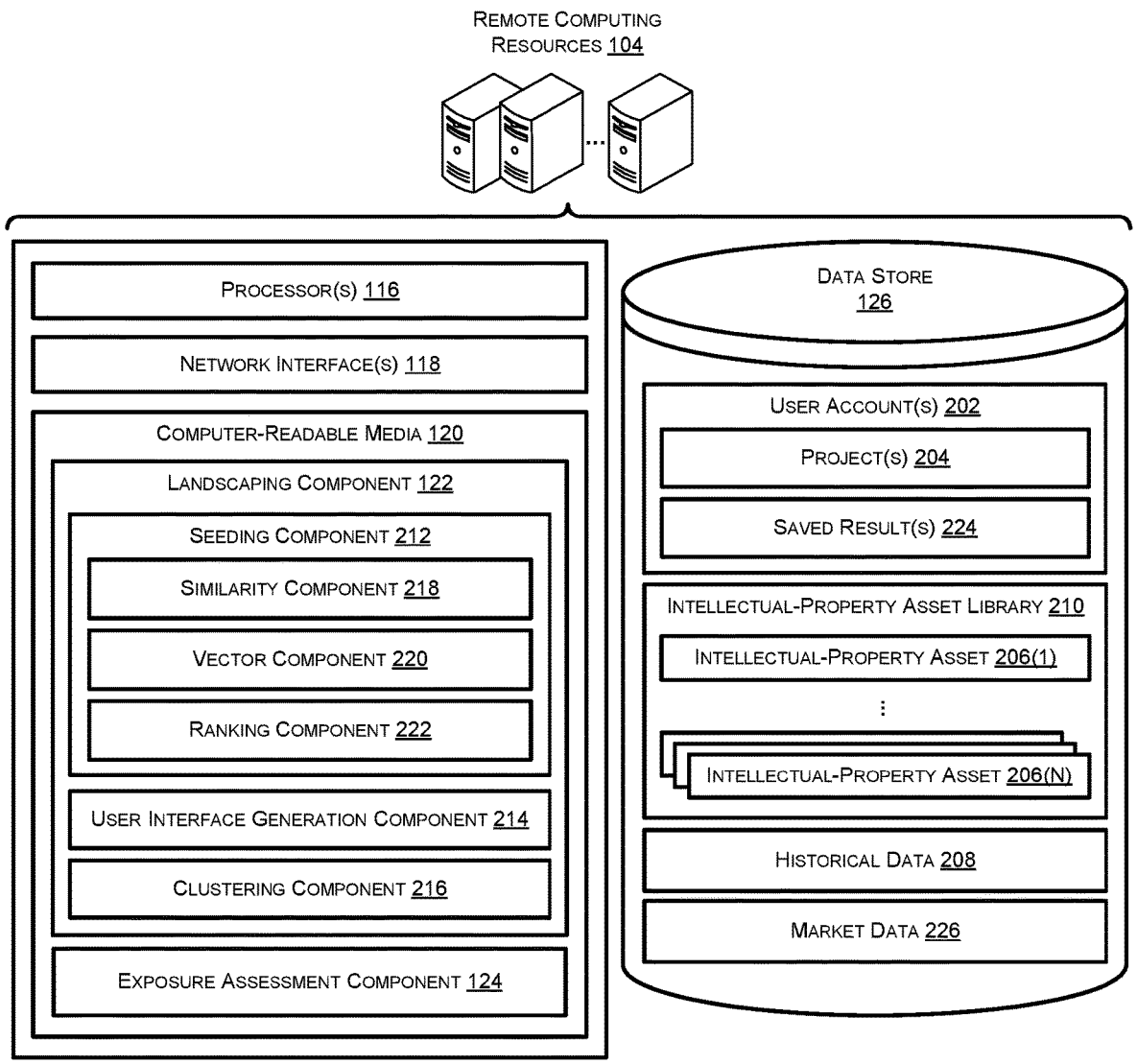
FIG. 2 illustrates a component diagram of example components of a remote computing resource for the intellectual-property landscaping platform.

As shown in FIG. 2, several of the components of the remote computing resources 104 and/or the electronic devices 102 and the associated functionality of those components as described herein may be performed by one or more of the other systems and/or by the electronic devices 102. Additionally, or alternatively, some or all of the components and/or functionalities associated with the electronic devices 102 may be performed by the remote computing resource(s) 104.

It should be noted that the exchange of data and/or information as described herein may be performed only in situations where a user has provided consent for the exchange of such information. For example, a user may be provided with the opportunity to opt in and/or opt out of data exchanges between devices and/or with the remote systems and/or for performance of the functionalities described herein. Additionally, when one of the devices is associated with a first user account and another of the devices is associated with a second user account, user consent may be obtained before performing some, any, or all of the operations and/or processes described herein.

As used herein, a processor, such as processor(s) 108 and/or 116, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 108 and/or 116 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 108 and/or 116 may possess its own local memory, which also may store program components, program data, and/or one or more operating systems.

The computer-readable media 112 and/or 120 may include volatile and nonvolatile memory, removable and non-removable media implemented in any method or technology for storage of information, such as computer-readable instructions, data structures, program component, or other data. Such computer-readable media 112 and/or 120 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 112 and/or 120 may be implemented as computer-readable storage media ("CRSM"), which may be any available physical media accessible by the processor(s) 108 and/or 116 to execute instructions stored on the computer-readable media 112 and/or 120. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as computer-readable media 112 and/or 120, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

The network interface(s) 110 and/or 118 may enable messages between the components and/or devices shown in system 100 and/or with one or more other remote systems, as well as other networked devices. Such network interface(s) 110 and/or 118 may include one or more network interface controllers (NICs) or other types of transceiver devices to send and receive messages over the network 106.

For instance, each of the network interface(s) 110 and/or 118 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 110 and/or 118 may include a wide area network (WAN) component to enable message over a wide area network.

In some instances, the remote computing resources 104 may be local to an environment associated with the electronic device(s) 102. For instance, the remote computing resources 104 may be located within the electronic device(s) 102. In some instances, some or all of the functionality of the remote computing resources 104 may be performed by the electronic device(s) 102. Also, while various components of the remote computing resources 104 have been labeled and named in this disclosure and each component has been described as being configured to cause the processor(s) 108 and/or 116 to perform certain operations, it should be understood that the described operations may be performed by some or all of the components and/or other components not specifically illustrated.

FIG. 2 illustrates a component diagram of example components 100 of a remote computing resource 104 for the vendor management platform. The remote computing resource 104 may include one or more components such as, for example, one or more processor(s) 116, one or more network interfaces 118, and/or computer-readable media 120. The computer-readable media may include one or more components, such as, for example, a landscaping component 122, an exposure assessment component 124, and/or one or more data stores 126. Some or all of the components and functionalities may be configured to communicate with each other.

The data store(s) 126 may include data corresponding to user account(s) 202, project(s) 204, intellectual-property (IP) asset(s) 206(1)-(N), historical data 208, saved result(s) 224 from previous interactions the user account has made with the IP landscaping platform, and/or market data 226. The project(s) 204 may include, for example, seeded search queries, similarity results, clustering results, and/or spatial representations of clusters. The project(s) 204 may be stored with respect to the user account(s) 202. Additionally, or alternatively, the saved result(s) 224 may include, for example, seeded search queries, similarity results, clustering results, and/or spatial representations of clusters. The IP asset(s) 206(1)-(N) may be stored with respect to an IP asset library 210. In some examples, the IP asset library 210 may include data associated with IP assets and/or related to a corresponding IP asset, such as, for example, licensing data, and/or standard essential patent data. The historical data 208 may be stored with respect to the user account(s) 202 and/or independently in the data store(s) 126. In some examples, the historical data 208 may include historical data associated with an entity, a publication, an IP asset 206, and/or a user account 202. For example, the historical data 208 may include data specific to mergers and acquisitions associated with a particular entity and/or IP asset 206. The market data 226 may include market data associated with an entity, an IP asset 206, a technological area, a product and/or service, standardized market data, and/or any other non-IP related data of the like.

As mentioned with respect to FIG. 1, the landscaping component 122 may be configured to receive user input data as described herein for indicating target data representing at least one of an entity, publication, and/or product utilized to generate seeded search queries that utilize the target data to determine a representative entity and return results including one or more entities that have IP assets that are determined to be similar to the IP assets of the representative entity. The landscaping component 122 may also be configured to generate vector representations of the entities and/or IP assets such that the landscaping component 122 may rank the results from the search query by utilizing vector representations. The landscaping component 122 may also be configured to utilize the vector representations of the entities to generate result sets including clusters of selected entities associated with technical fields, products or technologies of interest, etc. The landscaping component 122 may also be configured to generate an interactive graphical element, that may be configured to respond to various user inputs representing manipulations to the interactive graphical element, for presenting a spatial representation of the one or more clusters included in a selected result set. The landscaping component 122 may include one or more components, such as, for example, a seeding component 212, a user interface generation component, 214, and/or a clustering component 216. Additionally, or alternatively, the landscaping component 122 may be configured to perform the operations described below with respect to the one or more components.

The seeding component 212 may include one or more components, such as, for example, a similarity component 218, a vector component 220, and/or a ranking component 222. The seeding component 212 may be configured to generate seeded search queries using user specified targeted data. For example, a user may specify a target entity, a target publication and/or a target product that the seeding component 212 may utilize to generate a seeded search. In some examples, the seeding component 212 may be configured to identify a target entity utilizing data representing a target publication and/or a target product. The results of the seeded search may include a listing of entities having IP assets that the similarity component 218 has determined to include similarities to the targeted data. Additionally, or alternatively, the seeding component 212 may be configured to perform the operations described below with respect to the one or more components.

The similarity component 218 may be configured to identify similarities between separate data. For example, given a target entity and/or target entities having IP assets (e.g., an IP asset portfolio), the similarity component may be configured to identify one or more additional entities having IP assets (e.g., an IP asset portfolio) that are similar to the IP assets of the target entity. In some examples, the similarity component 218 may be configured to identify an entity having an IP asset portfolio that is similar to an additional IP asset portfolio of an additional entity. In some examples, the similarity component 218 may compare words included in a text portion of IP assets to determine if two separate IP assets are similar to one another. Additionally, or alternatively, the similarity component 218 may utilize any other word matching and/or document comparison techniques to determine if two separate IP assets are similar. Additionally, or alternatively, the similarity component 218 may utilize vector representations of publications and/or entities to determine if two separate IP assets and/or entities are similar to one another.

The vector component 220 may be configured to generate vector representations of publications and/or entities. For example, the vector component 220 may be configured to generate a vector representation of a publication that may be used to identify IP assets having similar vector representations. Techniques to generate vectors representing IP assets may include vectorization techniques such as Doc2Vec, or other similar techniques. Additionally, or alternatively, techniques to generate vectors representing IP assets may include a method that takes a document, such as an IP asset, and turns it into a vector form as a list of floating-point numbers based at least in part on the document's text contents. This vector form may be called an embedding. This embedding may be used to calculate distance, and therefore similarity, between documents. Additionally, or alternatively, the vector component 220 may be configured to utilize the vector representations of the IP assets that are associated with an entity, such as, for example, a target entity and/or one or more additional entities, to generate a vector representation of an entity. Techniques to generate vectors representing entities may include various vectorization techniques utilized to generate the vectors representing IP assets, and may aggregate the data to generate a vector representing the entity associated with the IP assets.

The ranking component 222 may be configured to rank results of a seeded search that may include a listing of entities having IP assets that the similarity component 218 has determined to include similarities to the targeted data. For example, the ranking component 222 may compare the vector representations generated by the vector component 220 to determine which entities are most similar to a target entity and rank the entities accordingly. Additionally, or alternatively, the ranking component 222 may be in communication with the user interface generation component 214 and may cause the GUI to display results of a seeded search in according to a ranked manner determined by the ranking component 222.

The user interface generation component 214 may be configured to generate user interface element(s), window(s), page(s), and/or view(s) described below with respect to FIGS. 3-11 using data received from other components utilized by the IP landscaping platform. In some examples, the user interface generation component 214 may be communicatively coupled to the other components stored thereon the computer-readable media 120. In some examples, the user interface generation component 214 may generate user interfaces configured to present information associated with user account data 202, project data 204, and/or saved results 224. Additionally, or alternatively, the user interface generation component 214 may generate user interfaces including confidential information and may be configured to be accessible by only users with predetermined qualifications. For example, the user interface generation component 214 may cause only a portion of information to be displayed based on the type of account that is accessing the platform. For example, when a user accesses the system, the user interface generation component 214 may determine that the account type of the account that the user has utilized to access the system may be one of, for example, an internal user and/or an external user, and may only include a portion of the information to be displayed that is associated with that account type. In some examples, the user interface generation component 214 may generate notifications to send to the user accounts.

The clustering component 216 may be configured to generate result sets including one or more clusters of IP assets. In some examples, the clustering component 216 may generate multiple result sets including any number of clusters from 1-N, where N is any integer larger than 1. In some examples, the result sets may be associated with varying levels of granularity. For example, a result set having 2 clusters may be less granular than a result set having 20 clusters. In some examples, the clustering component 216 may generate result sets using a vector form described above, such as, for example, the embedding. As mentioned above, the embedding may be used to calculate distance, and therefore similarity, between documents. The clustering component 216 may also utilize the embeddings to create thematic groups of documents. The thematic groups may be determined utilizing a set of keywords determined following analysis of a text portion of the IP assets, and the result may be a visual display of document groups (e.g., the clusters) that share similar themes. There may be a degree of supervision in the clustering process that may allow for some human control over which documents are grouped in which clusters. Each result set may include an indication of the number of clusters included in the result set. In some examples, each of clusters may include an indication of the number of IP assets included in the respective cluster and/or the keywords associated with the respective cluster. The clusters need not include all of the IP assets associated with the one or more selected entities, as some of the IP assets may be determined to be outliers and/or not associated with a cluster and/or result set.

In some examples, as mentioned above, the result sets generated by the clustering component 216 may be associated with varying levels of granularity. In some examples, the varying levels of granularity may be achieved by utilizing various cluster specific techniques to assign IP assets into clusters, as described with more detail below. In some examples, hard clustering assignments may be made on IP assets where the cluster assignment by the system is uncertain. Additionally, or alternatively, IP assets that have an uncertain cluster assignment may be grouped with other IP assets that have an uncertain cluster assignment. Additionally, or alternatively, for each IP asset, its probability of belonging to every cluster may be calculated. In some examples, a vector may be generated representing the probabilities of its membership to every cluster. In some examples, this process may be repeated until the IP asset reaches a threshold probability of belonging to at least one of the clusters. Additionally, or alternatively, the IP asset may be assigned to a cluster in which the IP asset has the highest probability of belonging to. Additionally, or alternatively, an IP asset not belonging to a cluster may include very low probabilities of belonging to each of the clusters, and may be identified as a singleton IP asset, and/or may be identified as a novel IP asset among the IP assets included in the clusters. Additionally, or alternatively, user input may be provided to guide the assignment of an IP asset into a cluster grouping. In some examples, one or more models that are associated with the result sets may be saved in association with a user account such that the saved models may be applied later to new IP assets considered for cluster assignment.

The landscaping component 122 may also be configured to receive input data representing user input indicating an identification of a target entity. In some examples, the landscaping component 122 may also be configured to identify one or more IP assets 206 that are associated with a target entity. For example, the landscaping component 122 may be configured to identify IP assets 206 in the IP asset library 210 that are associated with a target entity. Additionally, or alternatively, the landscaping component 122 may also be configured to receive input data representing user input indicating an identification of a target publication, such as, for example, a target IP asset 206. In some examples, the landscaping component 122 may be configured to identify the target entity based on the target publication. In some examples, the landscaping component 122 and/or similarity component 218 may be configured to identify one or more entities having IP assets that are similar to a target publication as a target entity. For example, the landscaping component 122 may determine that the target entity has a number of IP assets that satisfy a threshold number of IP assets. Additionally, or alternatively, the landscaping component 122 and/or similarity component 218 may be configured to identify one or more entities having a set of IP assets that are similar to a set of IP assets associated with one or more additional entities, as a target entity. For example, the landscaping component 122 may be configured to compare a first IP asset portfolio of a first entity with a second IP asset portfolio of a second entity, and/or additional IP asset portfolios of additional entities. Additionally, or alternatively, the landscaping component 122 may be configured to determine that the target entity has a number of IP assets that is determined to be more favorable than a number of IP assets that are associated with additional entities. Additionally, or alternatively, the landscaping component 122 may also be configured to receive input data representing user input indicating an identification of a target product and/or service. In some examples, the landscaping component 122 may be configured to identify a technical categorization of the target product and may identify one or more entities having IP assets that are associated with the technological categorization of the target product as a target entity. Additionally, or alternatively, the landscaping component 122 may identify the target entity using any of the techniques described above.

The landscaping component 122 may also be configured to identify IP assets that are determined to be foreign IP assets and/or design IP assets and may remove the foreign and/or design IP assets from result sets that are generated by the clustering component 216. Additionally, or alternatively, the landscaping component 122 may also be configured to determine a score associated with a result set and/or cluster of IP assets. For example, the landscaping component 122 may generate a first score for a first result set of IP assets based on comparing the keywords associated with the first result set to keywords associated with additional result sets.

As mentioned above with respect to FIG. 1, the exposure assessment component 124 may be configured to assess a level of exposure associated with a targeted entity and/or one or more additional entities, make determinations with respect to the eligibility for insurance coverage associated with a targeted entity and/or one or more additional entities, generate insurance quotes, and/or make changes to insurance premiums. In some examples, the exposure assessment component 124 may be configured to determine a level of exposure, or risk, associated with individual clusters included in a result set. For example, the exposure assessment component 124 may utilize the market data 226 to identify a product and/or service offered by an entity based on keywords associated with a particular cluster of IP assets associated with the entity, determine an amount of revenue associated with the product and/or service, and may determine a level of exposure associated with the particular cluster based on a number of IP assets included in the cluster and/or the amount of revenue associated with the product and/or service. For example, if an entity has a high amount of revenue associated with the product and/or service, and a low amount of IP assets included in a cluster having keywords that map to, or are associated with the product and/or service, the exposure assessment component 124 may determine that the cluster has a high level of exposure. Additionally, or alternatively, the exposure assessment component 124 may be configured to determine a level of exposure, or risk, associated with an entity. For example, the exposure assessment component 124 may identify the levels of exposure associated with the result sets and/or clusters associated with an entity, and may aggregate the data indicating the levels of exposure associated with the result sets and/or clusters to determine an overall level of exposure for an entity. In some examples, the exposure assessment component 124 may be utilized in combination with any of the components described above. Additionally, or alternatively, the exposure assessment component 124 may make determinations and/or generate data to be displayed on the user interface.

The exposure assessment component 124 may also be configured to utilize the IP asset library 210, the historical data 208, and/or the market data 226 to determine if an IP asset is associated with a litigation dispute. For example, the exposure assessment component 124 may identify previous litigation disputes that involve the IP asset, directly and/or indirectly, such as, for example, a citation of the IP asset. In some examples, the exposure assessment component 124 may be configured to generate an exportable file that includes a list of particular IP assets that are associated with a particular litigation dispute. Additionally, or alternatively, the exportable file may include information associated with a litigation dispute for each respective IP asset included in the listing.

The exposure assessment component 124 may also be configured to determine an insurance grouping associated with an entity based on the level of exposure associated with the entity, and may cause a user interface to display an indication of the insurance grouping and a coverage amount associated with the insurance grouping. Additionally, or alternatively, the exposure assessment component 124 may be configured to utilize the historical data 208 and/or market data 226 in the data store 126 and/or may identify historical data associated with an entity to identify trends associated with an entity and/or adjust exposure levels of an entity. For example, the exposure assessment component 124 may raise or lower the level of exposure associated with an entity based on the historical data 208 and/or the market data 226. In some examples, the exposure assessment component 124 may identify one or more trends associated with an entity. For example, a trend may indicate a change in an amount of revenue associated with a product and/or service offered by an entity over a period of time. Additionally, or alternatively, a trend may indicate a change in a number of IP assets that are associated with the product and/or service offered by an entity over a period of time. In some examples, the exposure assessment component 124 may be configured to utilize the trends to determine a change ratio indicating a change rate associated with one trend with respect to a change rate associated with another trend. Additionally, or alternatively, the exposure assessment component 124 may be configured to determine the level of exposure associated with an entity based on the one or more trends and/or the change ratio.

The exposure assessment component 124 may also be configured to utilize the landscaping component 122, and/or the one or more components included therein, to generate a spatial representation of result sets and/or clusters associated with a particular entity to visualize the levels of exposure associated with the entity. For example, the exposure assessment component 124 may identify clusters associated with high and/or low levels of exposure, and provide graphical indications overlaid on the spatial representation of the clusters. Additionally, or alternatively, the exposure assessment component 124 may also be configured to utilize the market data 226 and/or the historical data 208 to identify a gap in coverage between clusters associated with an entity. In some examples, the gap in coverage may be associated with a technical area and/or the keywords. For example, the gap in coverage may be proximal to IP assets included in surrounding clusters, and the exposure assessment component 124 may be configured to generate the keywords based on words included in a text portion of the proximal IP assets included the surrounding clusters.

FIGS. 3-11 illustrate conceptual diagrams of example user interface(s) 300-1100 that may receive user input and utilize the IP landscaping platform to perform the various operations described above with respect to FIGS. 1 and 2 and/or the various operations described below with respect to FIGS. 12-19. The user interface(s) 300-1100 may be generated by the user interface generation component 214 described with respect to FIG. 2 above. The user interface(s) 300-1100 may be displayed on a display of an electronic device associated with a user account, such as the electronic device 102 as described with respect to FIG. 1 above. While example user interface(s) 300-1100 are shown in FIGS. 3-11, the user interface(s) 300-1100 are not intended to be construed as a limitation, and the user interface(s) 300-1100 may be configured to present any of the data described herein.

Figure 3:
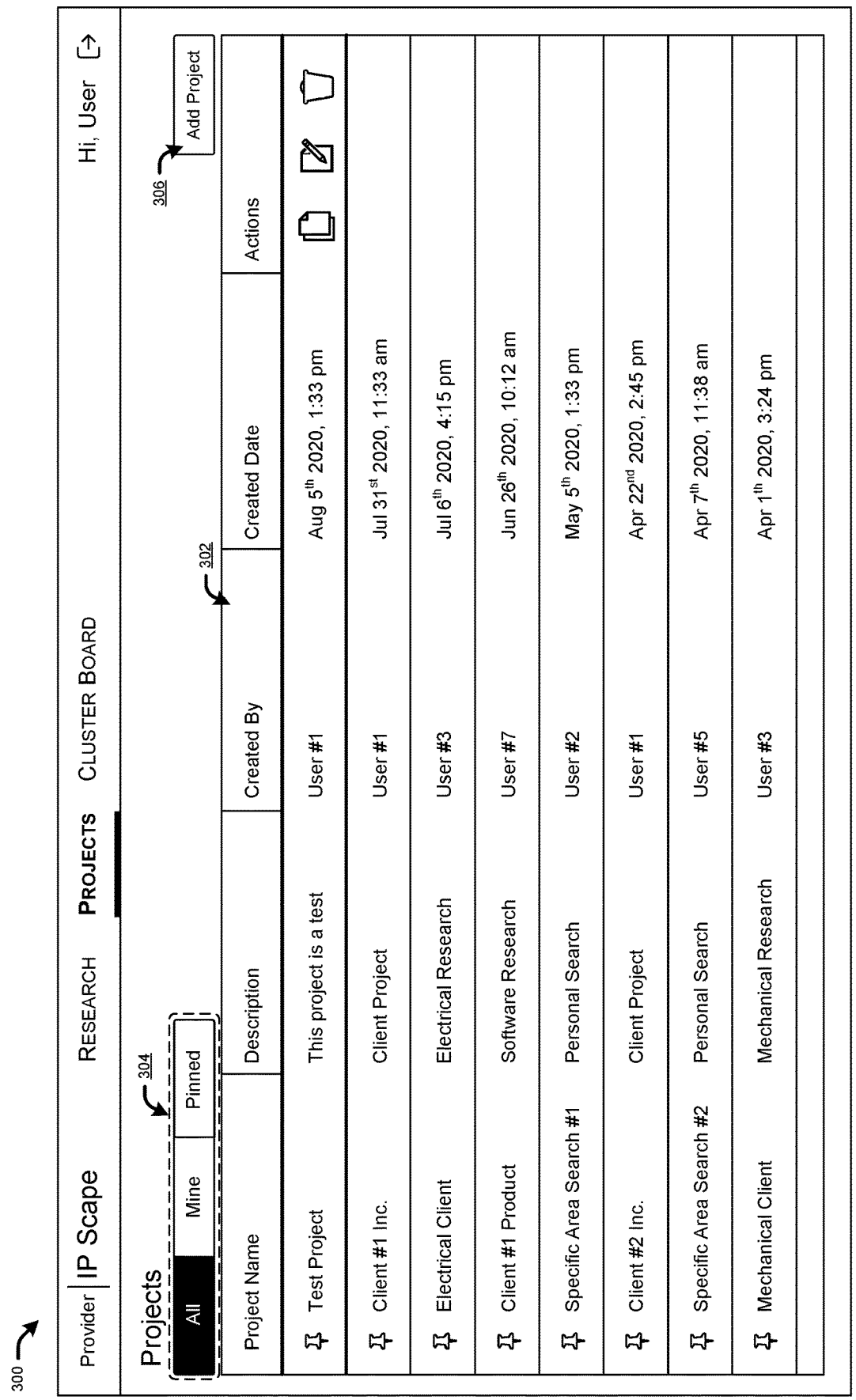
FIG. 3 illustrates an example user interface for displaying data associated with a user account representing intellectual-property landscaping projects and/or research queries and/or one or more actionable elements.

FIG. 3 illustrates an example user interface 300 configured to present data associated with a user account representing user created IP landscaping research, project(s) and/or project(s) associated with a user account. The data may be presented using a projects listing window 302. Additionally, or alternatively, the user interface 300 may include a project filter indicator 304 indicating the current projects that are being presented in the projects listing window 302 on the user interface 300. Additionally, or alternatively, the user interface 300 may include an add project element 306. The user interface 300 may be displayed on a display of an electronic device associated with a user account, such as, for example, the electronic device 102 as described with respect to FIG. 1 above.

In some examples, the projects listing window 302 may include a listing of projects associated with a client account. For example, the projects listing window 302 may include projects created by the user account, projects created by additional user accounts that are associated with the user account (i.e., user accounts associated with a similar entity), and/or pinned projects (i.e., projects that the user account has saved). In some examples, the listing of the projects may be presented using individual cells for each project. In some examples, each cell may include an indication of the name of the project, a description of the project, an indication of the user account that created the project, an indication of the date the project was created, and one or more actionable elements associated with the project. In some examples, the one or more actionable elements may include a pin project element, a copy project element, an edit project element, and/or a delete project element. Additionally, or alternatively, each cell may be actionable such that when the project is selected, the user interface may be caused to display a selected project page corresponding to the project that is selected.

In some examples, the project filter indicator 304 may be configured such that, when selected, the projects listing window 302 displays the listing of projects corresponding to the selected project filter indicator 304. For example, the "All" project filter indicator 304 may cause the projects listing window 302 to display the listing of projects including all of the projects, the "Mine" project filter indicator 304 may cause the projects listing window 302 to display the listing of projects including the projects that are created by the user, and/or the "Pinned" project filter indicator 304 may cause the projects listing window 302 to display the listing of projects including the projects that the user has pinned.

In some examples, the add project element 306 may be configured such that, when selected, the user interface presents a window configured to receive user input required to create a new project.

Figure 4A:
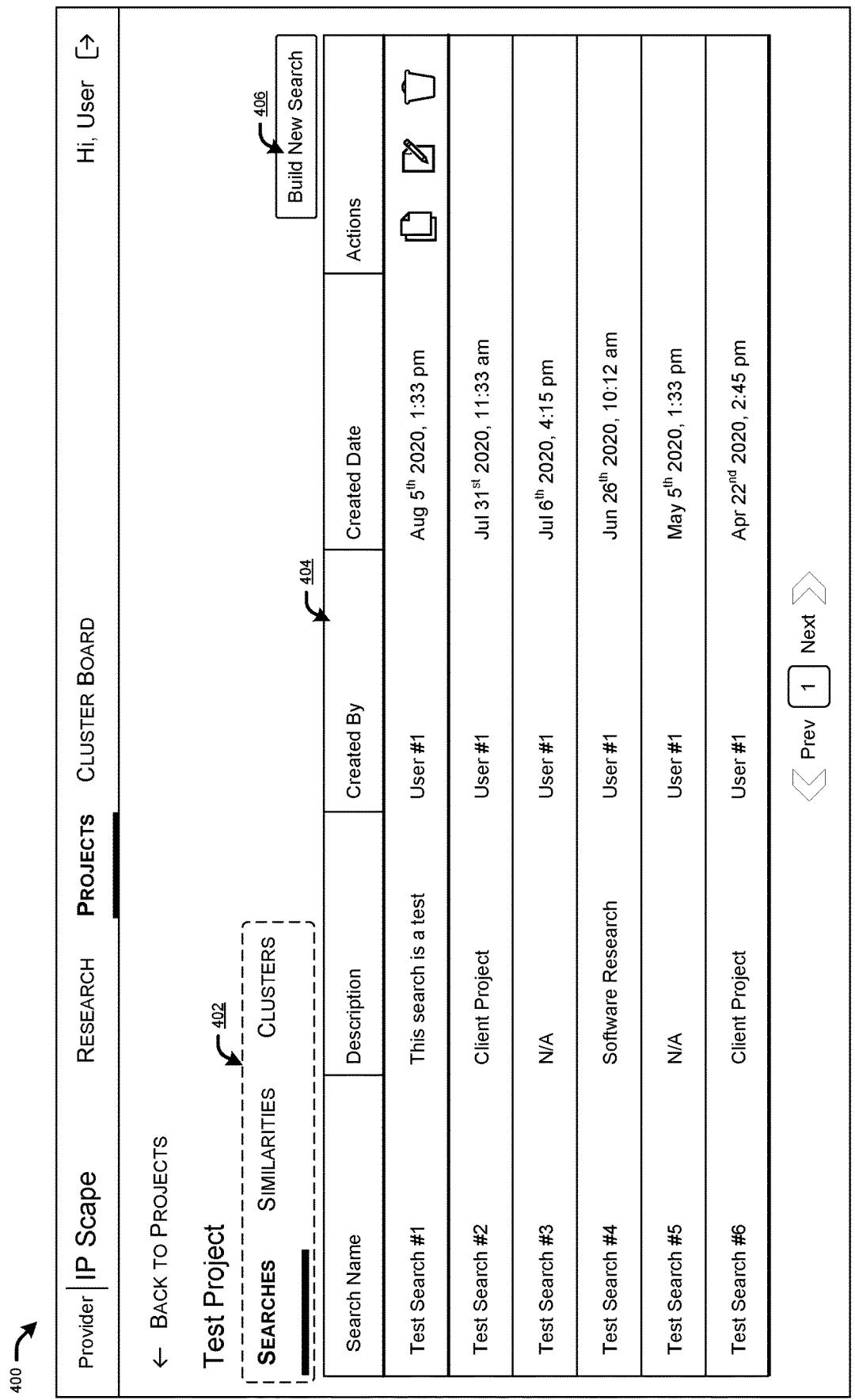
FIG. 4A illustrates an example user interface for displaying data associated with a user account representing an intellectual-property search window associated with an intellectual-property landscaping project and/or research queries and/or one or more actionable elements.
Figure 4B:
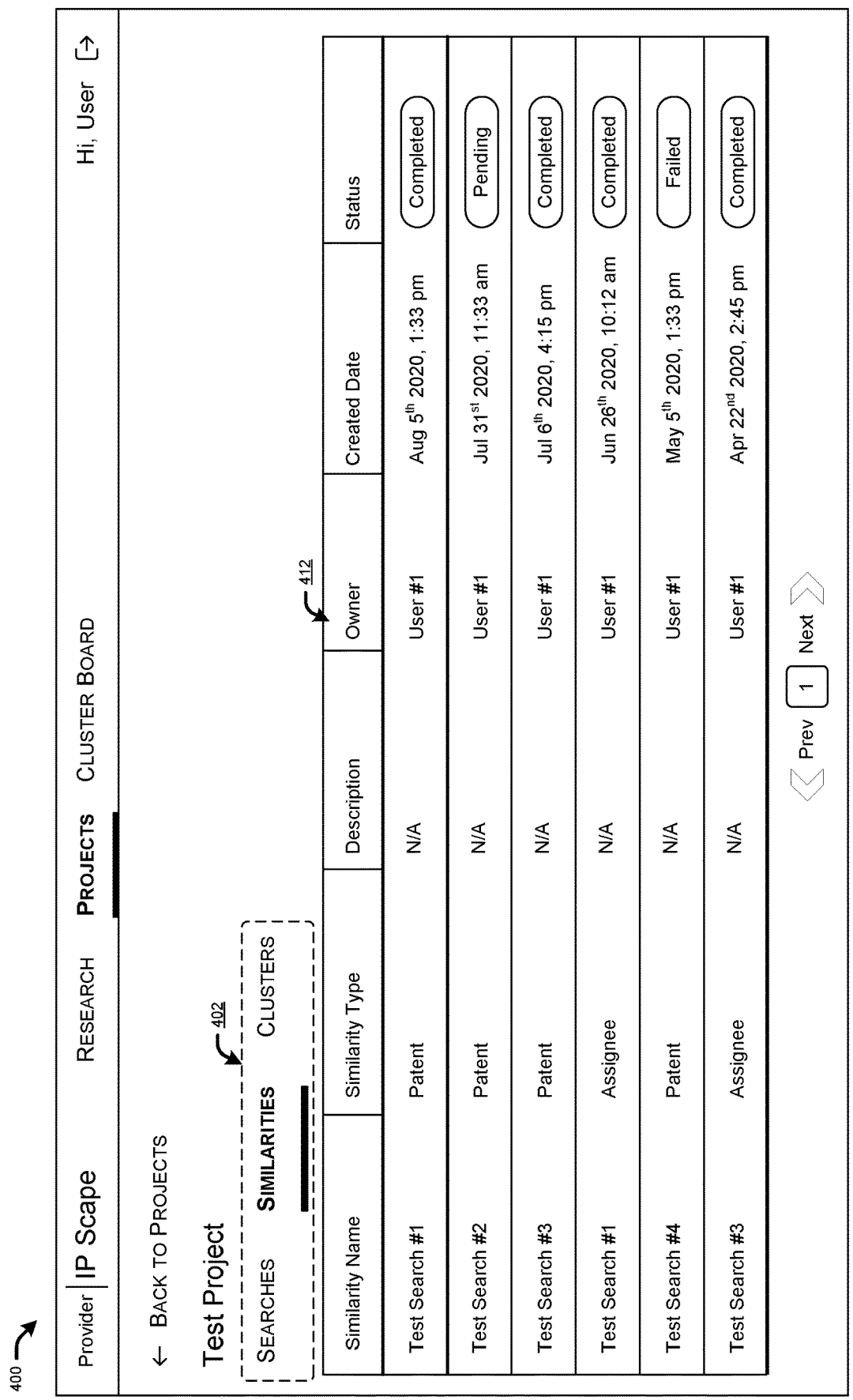
FIG. 4B illustrates an example user interface for displaying data associated with a user account representing an intellectual-property similarity window associated with an intellectual-property landscaping project and/or research queries and/or one or more actionable elements.
Figure 4C:
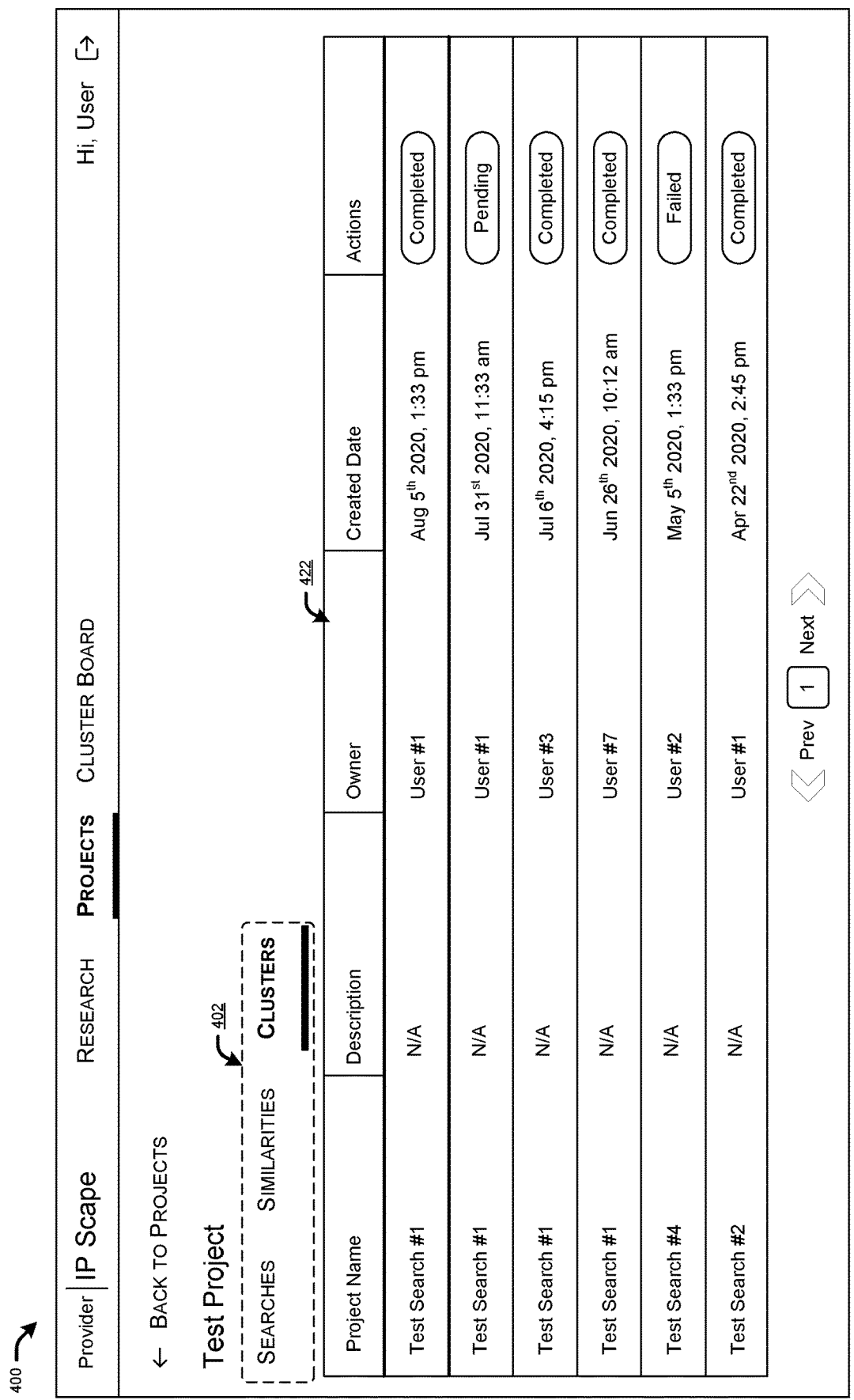
FIG. 4C illustrates an example user interface for displaying data associated with a user account representing an intellectual-property cluster window associated with an intellectual-property landscaping project and/or research queries and/or one or more actionable elements.

FIGS. 4A-4C illustrate an example user interface 400 for displaying data associated with a user account representing information associated with a selected IP landscaping project. The user interface 400 may present various windows for displaying portion(s) of the information associated with the selected IP landscaping project corresponding to a project portion filter indicator 402 indicating the current portion of the selected project that is being presented on the user interface 400. The user interface 400 may be displayed on a display of an electronic device associated with a user account, such as, for example, the electronic device 102 as described with respect to FIG. 1 above.

In some examples, the project portion filter indicator 402 may indicate a current portion of a selected project that is being displayed on the user interface 400. For example, the project portion filter indicator 402 may include one or more filters, such as, for example, a searches filter, a similarities filter, and/or a clusters filter. In some examples, when the searches filter of the project portion filter indicator 402 is selected, the user interface may be caused to display the searches listing window 404. Additionally, or alternatively, when the similarities filter of the project portion filter indicator 402 is selected the user interface may be caused to display the similarities listing window 412. Additionally, or alternatively, when the clusters filter of the project portion filter indicator 402 is selected, the user interface may be caused to display the clusters listing window 422.

FIG. 4A illustrates an example user interface 400 for displaying data associated with a user account representing a selected IP landscaping project. The data may be presented using a searches listing window 404. Additionally, or alternatively, the user interface 400 may include the project portion filter indicator 402 indicating the current portion of the selected project that is being presented on the user interface 400, such as, for example, the searches listing window 404 of the selected project. Additionally, or alternatively, the user interface 400 may include a build new search element 406.

In some examples, the searches listing window 404 may include a listing of the searches associated with the project and/or a build new search element. The listing of the searches may be presented using individual cells for each search. In some examples, each cell may include an indication of a name of the search, a description of the search, an indication of the user account that created the search, and indication of when the search was created, and/or one or more actionable elements associated with the search. In some examples, the one or more actionable elements may include a copy search element, an edit search element, and/or a delete search element. Additionally, or alternatively, each cell may be actionable such that when a search is selected, the user interface may be caused to display a search page corresponding to the search that is selected.

In some examples, the build new project element 406 may be configured such that, when selected, the user interface presents a window configured to receive user input required to build a new search.

FIG. 4B illustrates an example user interface 400 for displaying data associated with a user account representing a selected IP landscaping project. The data may be presented using a similarities listing window 412. Additionally, or alternatively, the user interface 400 may include the project portion filter indicator 402 indicating the current portion of the selected project that is being presented on the user interface 400, such as, for example, the similarities listing window 412 of the selected project.

In some examples, the similarities listing window 412 may include a listing of the similarities associated with the selected project. The listing of the similarities may be presented using individual cells for each similarity. In some examples, each cell may include an indication of a name of the similarity, an indication of the type of the similarity (i.e., patent or assignee), a description of the similarity, an indication of the user account that created the similarity, an indication of the date the similarity was created, and/or a status indicator associated with the similarity. In some examples, the status indicator may provide an indication as to the status of the generation of the similarity, such as, for example, pending, completed, and/or failed. Additionally, or alternatively, each cell may be actionable such that when a similarity is selected, the user interface may be caused to display a publication similarity page corresponding to the publication similarity that is selected and/or the user interface may be caused to display an entity similarity page corresponding to the entity similarity that is selected.

FIG. 4C illustrates an example user interface 400 for displaying data associated with a user account representing a selected IP landscaping project. The data may be presented using a clusters listing window 422. Additionally, or alternatively, the user interface 400 may include the project portion filter indicator 402 indicating the current portion of the selected project that is being presented on the user interface 400, such as, for example, the clusters listing window 422 of the selected project.

In some examples, the clusters listing window 422 may include a listing of the clusters that are associated with the project. The listing of the clusters may be presented using individual cells for each cluster. In some examples, each cell may include an indication of a name of the cluster, a description of the cluster, an indication of the user account that created the cluster, an indication of the date the cluster was created, and/or a status indicator associated with the cluster. In some examples, the status indicator may provide an indication as to the status of the generation of the cluster, such as, for example, pending, completed, and/or failed. Additionally, or alternatively, each cell may be actionable such that when the cluster is selected, the user interface may be caused to display a cluster page corresponding to the cluster that is selected.

Figure 5A:
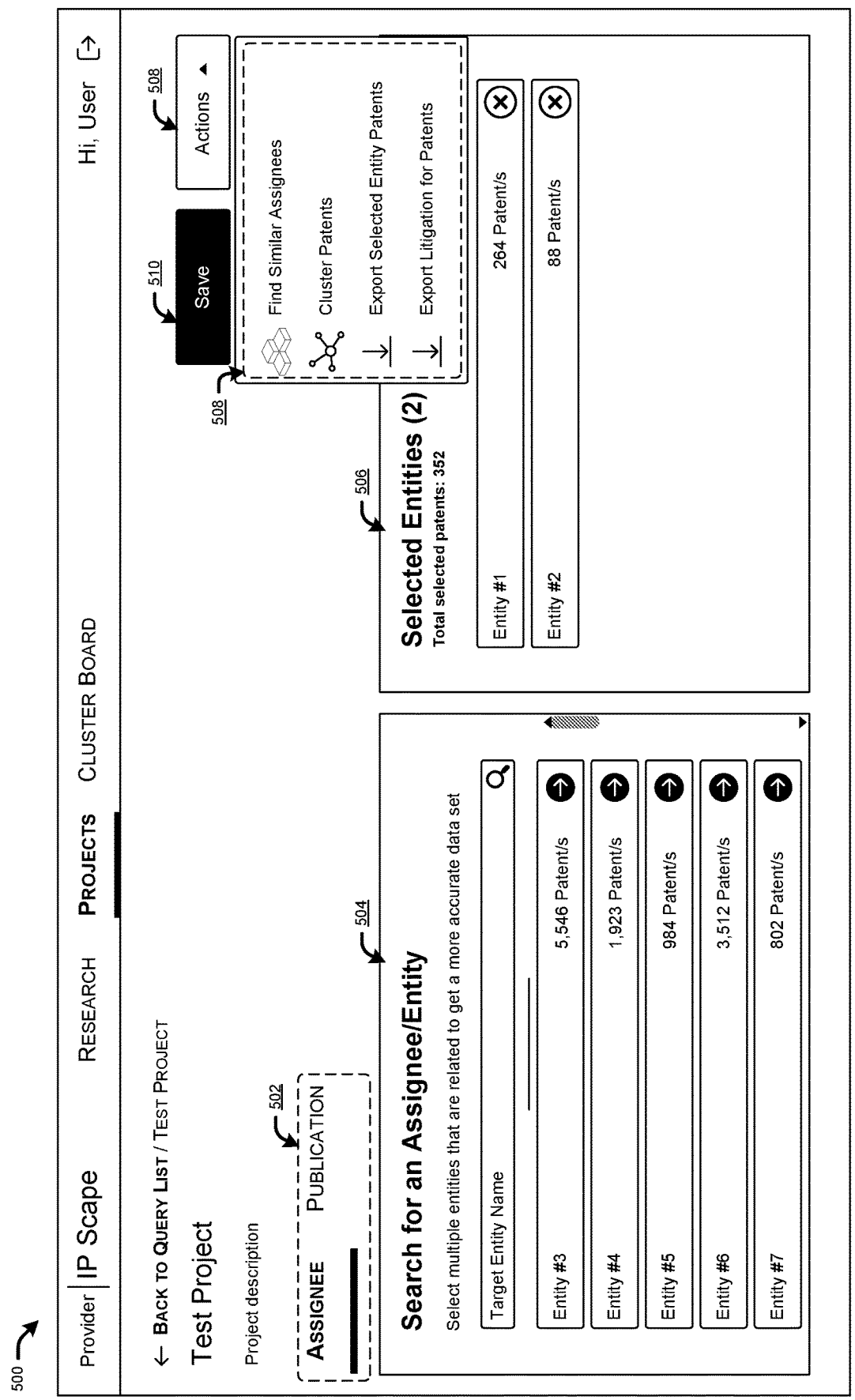
FIG. 5A illustrates an example user interface for displaying data associated with a user account representing an entity search view associated with an intellectual-property landscaping project and/or research queries and/or one or more actionable elements.
Figure 5B:
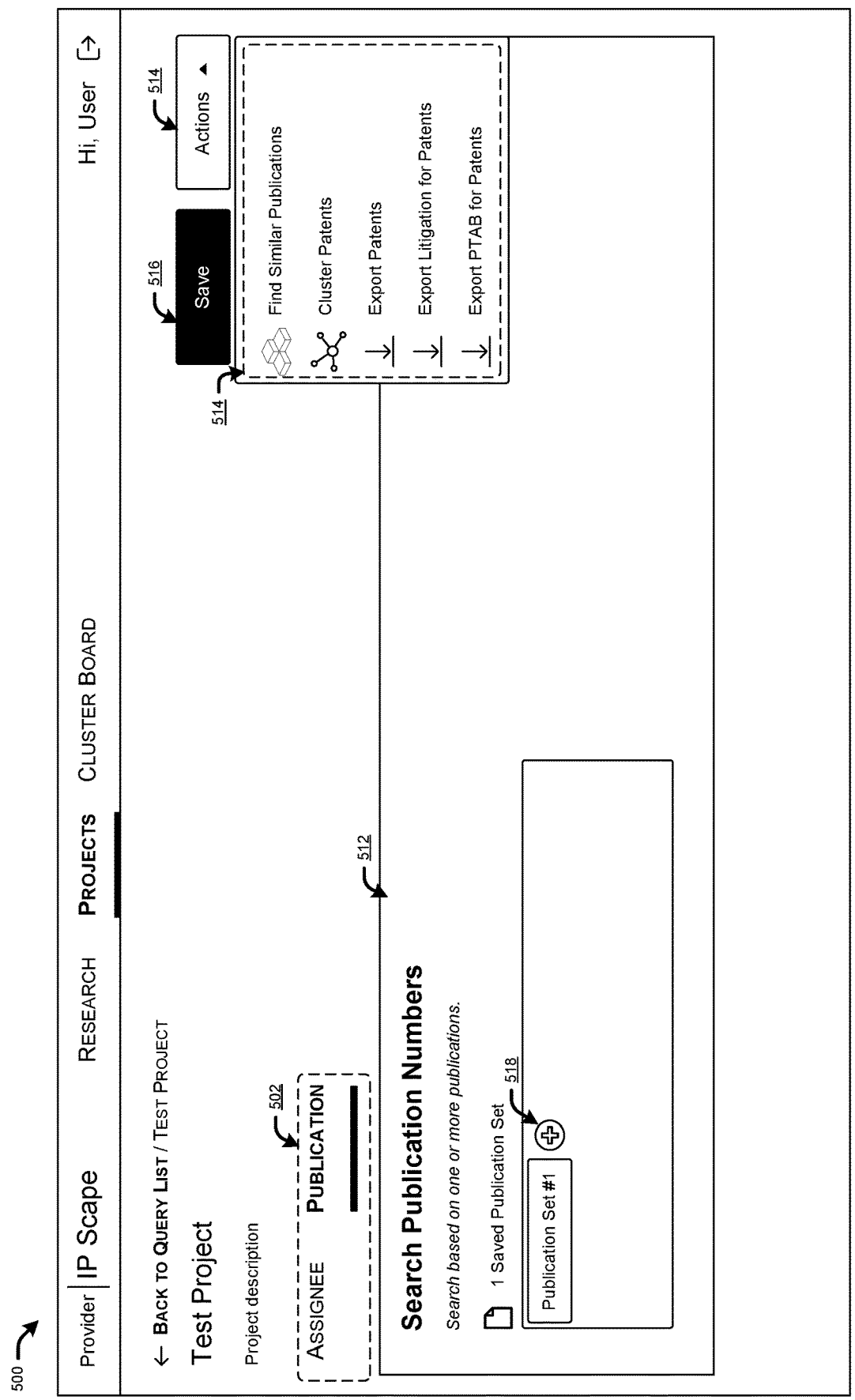
FIG. 5B illustrates an example user interface for displaying data associated with a user account representing a publication search view associated with an intellectual-property landscaping project and/or research queries and/or one or more actionable elements.

FIGS. 5A and 5B illustrate an example user interface 500 for displaying data associated with a user account representing information associated with a selected search included in an IP landscaping project. The user interface 500 may present various windows for displaying portion(s) of the information associated with the selected search corresponding to a search type indicator 502 indicating the current type of the selected search that is being presented on the user interface 500. The user interface 500 may be displayed on a display of an electronic device associated with a user account, such as, for example, the electronic device 102 as described with respect to FIG. 1 above.

In some examples, the search type indicator 502 may indicate a current type of a selected search that is being displayed on the user interface 500. For example, the search type indicator 502 may include one or more search types, such as, for example, an entity or assignee search type and/or a publication search type. In some examples, when the entity search type indicator 502 is selected, the user interface 500 may be caused to display an entity search window 504, a selected entity window 506, an actions element 508, and/or a save search element 510. Additionally, or alternatively, when the publication search type indicator 502 is selected, the user interface 500 may be caused to display a publication search window 512, an actions element 514, and/or a save search element 516.

FIG. 5A illustrates an example user interface 500 for displaying data associated with a user account representing a selected search. The data may be presented using an entity search window 504, a selected entity window 506, an actions element 508, and/or a save search element 510. Additionally, or alternatively, the user interface may include the search type indicator 502 indicating the current type of selected search that is being presented on the user interface 500.

In some examples, the entity search window 504 may include a listing of entities and/or a search element. The listing of entities may be presented using individual cells for each entity. In some examples, each cell may include an indication of a name of the entity, an indication of the number of IP assets associated with the entity, and/or a select element. In some examples, the select element may be configured such that, when selected, the entity is removed from the entity search window and is added to the selected entities window.

In some examples, the selected entity window 506 may include a listing of selected entities and/or an indication of a total number of IP assets associated with the selected entities. The listing of selected entities may be presented using individual cells for each selected entity. In some examples, each cell may include an indication of a name of the selected entity, an indication of the number of IP assets associated with the selected entity, and/or a remove element. In some examples, the remove element may be configured such that, when selected, the selected entity is removed from the listing of selected entities and is added to the listing of similar entities in the entity search window.

In some examples, the actions element 508 may include one or more sub-elements, and may be configured to perform various actions in response to user input representing selection of a particular sub-element. For example, the actions element 508 may include a find similar assignees sub-element, a cluster patents sub-element, an export selected entity patents sub-element, and/or an export litigation for patents sub-element. In some examples, the find similar assignees sub-element 508 may be configured such that, when selected, the user interface is caused to present the similar entity page. Additionally, or alternatively, the cluster patents sub-element 508 may be configured such that, when selected, the user interface is caused to present the clustering results page. Additionally, or alternatively, the export selected entity patents sub-element 508 may be configured such that, when selected, a file may be optionally downloaded by the user representing a listing of the IP assets associated with the selected entities and information associated with the one or more selected entities. Additionally, or alternatively, the export litigation for patents sub-element 508 may be configured such that, when selected, a file may be optionally downloaded by the user representing litigation information associated with the IP assets associated with the selected entities.

In some examples, the save search element 510 may be configured such that, when selected, the listing of selected entities is saved in association with the user account.

FIG. 5B illustrates an example user interface 500 for displaying data associated with a user account representing a selected search. The data may be presented using a publication search window 512, an actions element 514, a save search element 516, and/or an add publications element 518. Additionally, or alternatively, the user interface may include the search type indicator 502 indicating the current type of selected search that is being presented on the user interface 500.

In some examples, the publication search window 512 may include a search element and/or an indication of a number of the saved publications associated with the search element. In some examples, the search element may be configured to receive user input representing any number of publication numbers from 1-N, where N is any integer larger than 1. Additionally, or alternatively, the search element may be configured to receive user input representing one or more sets of publications.

In some examples, the actions element 514 may include one or more sub-elements, and may be configured to perform various actions in response to user input representing selection of a particular sub-element. For example, the actions element 514 may include a find similar publications sub-element, a cluster patents sub-element, an export patents sub-element, an export litigation for patents sub-element, and/or an export Patent Trial and Appeal Board (PTAB) for patents sub-element. In some examples, the find similar publications sub-element 514 may be configured such that, when selected, the user interface is caused to present the similar publication page. Additionally, or alternatively, the cluster patents sub-element 514 may be configured such that, when selected, the user interface is caused to present the clustering results page. Additionally, or alternatively, the export patents sub-element 514 may be configured such that, when selected, a file may be optionally downloaded by the user representing a listing of the IP assets associated with the publication numbers saved in the search element. Additionally, or alternatively, the export litigation for patents sub-element 514 may be configured such that, when selected, a file may be optionally downloaded by the user representing litigation information associated with the IP assets that are determined to be similar to the saved publication numbers included in the search element. Additionally, or alternatively, the export PTAB for patents sub-element 514 may be configured such that, when selected, a file may be optionally downloaded by the user representing PTAB record information associated with the IP assets that are determined to be similar to the saved publication numbers included in the search element.

In some examples, the save search element 516 may be configured such that, when selected, the publication numbers entered into the search element and/or the sets of publications included in the search element is saved in association with the user account.

In some examples, the add publications element 518 may be configured such that, when selected, one or more sets of publications may be added to the search element. For example, a user may upload a file containing a set of publications that they would like to base the search at least partially on. Additionally, or alternatively, the add publications element 518 may be configured to receive user input of one or more files of differing file types including publications and/or one or more identifications of publications.

Figure 6:
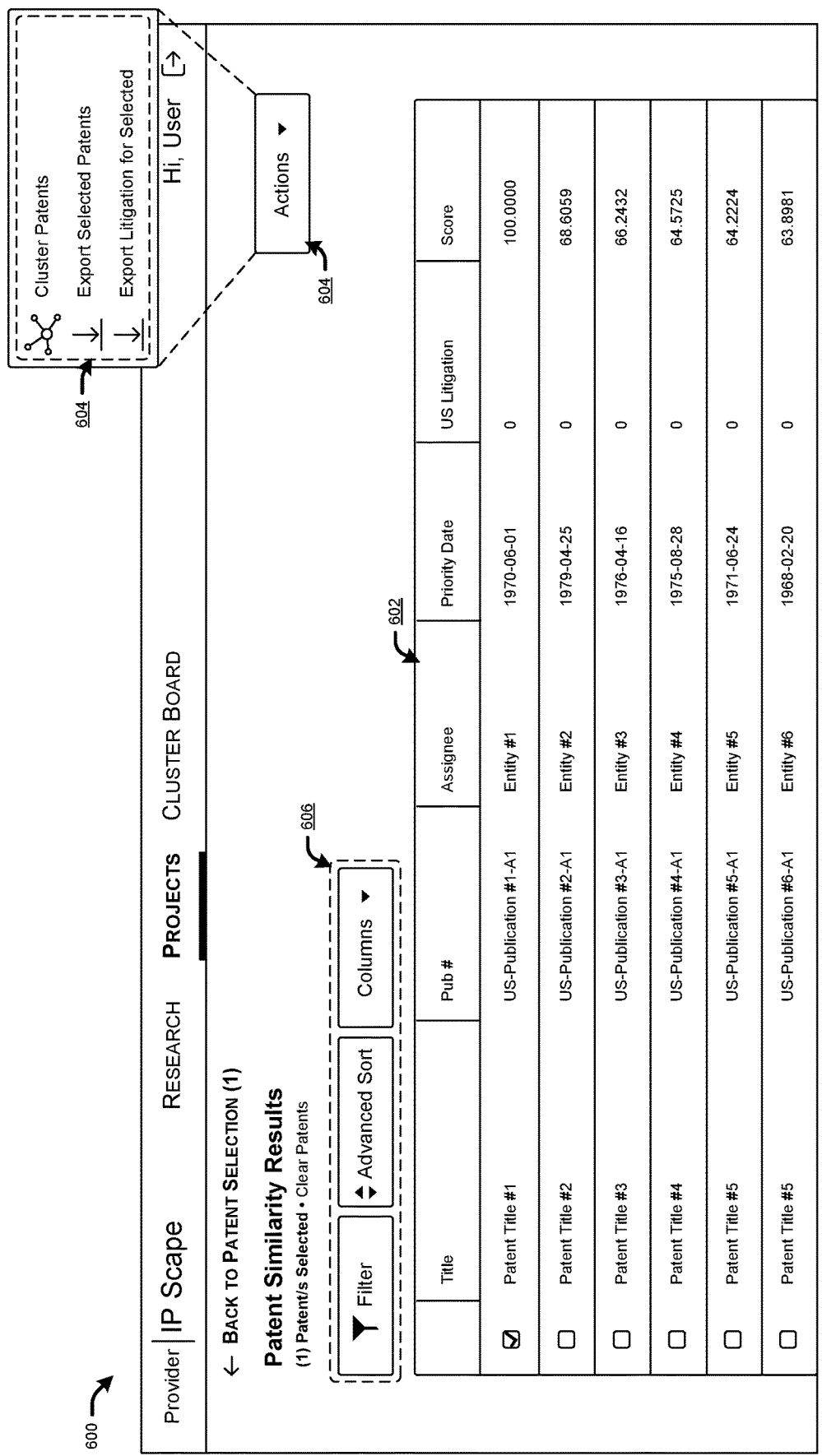
FIG. 6 illustrates an example user interface for displaying data associated with a user account representing a similar intellectual-property assets window associated with an intellectual-property landscaping project and/or research queries and/or one or more actionable elements.

FIG. 6 illustrates an example user interface 600 for displaying data associated with a user account representing selected IP asset similarity results. The data may be presented using an IP similarity results window 602, an actions element 604, and/or one or more actionable elements 606. The user interface 600 may be displayed on a display of an electronic device associated with a user account, such as, for example, the electronic device 102 as described with respect to FIG. 1 above.

In some examples, the IP similarity results window 602 may include a listing of similar publications. The listing of similar publications may be presented using individual cells for each similar publication. In some examples, each cell may include an indication of a title of the similar publication, a publication number associated with the similar publication, an indication of an entity and/or assignee associated with the similar publication, a priority date associated with the similar publication, an indication of litigation matters associated with the similar publication, a proprietary score associated with the similar publication, and/or a selection indicator.

In some examples, the actions element 604 may include one or more sub-elements, and may be configured to perform various actions in response to user input representing selection of a particular sub-element. For example, the actions element 604 may include a cluster patents sub-element, an export patents sub-element, and/or an export litigation for patents sub-element. In some examples, the cluster patents sub-element 514 may be configured such that, when selected, the user interface is caused to present the clustering results page. Additionally, or alternatively, the export patents sub-element 514 may be configured such that, when selected, a file may be optionally downloaded by the user representing a listing of the IP assets presented in the listing of similar publications and/or the selected IP assets included in the listing. Additionally, or alternatively, the export litigation for patents sub-element 514 may be configured such that, when selected, a file may be optionally downloaded by the user representing litigation information associated with the IP assets presented in the listing of similar publications and/or the selected IP assets included in the listing.

In some examples, the one or more additional elements 606 may include a filter element, a sort element, and a column sort element. In some examples, the filter element may be configured to filter the listing of similar publications. Additionally, or alternatively, the sort element may be configured to sort the listing of similar publications based upon various user selected criteria. Additionally, or alternatively, the column sort element may be configured to sort the listing of similar publications based upon a column associated with the cells.

Figure 7:
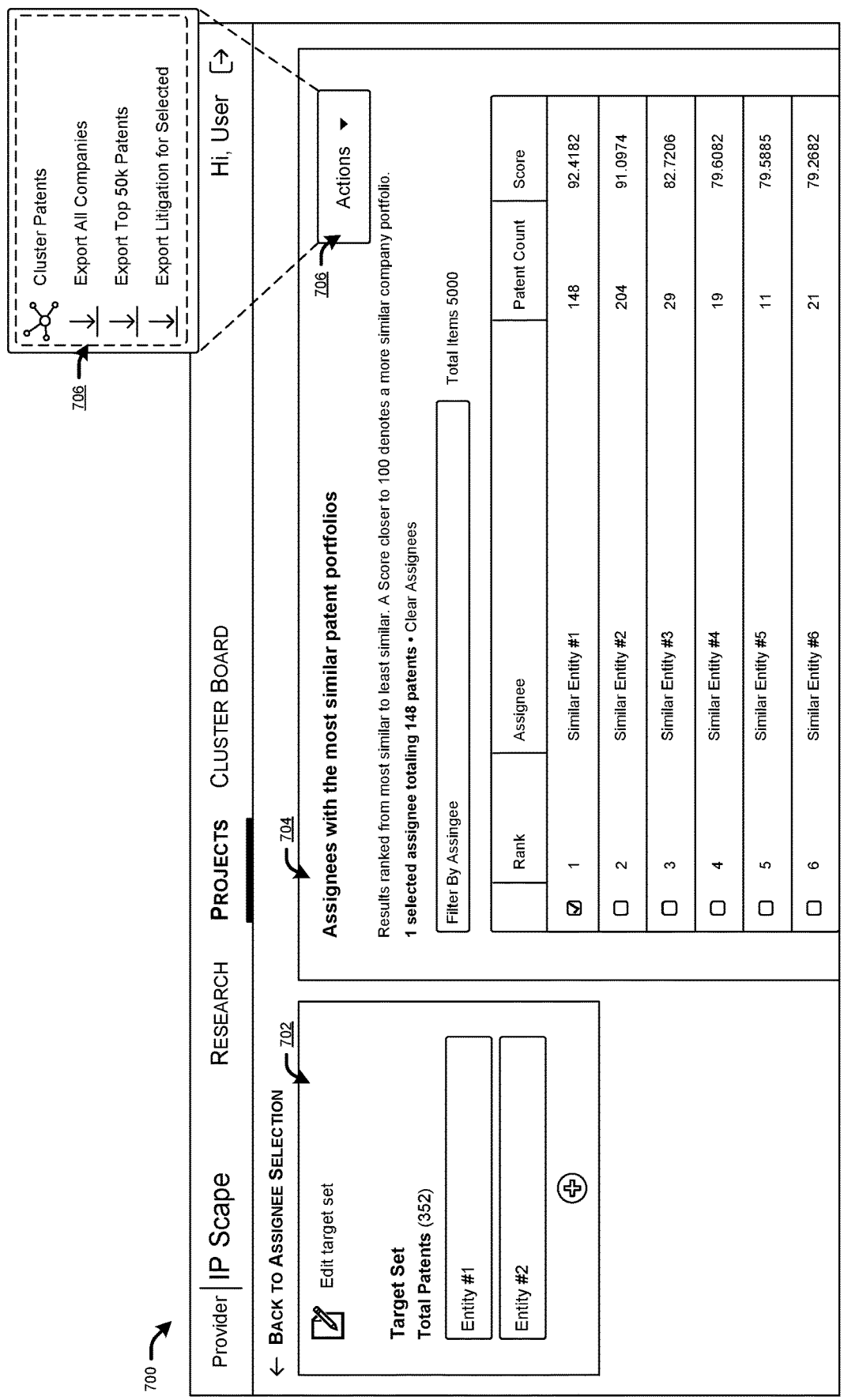
FIG. 7 illustrates an example user interface for displaying data associated with a user account representing a target entities window and a similar entities window associated with an intellectual-property landscaping project and/or research queries and/or one or more actionable elements.

FIG. 7 illustrates an example user interface 700 for displaying data associated with a user account representing selected entity similarity results. The data may be presented using a target set window 702 and/or an entity results window 704. The user interface 700 may be displayed on a display of an electronic device associated with a user account, such as, for example, the electronic device 102 as described with respect to FIG. 1 above.

In some examples, the target set window 702 may include an indication of the targeted set, including entities and/or publications, an indication of a total number of IP assets associated with the targeted set, and/or an edit target set selection element. The listing of the targeted set may be presented using individual cells for each targeted set, entity, and/or publication. In some examples, each cell may include an indication of an identification of the targeted set, entity, publication, and/or an indication of a number of IP assets that are associated with the targeted set. In some examples, the edit targeted set selection may be configured such that, when selected, the user interface may be caused to present the entity view of the search page and/or allow the user to add and/or remove entities and/or publications to the targeted set.

In some examples, the entity results window 704 may include an actions element 706. In some examples, the actions element 706 may include one or more sub-elements, and may be configured to perform various actions in response to user input representing selection of a particular sub-element. For example, the actions element 706 may include a cluster patents sub-element, an export entities sub-element, an export top 50 k patents sub-element, and/or an export litigation for selected similar entities sub-element. In some examples, the cluster patents sub-element 706 may be configured such that, when selected, the user interface is caused to present the clustering results page. Additionally, or alternatively, the export entities sub-element 706 may be configured such that, when selected, a file may be optionally downloaded by the user representing the listing of the similar entities. Additionally, or alternatively, the export top 50 k patents sub-element 706 may be configured such that, when selected, a file may be optionally downloaded by the user representing a listing of 50,000 IP assets associated with the top ranked similar entities. Additionally, or alternatively, the export litigation for selected similar entities sub-element 706 may be configured such that, when selected, a file may be optionally downloaded by the user representing litigation information associated with the IP assets of the selected similar entities. Additionally, or alternatively, the entity results window 704 may include a listing of similar entities, a filter element, and/or an actions element. The listing of similar entities may be presented using individual cells for each similar entity. In some examples, each cell may include an indication of a ranking of the similar entity with respect to the other similar entities, an indication of an identification of the similar entity, a number of IP assets associated with the similar entity, and/or a proprietary score associated with the similar entity. In some examples, the filter element may be configured to receive a user input and filter the listing of the similar entities corresponding to text string input into the filter element.

Figure 8:
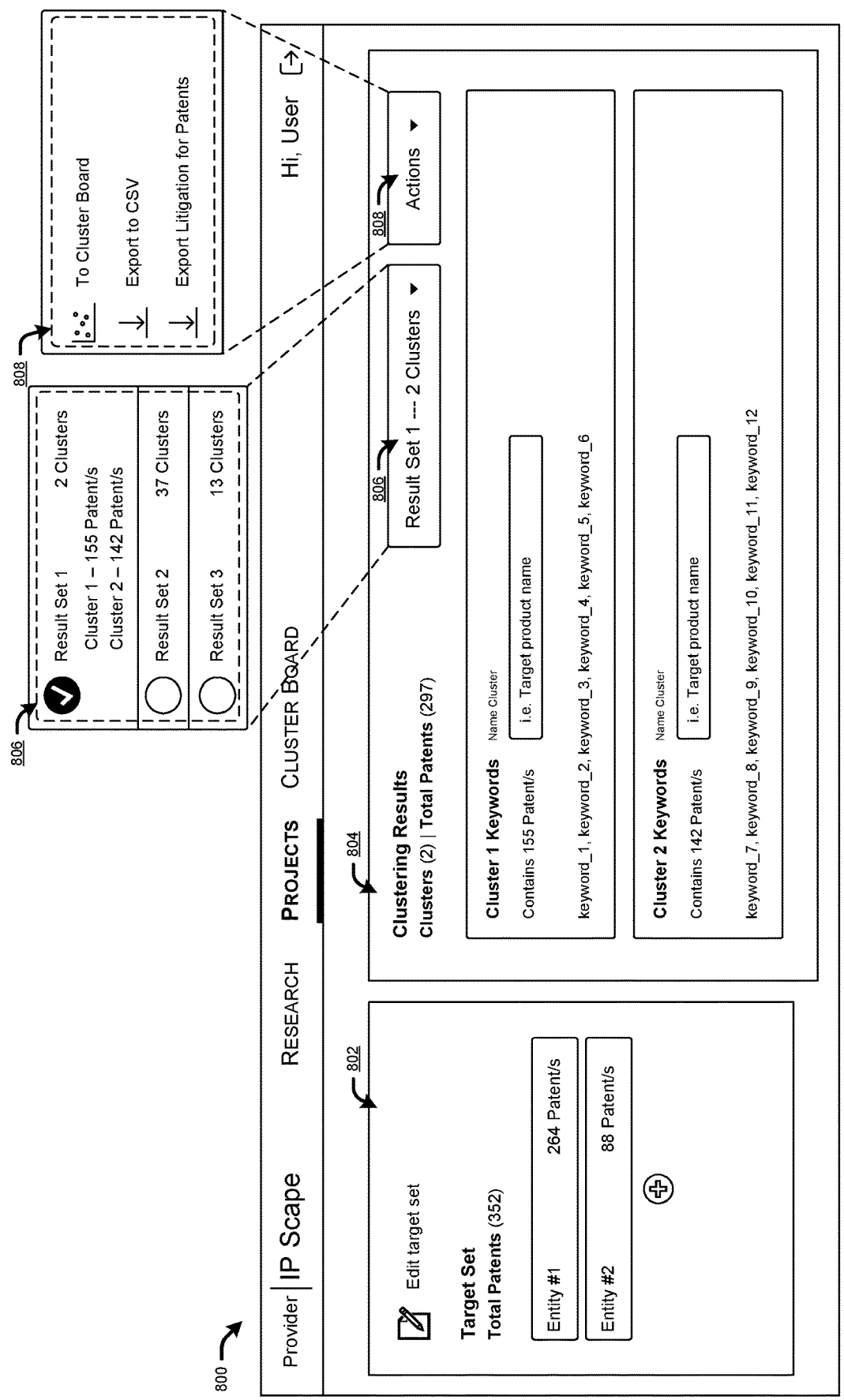
FIG. 8 illustrates an example user interface for displaying data associated with a user account representing a target entities window and a clustering results window associated with an intellectual-property landscaping project and/or research queries and/or one or more actionable elements.

FIG. 8 illustrates an example user interface 800 for displaying data associated with a user account representing selected clustering results. The data may be presented using a target set window 802 and/or a clustering results window 804. The user interface 800 may be displayed on a display of an electronic device associated with a user account, such as, for example, the electronic device 102 as described with respect to FIG. 1 above.

In some examples, the target set window 802 may include an indication of the targeted set, including entities and/or publications, an indication of a total number of IP assets associated with the targeted set, and/or an edit target set selection element. The listing of the targeted set may be presented using individual cells for each targeted set, entity, and/or publication. In some examples, each cell may include an indication of an identification of the targeted set, entity, publication, and/or an indication of a number of IP assets that are associated with the targeted set. In some examples, the edit targeted set selection may be configured such that, when selected, the user interface may be caused to present the entity view of the search page and/or allow the user to add and/or remove entities and/or publications to the targeted set.

In some examples, the clustering results window 804 may include a results set element 806 and/or an actions element 808. In some examples, the results set element 806 may include one or more selectable result sets and may be configured to present one or more clusters in the clustering results window 804 that correspond to a selected result set of the one or more selectable result sets. Additionally, or alternatively, the actions element 808 may include one or more sub-elements, and may be configured to perform various actions in response to user input representing selection of a particular sub-element. For example, the actions element 808 may include a cluster board sub-element, an export to Comma Separated Values (CSV) file element, and/or an export litigation for patents sub-element. In some examples, the cluster board sub-element 808 may be configured such that, when selected, the user interface may be caused to present the cluster board page. Additionally, or alternatively, the export to CSV file sub-element 808 may be configured such that, when selected, a file may be optionally downloaded by the user including a representation of the clusters in a .CSV file format. Additionally, or alternatively, the export litigation for patents sub-element 808 may be configured such that, when selected, a file may be optionally downloaded by the user representing litigation information associated with the IP assets included in the clusters of the selected result set. Additionally, or alternatively, the clustering results window 804 may include information associated with the selected result set, one or more cluster sub-windows, a result set selector, and/or an actions element. In some examples, the information associated with the selected result set may include an indication of the selected result set, an indication of the number of clusters associated with the selected result set, and/or an indication of a total number of IP assets associated with the clusters included in the selected result set. In some examples, each of the cluster sub-windows may include an indication of the cluster number, a total number of IP assets associated with the cluster, one or more keywords associated with the clusters, and/or a name cluster field configured to receive a user input to specify a name of the cluster.

Figure 9:
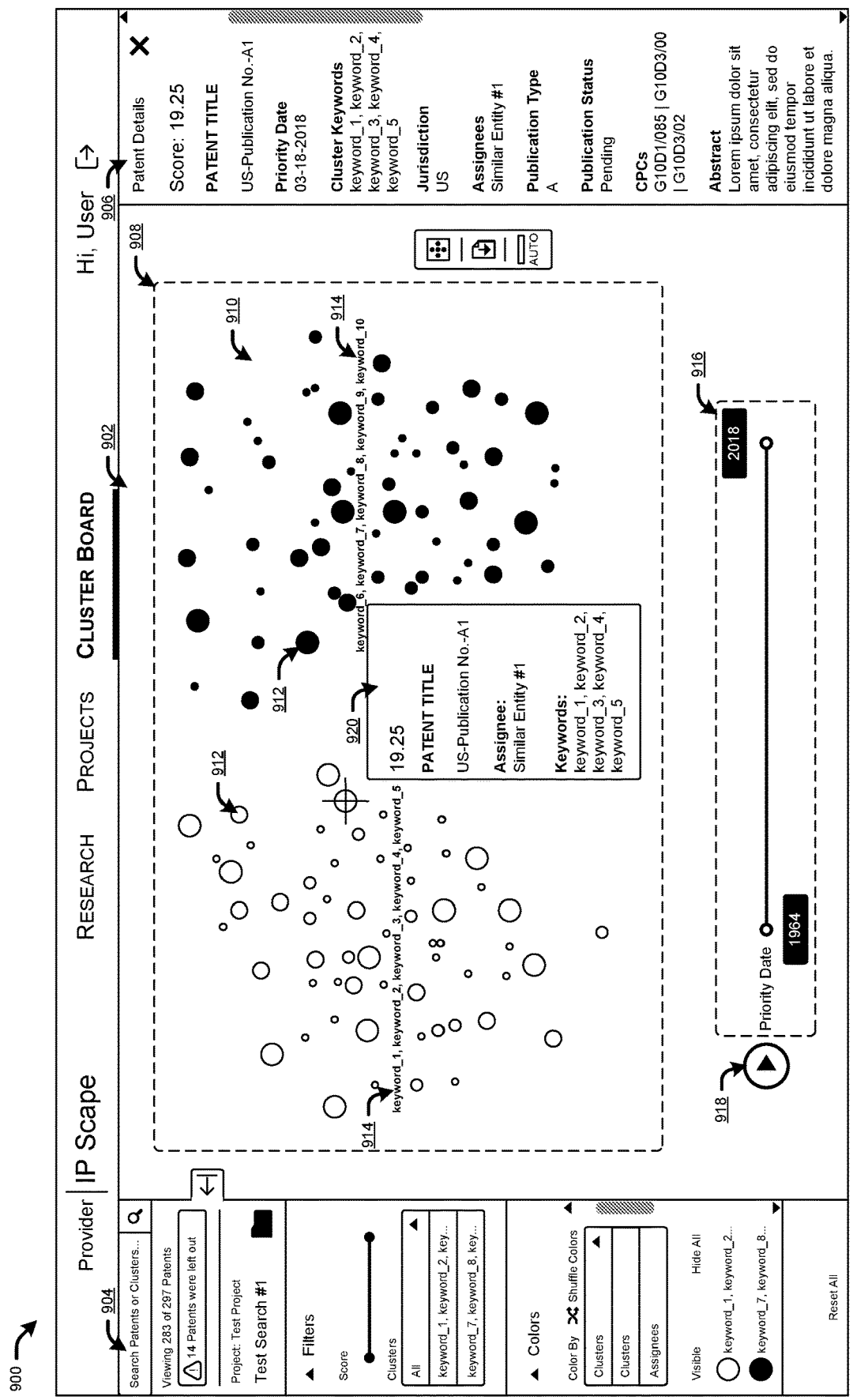
FIG. 9 illustrates an example user interface for displaying data representing an interactive graphical element configured as a visual representation of a targeted intellectual-property landscape, one or more informational overlay windows, and/or one or more actionable elements.

FIG. 9 illustrates an example user interface 900 for displaying data associated with a user account representing a spatial representation of cluster(s) included in a selected result set and/or included in a user-defined result set. The data may be presented using an interactive graphical element 902, a filters overlay window 904, an IP asset overlay window 906, and/or a cluster overlay window 906. The user interface 900 may be displayed on a display of an electronic device associated with a user account, such as, for example, the electronic device 102 as described with respect to FIG. 1 above.

In some examples, the interactive graphical element 902 may include a spatial representation 908 of the clusters. In some examples, the spatial representation 908 may include a background 910 represented by white space, graphical indicators 912 associated with respective IP assets included in the clusters, keyword sets 914 associated with respective clusters included in the result set, a slider filter control 916, an animation sequence element 918, and/or a quick information overlay window 920. In some examples, the graphical indicators 912 may be represented as dots having a size corresponding to the relevance of the associated IP asset with respect to the other IP assets included in the cluster. It should be appreciated that the interactive graphical element 902 may include more graphical indicators 912 than indicated by the reference numerals. Additionally, or alternatively, the graphical indicators 912 may be color coded, such that IP assets that are included in a cluster of the selected result set may be represented by a graphical indicator 912 having a color associated with the cluster. In some examples, graphical indicators 912 belonging to separate clusters in a result set may have different colors that correspond to the respective cluster to which they belong. In some examples, the keyword sets 914 may include one or more keywords associated with a respective cluster and may be presented at a central location of the cluster. Additionally, or alternatively, the keyword set 914 may be represented in a color corresponding to the associated cluster. Additionally, or alternatively, the interactive graphical element 902 may be configured to be manipulated by various user inputs, such as, for example, a zoom action configured to enlarge or shrink the view of the interactive graphical element to a desired location of the spatial representation and/or a click and drag action configured to focus the view of the interactive graphical element 902 to a desired location of the spatial representation 908. In some examples, the slider filter control 916 may be configured to receive user input representing a lower bound and/or an upper bound associated with a priority date and/or proprietary score associated with the IP assets included in the clusters of the selected result set. In some examples, the animation sequence element 918 may be configured such that, when selected, the interactive graphical element may be caused to display an animated view of the spatial representation of the clusters. For example, the animated view may be configured as a time lapse animation, such that, the graphical elements 912 included in the spatial representation may appear and/or disappear according to the range specified by the lower bound and the upper bound of the slider filter control 916. Additionally, or alternatively, the animated view may be configured as a time lapse animation, such that, the graphical elements 912 included in the spatial representation may change color according to the assignee of the IP asset associated with a graphical element 912, such that, the time lapse animation may reflect the mergers and/or acquisitions associated with one or more entities over time. In some examples, the quick information overlay window 920 may be displayed in response to a user hovering over a graphical element 912 in the spatial representation. The quick information window may include at least a portion of the information included in the IP asset overlay window 906.

In some examples, the filters overlay window 904 may include a search element configured to allow a user to search for an IP asset and/or a cluster, an indication of a number of IP assets included in the clusters, an indication of the IP assets visible on the current view of the spatial representation (e.g., the graphical elements in view), an indication of a number of IP assets that are included in the clusters but not presented on the interactive graphical element, a project selection control, a score filter slider, a cluster filter element, and/or a cluster color selector. In some examples, the project selection control may be configured such that, when selected, a user may select a project to visualize on the interactive graphical element representing the IP asset landscape. In some examples, the score filter slider may include a lower bound control and/or an upper bound control associated with a proprietary score associated with the IP assets included in the clusters of the selected result set. In some examples, the cluster filter element may be configured such that, when a cluster is selected, the selected cluster may be configured to appear and/or disappear from the spatial representation. In some examples, the cluster color selector may be configured to allow a user to change the colors associated with respective clusters of the selected result set.

In some examples, the IP asset overlay window 906 may be displayed in response to user input representing a selection of a graphical element in the spatial representation. The IP asset overlay window 906 may include information associated with a selected IP asset and/or a proprietary score associated with a selected IP asset and generated by the IP landscaping platform. Additionally, or alternatively, the IP asset overlay window 906 may be configured as a cluster overlay window 906. In some examples, the cluster overlay window 906 may be displayed in response to user input representing a search query indicating an identification of a cluster. The cluster overlay window 906 may include information associated with the cluster, such as, for example, an indication of the color associated with the cluster, an indication of the keyword set associated with the cluster, a number of patents associated with the cluster, and an average of the proprietary scores associated with the IP assets included in the cluster and generated by the IP landscaping platform.

Figure 10:
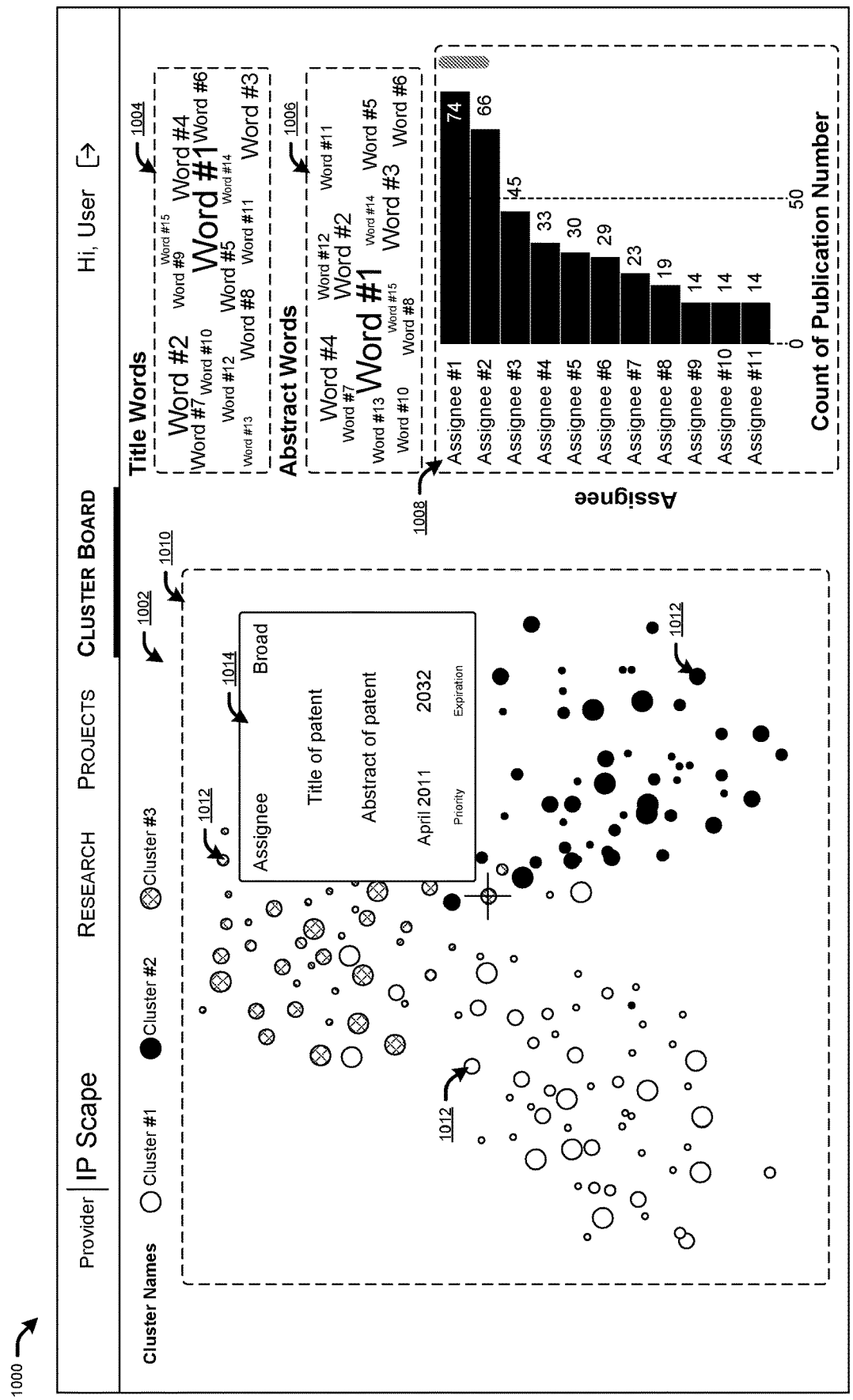
FIG. 10 illustrates an example user interface for displaying data representing an interactive graphical element configured as a visual representation of a targeted intellectual-property landscape, one or more word cloud windows, and/or an assignee publication count window.

FIG. 10 illustrates an example user interface 1000 for displaying data associated with a user account representing a spatial representation of cluster(s) that may be included in a selected result set and/or included in a user-defined result set. The data may be presented using an interactive graphical element 1002, a title word cloud 1004, an abstract word cloud 1006, and/or an assignee publication count window 1008. The user interface 1000 may be displayed on a display of an electronic device associated with a user account, such as, for example, the electronic device 102 as described with respect to FIG. 1 above. Additionally, or alternatively, the interactive graphical element 1002 may include any number of the features of the interactive graphical element 902 described above with respect to FIG. 9.

In some examples, the interactive graphical element 1002 may include a spatial representation of the clusters 1010 and/or one or more cluster filter elements. In some examples, the cluster filter elements may be represented by a name of the cluster and/or keywords associated with the cluster. Additionally, or alternatively, the cluster filter elements may be configured such that, when selected, graphical indicators 1012 associated with the selected cluster may appear and/or disappear on the interactive graphical element 1002 accordingly. In some examples, the spatial representation 1010 may include a background represented by white space, graphical indicators 1012 associated with respective IP assets included in the clusters, and/or a quick information overlay window 1014. Additionally, or alternatively, the spatial representation 1010 may include any of the one or more features of the spatial representation 908 described above with respect to FIG. 9. In some examples, the graphical indicators 1012 may be represented as dots having a size corresponding to the relevance of the associated IP asset with respect to the other IP assets included in the cluster. It should be appreciated that the interactive graphical element 1010 may include more graphical indicators 1012 than indicated by the reference numerals. Additionally, or alternatively, the graphical indicators 1012 may be color coded, such that IP assets that are included in a cluster of the selected result set may be represented by a graphical indicator 1012 having a color associated with the cluster. In some examples, graphical indicators 1012 belonging to separate clusters in a result set may have different colors that correspond to the respective cluster to which they belong. Additionally, or alternatively, the interactive graphical element 1002 may be configured to be manipulated by various user inputs, such as, for example, a zoom action configured to enlarge or shrink the view of the interactive graphical element to a desired location of the spatial representation and/or a click and drag action configured to focus the view of the interactive graphical element 1002 to a desired location of the spatial representation 1010. In some examples, the quick information overlay window 1014 may be displayed in response to a user hovering over a graphical element 1012 in the spatial representation. The quick information window 1014 may include information associated with the IP asset corresponding to the graphical element 1012 in which the user is hovering over. In some examples, the quick information window 1014 may include an indication of the assignee associated with the IP asset, an indication as to how broad the IP asset is, such as, for example, narrow, medium, and/or broad, a title of the IP asset, the abstract of the IP asset, a priority date of the IP asset, and/or an expiration date of the IP asset.

In some examples, the title world cloud 1004 may include a word cloud generated using the words included in the respective titles of the IP assets included in the selected clusters. The title world cloud 1004 may be generated such that the words included in the word cloud grow and/or shrink depending on the frequency in which the words occur in the title of the IP assets included in the clusters. For example, a word that has the highest frequency may be presented as the largest word of the word cloud and a word that has the lowest frequency may be presented as the smallest word of the word cloud. Additionally, or alternatively, the title word cloud 1004 may be generated using any word cloud techniques. Additionally, or alternatively, the title word cloud 1004 may be configured such that, when a user hovers over a word, the frequency word is displayed to the user. Additionally, or alternatively, the title word cloud 1004 may be configured to receive user input, such that, when a word is selected, the spatial representation 1010 and/or the assignee publication count window 1008 presents only results that include the selected word. Additionally, or alternatively, a selected word from the title word cloud 1004 and a selected word from the abstract word cloud 1006 may be selected in combination to cause the spatial representation 1010 and/or the assignee publication count window 1008 to present only the results that include both of the selected words.

In some examples, the abstract word cloud 1006 may include a word cloud generated using the words included in the respective abstracts of the IP assets included in the selected clusters. The abstract world cloud 1006 may be generated such that the words included in the word cloud grow and/or shrink depending on the frequency in which the words occur in the abstract of the IP assets included in the clusters. For example, a word that has the highest frequency may be presented as the largest word of the word cloud and a word that has the lowest frequency may be presented as the smallest word of the word cloud. Additionally, or alternatively, the abstract word cloud 1006 may be generated using any word cloud techniques. Additionally, or alternatively, the abstract word cloud 1006 may be configured such that, when a user hovers over a word, the frequency word is displayed to the user. Additionally, or alternatively, the abstract word cloud 1006 may be configured to receive user input, such that, when a word is selected, the spatial representation 1010 and/or the assignee publication count window 1008 presents only results that include the selected word. Additionally, or alternatively, a selected word from the abstract word cloud 1006 and a selected word from the title word cloud 1004 may be selected in combination to cause the spatial representation 1010 and/or the assignee publication count window 1008 to present only the results that include both of the selected words.

In some examples, the assignee publication count window 1008 may include an indication of one or more of the assignees associated with the IP assets included in the clusters. Additionally, or alternatively, the assignee publication count window 1008 may include an indication of the number of IP assets included in the clusters that associated with the one or more assignees. In some examples, the assignee publication count window 1008 may include a graph to present the assignees associated with the IP assets and/or an associated count of IP assets that belong to the respective assignees and are included in the clusters. In some examples, the graph may be presented as a bar graph, a line graph, a pie chart, a table, and/or any other graph suitable for presenting the data. Additionally, or alternatively, the graph may be configured such that when a user hovers over one of the bars (or other data point representation) the user is presented with information associated with the assignee, such as, for example, the name of the assignee and/or a number of the associated IP assets. Additionally, or alternatively, the graph may be configured to receive user input. For example, the graph may be configured such that when a user selects a bar (or other data point representation) the user is presented with one or more actions. In some examples, the one or more actions may include focusing the spatial representation 1010 and/or causing the spatial representation 1010 to present only the graphical indicators 1012 that are associated with the selected assignee. Additionally, or alternatively, the one or more actions may include presenting a list of IP assets associated with the assignee, including the assignee in a particular cluster, and/or excluding the assignee from a particular cluster. In some examples, the list of IP assets associated with the assignee may be presented in a ranked manner, and based on a score associated with and indicating the overall quality of the individual IP assets.

Figure 11:
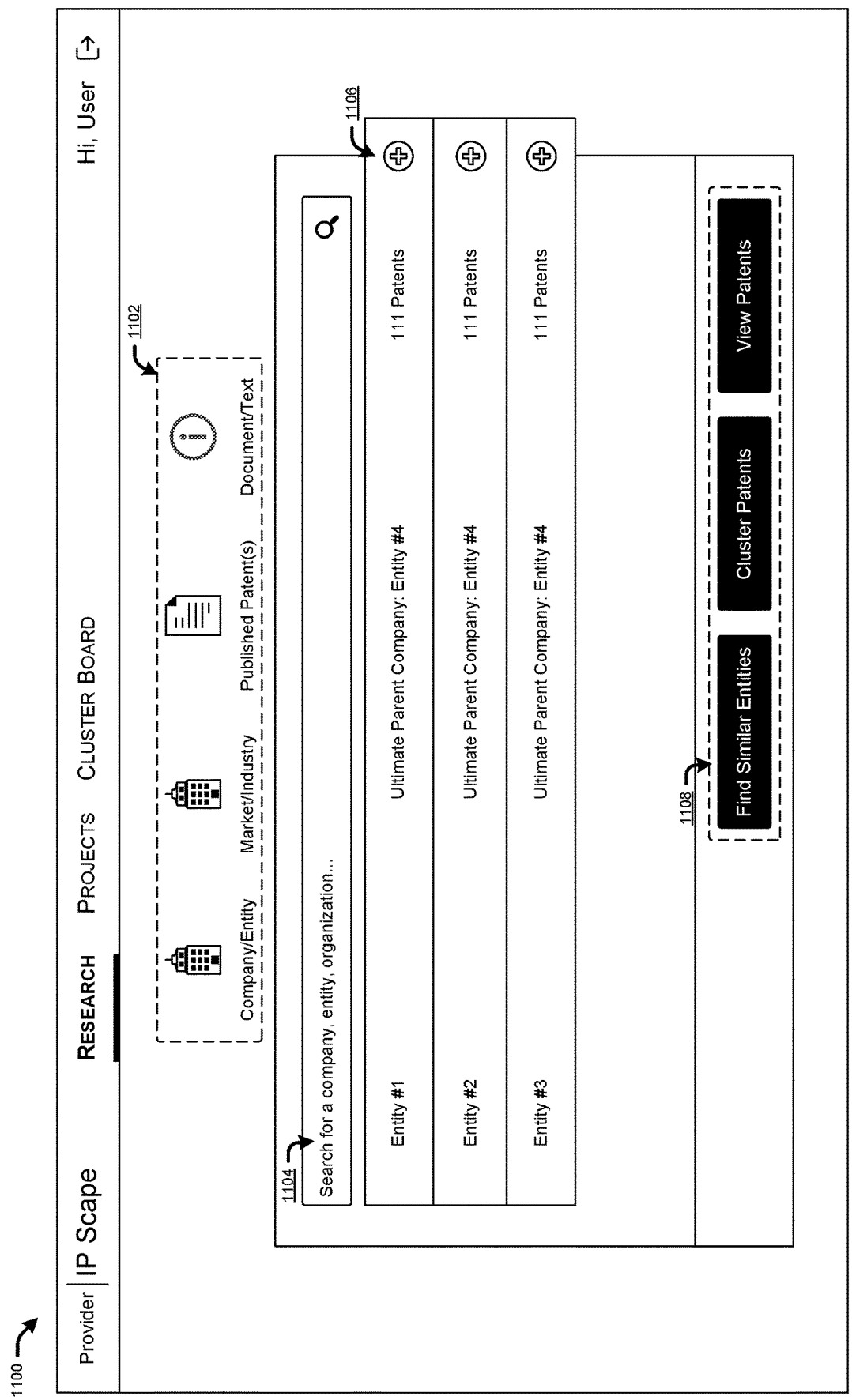
FIG. 11 illustrates an example user interface for displaying data representing a research refinement element, a research bar, a research results overlay, and/or one or more actionable elements.

FIG. 11 illustrates an example user interface 1100 configured to receive user input, such as data representing a search, and/or present data associated with the results of the search. The data may be presented and/or received using a research refinement element 1102, a research bar 1104, a research results overlay 1106, and/or one or more actionable elements 1108. The user interface 1100 may be displayed on a display of an electronic device associated with a user account, such as, for example, the electronic device 102 as described with respect to FIG. 1 above.

In some examples, the research refinement element 1102 may include one or more refinement elements configured to refine the research query, such as, for example, a company/ entity refinement element, a market/industry refinement element, a published patents refinement element, and/or a document/text refinement element. In some examples, the research refinement element 1102 may be configured such that, when one of the one or more refinement elements is selected, the research results overlay 1106 may present results corresponding to the selected refinement element.

In some examples, the research bar 1104 may be configured to receive user input representing a research query, such as, for example, text identifying an entity, company, market, industry, publication, IP asset, and/or a document. Additionally, or alternatively, the research bar 1104 may be configured to receive user input representing a search query that does not include text, such as, for example, a file, a result set, and/or any other data element including an identification of an entity, company, market, industry, publication, IP asset, and/or a document.

In some examples, the research results overlay 1106 may be configured such that initial research results associated with data entered into the research bar are displayed in the research result overlay 1106. In some examples, the initial research results may be presented using individual cells for each research result. In some examples, each cell may include an indication of an entity, an indication the ultimate parent entity associated with the entity, a number of patents associated with the entity and/or the ultimate parent entity, and/or an actionable element configured to add the entity to a selected research results listing. In some examples, the research results overlay 1106 may include the initial research results and/or selected research results. In some examples, the selected research results may be presented using individual cells substantially similar to the individual cells described above with respect to the initial research results.

In some examples, the one or more actionable elements 1108 may include a find similar entities element, a cluster patents element, and/or a view patents element. In some examples, the find similar entities element may be configured such that, when selected, the user interface 1100 is caused to present the similar entity page and/or generate a result set based at least partly on the selected research results included in the research results overlay 1106. Additionally, or alternatively, the cluster patents element may be configured such that, when selected, the user interface 1100 is caused to present the clustering results page and/or generate a result set based at least partly on the selected research results included in the research results overlay 1106 utilizing any of the clustering techniques described above. Additionally, or alternatively, the view patents element may be configured such that, when selected, the user interface 1100 is caused to present a listing of IP assets based at least partly on the selected research results included in the research results overlay 1106.

FIGS. 12-19 illustrate example processes associated with the IP landscaping platform. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-11, although the processes may be implemented in a wide variety of other environments, architectures and systems.

Figure 12:
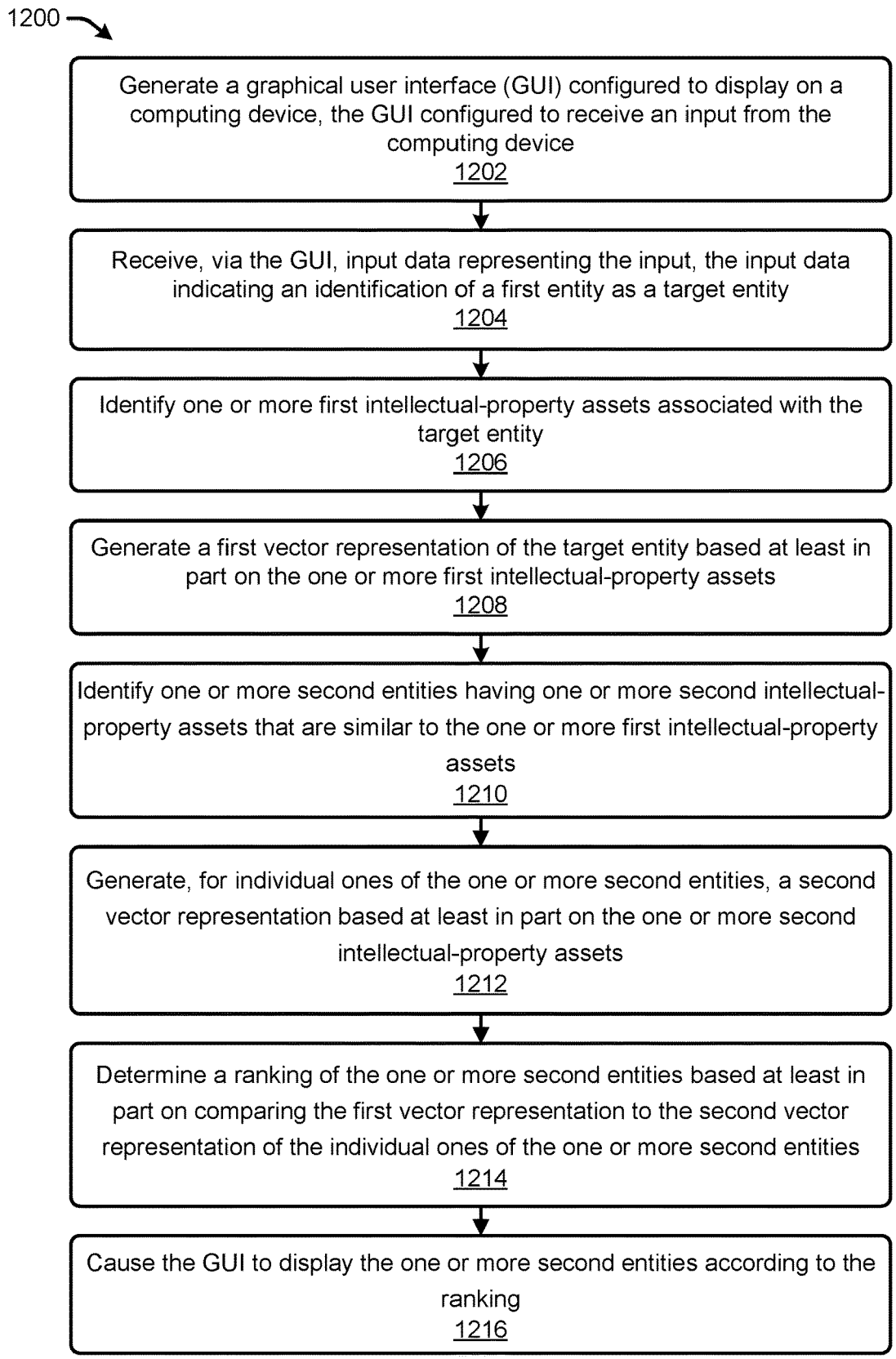
FIG. 12 illustrates an example flow diagram of an example process for utilizing a target entity and/or entities having intellectual-property assets to seed an entity search and generate a user interface configured to present entities that are similar to the target entity in a ranked manner.

FIG. 12 illustrates an example flow diagram of an example process 1200 for utilizing a target entity having IP assets to seed an entity search and generate a user interface configured to present entities that are similar to the target entity in a ranked manner. The order in which the operations or steps are described is not intended to be construed as a limitation, and any number of the described operations may be combined in any order and/or in parallel to implement process 1200. The operations described with respect to the process 1200 are described as being performed by an electronic device and/or a remote computing resource associated with the IP landscaping platform. However, it should be understood that some or all of these operations may be performed by some or all of components, devices, and/or systems described herein.

At block 1202, the process 1200 may include generating a graphical user interface (GUI) configured to display on a computing device. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1204, the process 1200 may include receiving, via the GUI, input data representing the input. In some examples, the input data may indicate an identification of a first entity as a target entity and/or one or more first entities as target entities. Additionally, or alternatively, the input data may indicate an identification of a target intellectual-property asset and/or one or more identifications of target intellectual-property assets. Additionally, or alternatively, the input data may indicate an identification of a target product and/or one or more identifications of target products.

At block 1206, the process 1200 may include identifying one or more first intellectual-property assets associated with the target entity.

At block 1208, the process 1200 may include generating a first vector representation of the target entity. In some examples, the first vector representation may be based at least in part on the one or more first intellectual-property assets. In some examples, the first vector representation may be generated using any of the techniques to generate vectors described above with respect to FIGS. 1 and 2.

At block 1210, the process 1200 may include identifying one or more second entities having one or more second intellectual-property assets that are similar to the one or more first intellectual-property assets.

At block 1212, the process 1200 may include generating, for individual ones of the one or more second entities, a second vector representation. In some examples, the second vector representation for the individual ones of the one or more second entities may be based at least in part on the one or more second intellectual-property assets. In some examples, the second vector representation may be generated using any of the techniques to generate vectors described above with respect to FIGS. 1 and 2.

At block 1214, the process 1200 may include determining a ranking of the one or more second entities. In some examples, the ranking of the one or more second entities may be based at least in part on comparing the first vector representation to the second vector representation of the individual ones of the one or more second entities.

At block 1216, the process 1200 may include causing the GUI to display the one or more second entities according to the ranking.

Additionally, or alternatively, the process 1200 may include identifying the one or more second entities based at least in part on identifying the one or more second entities having one or more second intellectual-property assets that are similar to a target intellectual-property asset.

Additionally, or alternatively, the process 1200 may include identifying a technological categorization of the target product. Additionally, or alternatively, the process 1200 may include identifying the one or more second entities based at least in part on identifying the one or more second entities having one or more second intellectual-property assets that are associated with the technological categorization of the target product.

Additionally, or alternatively, the input data is first input data. Additionally, or alternatively, the process 1200 may include receiving, via the GUI, second input data. In some examples, the second input data may indicate a selection of a second entity of the one or more second entities. Additionally, or alternatively, the process 1200 may include identifying one or more third intellectual-property assets associated with the second entity. Additionally, or alternatively, the process 1200 may include determining, for individual assets of the one or more third intellectual-property assets, if the individual asset is associated with a litigation dispute. Additionally, or alternatively, the process 1200 may include generating an exportable file including a list of the individual assets associated with the litigation dispute and information associated with the litigation dispute for the respective individual asset.

Additionally, or alternatively, the process 1200 may include generating, for individual ones of the one or more first intellectual-property assets, a third vector representation. In some examples, the third vector representation may be based at least in part on text included in at least a portion of the individual ones of the one or more first intellectual-property assets. Additionally, or alternatively, the process 1200 may include generating the first vector representation. In some examples, the first vector representation may be based at least in part on the third vector representation of the individual ones of the one or more first intellectual-property assets.

Additionally, or alternatively, the process 1200 may include identifying a technological categorization associated with the target entity. In some examples, the technological categorization associated with the target entity may be based at least in part on the one or more first intellectual-property assets. Additionally, or alternatively, the technological categorization may include a technology or a product associated with at least one of the one or more first intellectual-property assets or the target entity. Additionally, or alternatively, the process 1200 may include identifying the one or more second entities having the one or more second intellectual-property assets that are similar to the one or more first intellectual-property assets. In some examples, identifying the one or more second entities may be based at least in part on the technological categorization associated with the target entity.

Additionally, or alternatively, the process 1200 may include identifying, for individual second entities of the one or more second entities, a number of the one or more second intellectual-property assets that are associated with a respective second entity. Additionally, or alternatively, the process 1200 may include causing the GUI to display the one or more second entities according to the ranking and the number of the one or more second intellectual-property assets that are associated with the respective second entity.

Figure 13:
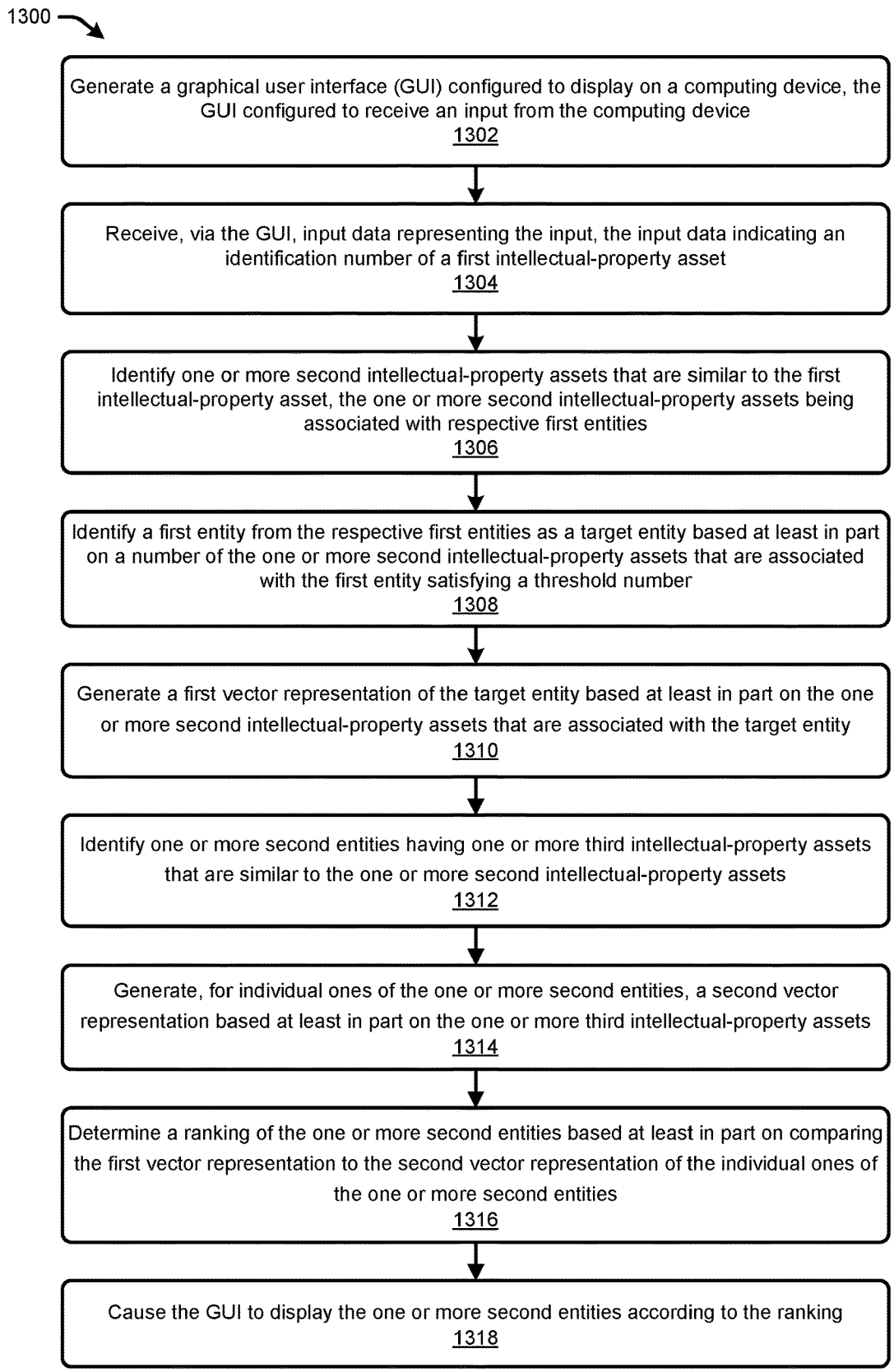
FIG. 13 illustrates an example flow diagram of an example process for utilizing target publication(s) to seed an entity search and generate a user interface configured to present entities having intellectual-property assets similar to the target publication in a ranked manner.

FIG. 13 illustrates an example flow diagram of an example process 1300 for utilizing a target publication to seed an entity search and generate a user interface configured to present entities having intellectual-property assets similar to the target publication in a ranked manner. The order in which the operations or steps are described is not intended to be construed as a limitation, and any number of the described operations may be combined in any order and/or in parallel to implement process 1300. The operations described with respect to the process 1300 are described as being performed by an electronic device and/or a remote computing resource associated with the IP landscaping platform. However, it should be understood that some or all of these operations may be performed by some or all of components, devices, and/or systems described herein.

At block 1302, the process 1300 may include generating a graphical user interface (GUI) configured to display on a computing device. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1304, the process 1300 may include receiving, via the GUI, input data representing the input. In some examples, the input data may indicate an identification number of a first intellectual-property asset. Additionally, or alternatively, the input data may indicate an identification of a target entity. Additionally, or alternatively, the input data may indicate an identification of a target product.

At block 1306, the process 1300 may include identifying one or more second intellectual-property assets that are similar to the first intellectual-property asset. In some examples, the one or more second intellectual-property assets may be associated with respective first entities.

At block 1308, the process 1300 may include identifying a first entity from the respective first entities as a target entity. In some examples, identifying the first entity from the respective first entities as a target entity may be based at least in part on a number of the one or more second intellectual-property assets that are associated with the first entity satisfying a threshold number. Additionally, or alternatively, identifying the first entity from the respective first entities as a target entity may be based at least in part on determining that the first entity is associated with the most favorable number of the one or more second intellectual-property assets. In some examples, the most favorable number of the one or more second intellectual-property assets may be a number of the one or more second intellectual-property assets that is greater than the additional numbers of the one or more second intellectual-property assets. Additionally, or alternatively, the most favorable number of the one or more second intellectual-property assets may be a number of the one or more second intellectual-property assets that is less than the additional numbers of the one or more second intellectual-property assets.

At block 1310, the process 1300 may include generating a first vector representation of the target entity. In some examples, the first vector representation of the target entity may be based at least in part on the one or more second intellectual-property assets that are associated with the target entity. In some examples, the first vector representation may be generated using any of the techniques to generate vectors described above with respect to FIGS. 1 and 2.

At block 1312, the process 1300 may include identifying one or more second entities having one or more third intellectual-property assets that are similar to the one or more second intellectual-property assets.

At block 1314, the process 1300 may include generating, for individual ones of the one or more second entities, a second vector representation. In some examples, the second vector representation for the individual ones of the one or more second entities may be based at least in part on the one or more third intellectual-property assets. In some examples, the second vector representation may be generated using any of the techniques to generate vectors described above with respect to FIGS. 1 and 2.

At block 1316, the process 1300 may include determining a ranking of the one or more second entities. In some examples, the ranking of the one or more second entities may be based at least in part on comparing the first vector representation to the second vector representation of the individual ones of the one or more second entities.

At block 1318, the process 1300 may include causing the GUI to display the one or more second entities according to the ranking.

Figure 14:
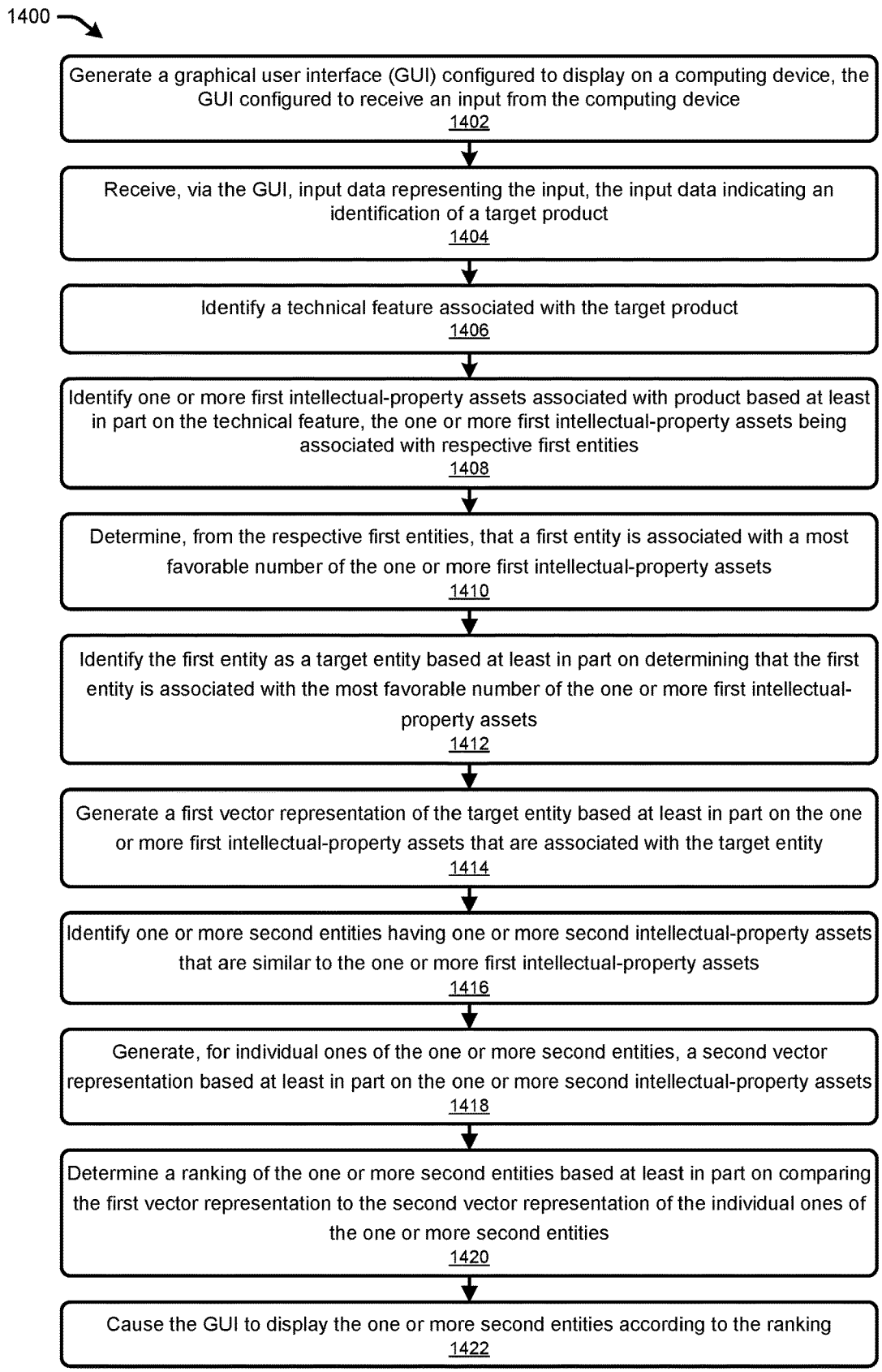
FIG. 14 illustrates an example flow diagram of an example process for utilizing a target product to seed an entity search and generate a user interface configured to present entities having intellectual-property assets that are similar to technologies associated with the target product in a ranked manner.

FIG. 14 illustrates an example flow diagram of an example process 1400 for utilizing a target product to seed an entity search and generate a user interface configured to present entities having intellectual-property assets that are similar to technologies associated with the target product in a ranked manner. The order in which the operations or steps are described is not intended to be construed as a limitation, and any number of the described operations may be combined in any order and/or in parallel to implement process 1400. The operations described with respect to the process 1400 are described as being performed by an electronic device and/or a remote computing resource associated with the IP landscaping platform. However, it should be understood that some or all of these operations may be performed by some or all of components, devices, and/or systems described herein.

At block 1402, the process 1400 may include generating a graphical user interface (GUI) configured to display on a computing device. In some examples, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1404, the process 1400 may include receiving, via the GUI, input data representing the input. In some examples, the input data may indicate an identification of a target product. Additionally, or alternatively, Additionally, or alternatively, the input data may indicate an identification of a target intellectual-property asset. Additionally, or alternatively, the input data may indicate an identification of a target entity.

At block 1406, the process 1400 may include identifying a technical feature associated with the target product. In some examples, the technical feature may be included in a description associated with the target product and/or a user manual.

At block 1408, the process 1400 may include identifying one or more first intellectual-property assets associated with product. In some examples, the one or more first intellectual-property assets may be based at least in part on the technical feature. Additionally, or alternatively, the one or more first intellectual-property assets may be associated with respective first entities.

At block 1410, the process 1400 may include determining, from the respective first entities, that a first entity is associated with a most favorable number of the one or more first intellectual-property assets. In some examples, the most favorable number of the one or more first intellectual-property assets may be a number of the one or more first intellectual-property assets that is greater than the additional numbers of the one or more first intellectual-property assets. Additionally, or alternatively, the most favorable number of the one or more first intellectual-property assets may be a number of the one or more first intellectual-property assets that is less than the additional numbers of the one or more first intellectual-property assets.

At block 1412, the process 1400 may include identifying the first entity as a target entity. In some examples, identifying the first entity as the target entity may be based at least in part on determining that the first entity is associated with the most favorable number of the one or more first intellectual-property assets. Additionally, or alternatively, identifying the first entity as a target entity may be based at least in part on a number of the one or more first intellectual-property assets that are associated with the first entity satisfying a threshold number.

At block 1414, the process 1400 may include generating a first vector representation of the target entity. In some examples, the first vector representation of the target entity may be based at least in part on the one or more first intellectual-property assets that are associated with the target entity. In some examples, the first vector representation may be generated using any of the techniques to generate vectors described above with respect to FIGS. 1 and 2.

At block 1416, the process 1400 may include identifying one or more second entities having one or more second intellectual-property assets that are similar to the one or more first intellectual-property assets.

At block 1418, the process 1400 may include generating, for individual ones of the one or more second entities, a second vector representation. In some examples, the second vector representation for the one or more second entities may be based at least in part on the one or more second intellectual-property assets. In some examples, the second vector representation may be generated using any of the techniques to generate vectors described above with respect to FIGS. 1 and 2.

At block 1420, the process 1400 may include determining a ranking of the one or more second entities. In some examples, the ranking may be based at least in part on comparing the first vector representation to the second vector representation of the individual ones of the one or more second entities.

At block 1422, the process 1400 may include causing the GUI to display the one or more second entities according to the ranking.

Figure 15:
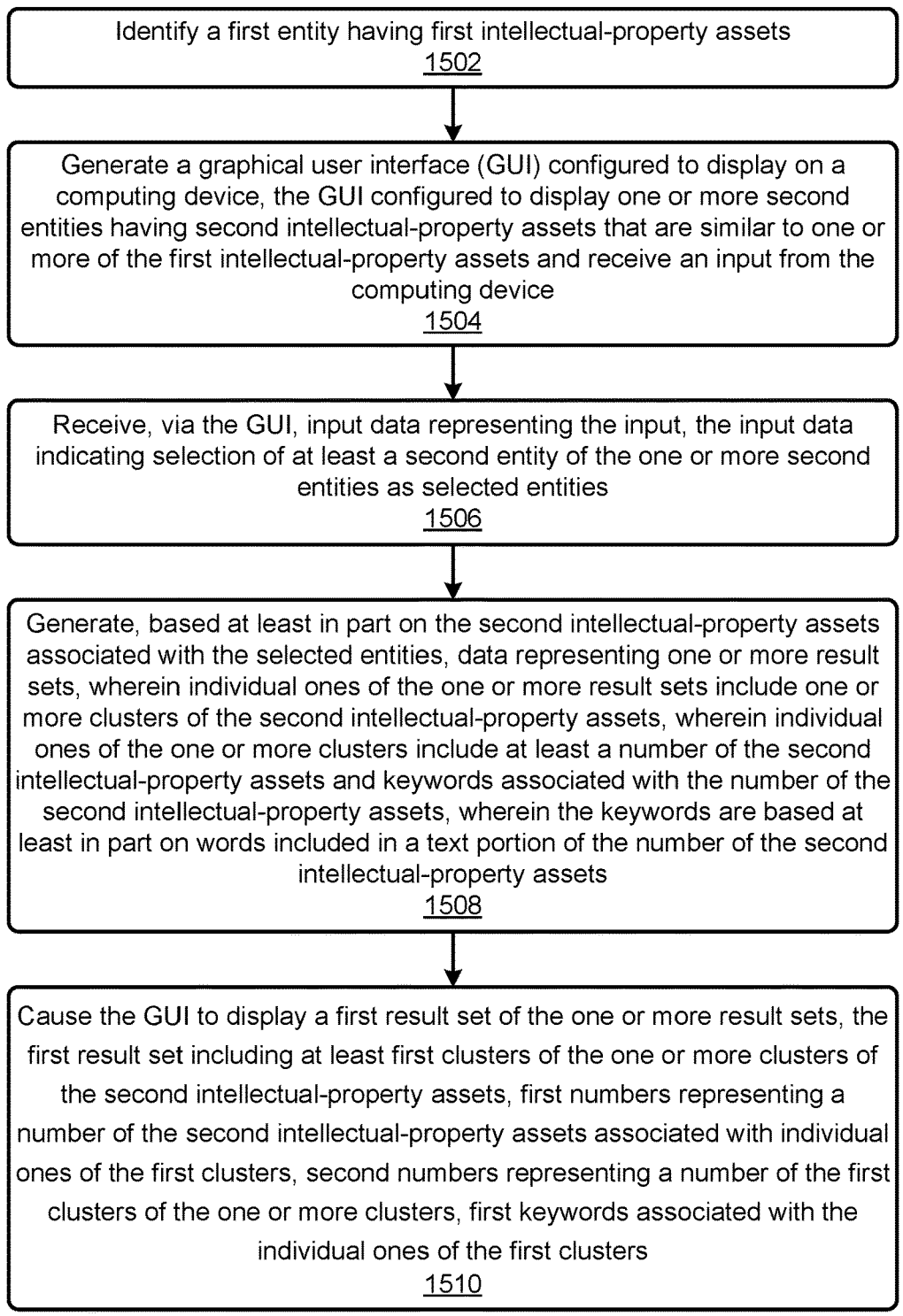
FIG. 15 illustrates an example flow diagram of an example process for generating data representing result sets that include clusters of intellectual-property assets that are determined to be similar to a target entity and presenting the clusters on a graphical user interface.

FIG. 15 illustrates an example flow diagram of an example process 1500 for generating data representing result sets that include clusters of intellectual-property assets that are determined to be similar to a target entity and presenting the clusters on a graphical user interface. The order in which the operations or steps are described is not intended to be construed as a limitation, and any number of the described operations may be combined in any order and/or in parallel to implement process 1500. The operations described with respect to the process 1500 are described as being performed by an electronic device and/or a remote computing resource associated with the IP landscaping platform. However, it should be understood that some or all of these operations may be performed by some or all of components, devices, and/or systems described herein.

At block 1502, the process 1500 may include identifying a first entity having first intellectual-property assets.

At block 1504, the process 1500 may include generating a graphical user interface (GUI) configured to display on a computing device. In some examples, the GUI may be configured to display one or more second entities having second intellectual-property assets that are similar to one or more of the first intellectual-property assets. Additionally, or alternatively, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1506, the process 1500 may include receiving, via the GUI, input data representing the input. In some examples, the input data may indicate selection of at least a second entity of the one or more second entities as selected entities.

At block 1508, the process 1500 may include generating data representing one or more result sets. In some examples, the data representing the one or more result sets may be based at least in part on the second intellectual-property assets associated with the selected entities. Additionally, or alternatively, individual ones of the one or more result sets may include one or more clusters of the second intellectual-property assets. Additionally, or alternatively, individual ones of the one or more clusters may include a number of the second intellectual-property assets. Additionally, or alternatively, individual ones of the one or more clusters may include keywords associated with the number of the second intellectual-property assets. In some examples, the keywords may be based at least in part on words included in a text portion of the number of the second intellectual-property assets.

At block 1510, the process 1500 may include causing the GUI to display a first result set of the one or more result sets. In some examples, the first result set may include first clusters of the one or more clusters of the second intellectual-property assets. Additionally, or alternatively, the first result set may include first numbers representing a number of the second intellectual-property assets associated with individual ones of the first clusters. Additionally, or alternatively, the first result set may include second numbers representing a number of the first clusters of the one or more clusters. Additionally, or alternatively, the first result set may include first keywords associated with the individual ones of the first clusters. Additionally, or alternatively, the GUI may display additional elements for interacting with the first result set.

Additionally, or alternatively, the process 1500 may include identifying, from the second intellectual-property assets, foreign intellectual-property assets and/or design intellectual-property assets as third intellectual-property assets. Additionally, or alternatively, the process 1500 may include removing the third intellectual-property assets from the second intellectual-property assets prior to generating the data representing the one or more result sets.

Additionally, or alternatively, the process 1500 may include generating, for individual ones of the first intellectual-property assets, a first vector representation. In some examples, the first vector representation may be based at least in part on first text included in respective first intellectual-property assets. Additionally, or alternatively, the process 1500 may include generating, for individual ones of the second intellectual-property assets, a second vector representation. In some examples, the second vector representation may be based at least in part on second text included in respective second intellectual-property assets. Additionally, or alternatively, the process 1500 may include determining that the second intellectual-property assets are similar to the first intellectual-property assets. In some examples, determining that the second intellectual-property assets are similar to the first intellectual-property assets may be based at least in part on comparing the first vector representation of the individual ones of the first intellectual-property assets to the second vector representation of the individual ones of the individual ones of the second intellectual-property assets.

Additionally, or alternatively, the first clusters may include a first cluster including first clustered intellectual-property assets from the second intellectual-property assets and/or a second cluster including second clustered intellectual-property assets from the second intellectual property assets. Additionally, or alternatively, at least one of the first clustered intellectual-property assets may be different from at least one of the second clustered intellectual-property assets. Additionally, or alternatively, at least one of the first clustered intellectual-property assets may be duplicative of at least one of the second clustered intellectual-property assets.

Additionally, or alternatively, the individual ones of the one or more result sets may be associated with levels of granularity. Additionally, or alternatively, the process 1500 may include determining that the first result set is associated with a first level of granularity. Additionally, or alternatively, the process 1500 may include generating the first clusters of the one or more clusters. In some examples, the first clusters may be associated with a first level of granularity. Additionally, or alternatively, the process 1500 may include generating second clusters of the one or more clusters of the second intellectual-property assets. In some examples, the second clusters may be associated with the first level of granularity. Additionally, or alternatively, the process 1500 may include determining a first score associated with the first clusters. In some examples, the first score may be based at least in part on the first keywords associated with the individual ones of the first clusters. Additionally, or alternatively, the process 1500 may include determining a second score associated with the second clusters. In some examples, the second score may be based at least in part on second keywords associated with individual ones of the second clusters. Additionally, or alternatively, the process 1500 may include selecting the first clusters for the first result set that is associated with the first level of granularity. In some examples, selecting the first clusters may be based at least in part on the first score being more favorable than the second score.

Additionally, or alternatively, the input may be a first input. Additionally, or alternatively, the process 1500 may include causing the GUI to display one or more controls for receiving a second input from the computing device. Additionally, or alternatively, the process 1500 may include receiving, via the one or more controls, the second input. Additionally, or alternatively, the process 1500 may include causing the GUI to display a second result set of the one or more result sets. In some examples, the second result set being different from the first result set.

Additionally, or alternatively, the process 1500 may include determining that a first intellectual-property asset of the second intellectual-property assets is not associated with the one or more clusters of the second-intellectual-property assets. Additionally, or alternatively, the process 1500 may include generating, for individual ones of the one or more clusters, a probability that the first intellectual-property asset is to be associated with a respective cluster. Additionally, or alternatively, the process 1500 may include identifying a first probability associated with a first cluster of the one or more clusters as a most favorable probability of the individual ones of the one or more clusters. In some examples, the most favorable probability may be the highest probability and/or a probability that satisfies a threshold probability. Additionally, or alternatively, the process 1500 may include, assigning the first intellectual-property asset to the first cluster. In some examples, assigning the first intellectual-property asset to the first cluster may be based at least in part on the first probability being the most favorable probability of the individual ones of the one or more clusters.

Additionally, or alternatively, the input may be first input and the input data may be first input data. Additionally, or alternatively, the process 1500 may include determining that a first intellectual-property asset of the second intellectual-property assets is not associated with the one or more clusters of the second intellectual-property assets. Additionally, or alternatively, the process 1500 may include receiving, via the GUI, second input data representing second input. In some examples, the second input data may indicate an assignment of the first intellectual-property asset to a first cluster of the one or more clusters. Additionally, or alternatively, the process 1500 may include assigning the first intellectual-property asset to the first cluster based at least in part on the second input data.

Figure 16:
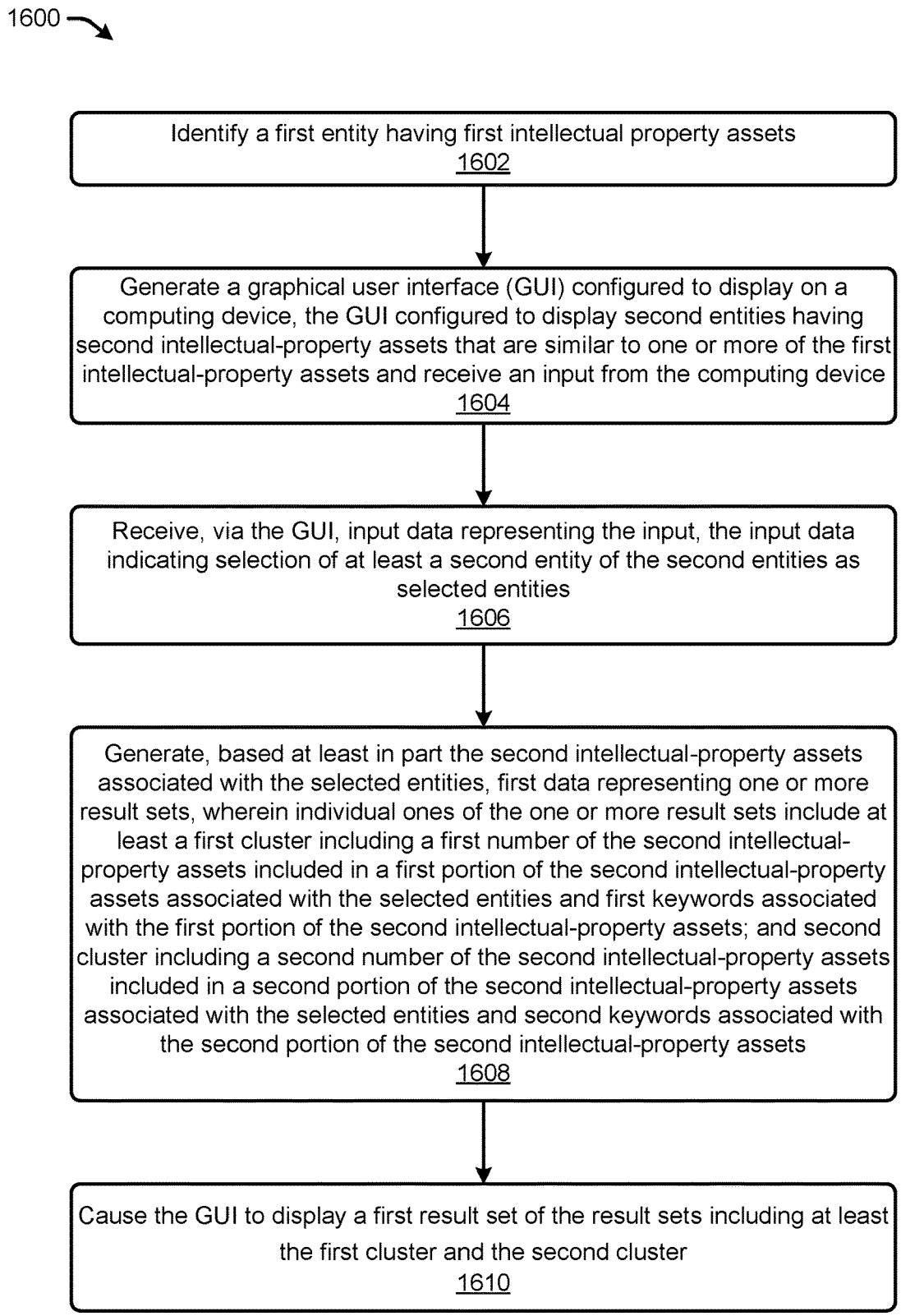
FIG. 16 illustrates an example flow diagram of an example process for generating data representing result sets that include at least two clusters of intellectual-property assets that are determined to be similar to a target entity and presenting the clusters on a graphical user interface.

FIG. 16 illustrates an example flow diagram of an example process 1600 for generating data representing result sets that include at least two clusters of intellectual-property assets that are determined to be similar to a target entity and presenting the clusters on a graphical user interface. The order in which the operations or steps are described is not intended to be construed as a limitation, and any number of the described operations may be combined in any order and/or in parallel to implement process 1600. The operations described with respect to the process 1600 are described as being performed by an electronic device and/or a remote computing resource associated with the IP landscaping platform. However, it should be understood that some or all of these operations may be performed by some or all of components, devices, and/or systems described herein.

At block 1602, the process 1600 may include identifying a first entity having first intellectual property assets.

At block 1604, the process 1600 may include generating a graphical user interface (GUI) configured to display on a computing device. In some examples, the GUI may be configured to display second entities having second intellectual-property assets that are similar to one or more of the first intellectual-property assets. Additionally, or alternatively, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1606, the process 1600 may include receiving, via the GUI, input data representing the input, the input data indicating selection of at least a second entity of the second entities as selected entities.

At block 1608, the process 1600 may include generating first data representing one or more result sets. In some examples, the one or more result sets may be based at least in part the second intellectual-property assets associated with the selected entities. Additionally, or alternatively, the individual ones of the one or more result sets may include a first cluster. In some examples, the first cluster may include a first number of the second intellectual-property assets included in a first portion of the second intellectual-property assets associated with the selected entities. Additionally, or alternatively, the first cluster may include first keywords associated with the first portion of the second intellectual-property assets. Additionally, or alternatively, the individual ones of the one or more result sets may include a second cluster. In some examples, the second cluster may include a second number of the second intellectual-property assets included in a second portion of the second intellectual-property assets associated with the selected entities. Additionally, or alternatively, the second cluster may include second keywords associated with the second portion of the second intellectual-property assets.

At block 1610, the process 1600 may include causing the GUI to display a first result set of the result sets. In some examples, the first result set may include the first cluster. Additionally, or alternatively, the first result set may include the second cluster. Additionally, or alternatively, the GUI may display additional elements for interacting with the first result set and/or the result sets.

Figure 17:
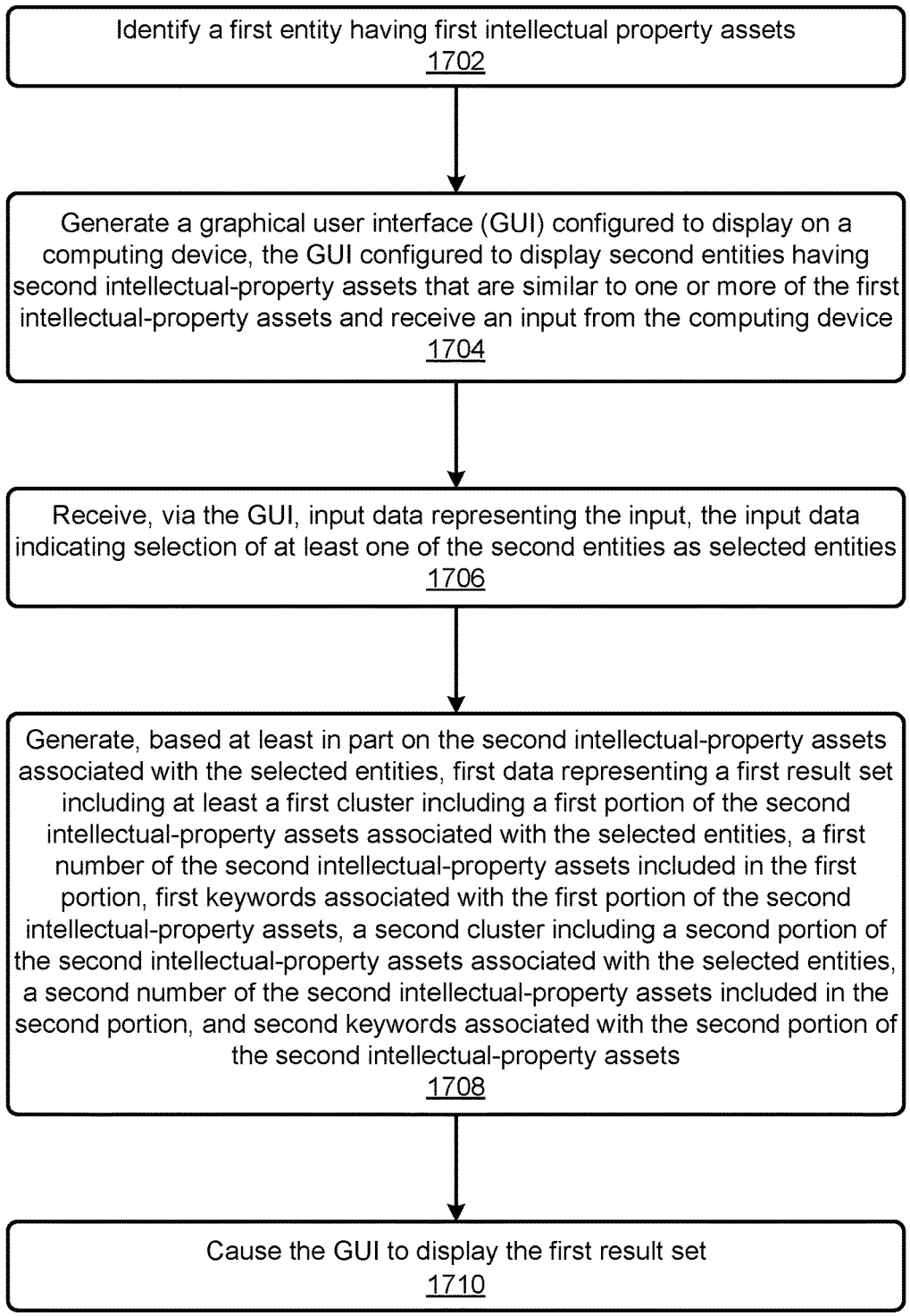
FIG. 17 illustrates an example flow diagram of an example process for generating data representing a result set including a first and second cluster and information associated with the clusters and presenting the clusters on a graphical user interface.

FIG. 17 illustrates an example flow diagram of an example process 1700 for generating data representing a result set including a first and second cluster and information associated with the clusters and presenting the clusters on a graphical user interface. The order in which the operations or steps are described is not intended to be construed as a limitation, and any number of the described operations may be combined in any order and/or in parallel to implement process 1700. The operations described with respect to the process 1700 are described as being performed by an electronic device and/or a remote computing resource associated with the IP landscaping platform. However, it should be understood that some or all of these operations may be performed by some or all of components, devices, and/or systems described herein.

At block 1702, the process 1700 may include identifying a first entity having first intellectual property assets.

At block 1704, the process 1700 may include generating a graphical user interface (GUI) configured to display on a computing device. In some examples, the GUI may be configured to display second entities having second intellectual-property assets that are similar to one or more of the first intellectual-property assets. Additionally, or alternatively, the GUI may be configured to receive an input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1706, the process 1700 may include receiving, via the GUI, input data representing the input, the input data indicating selection of at least one of the second entities as selected entities.

At block 1708, the process 1700 may include generating first data representing a first result set. In some examples, the data representing the first result set may be based at least in part on the second intellectual-property assets associated with the selected entities. In some examples, the first result set may include a first cluster including a first portion of the second intellectual-property assets associated with the selected entities. Additionally, or alternatively, the first result set may include a first number of the second intellectual-property assets included in the first portion. Additionally, or alternatively, the first result set may include first keywords associated with the first portion of the second intellectual-property assets. Additionally, or alternatively, the first result set may include a second cluster including a second portion of the second intellectual-property assets associated with the selected entities. Additionally, or alternatively, the first result set may include a second number of the second intellectual-property assets included in the second portion. Additionally, or alternatively, the first result set may include second keywords associated with the second portion of the second intellectual-property assets.

At block 1710, the process 1700 may include causing the GUI to display the first result set. Additionally, or alternatively, the GUI may display additional elements for interacting with the first result set.

Figure 18:
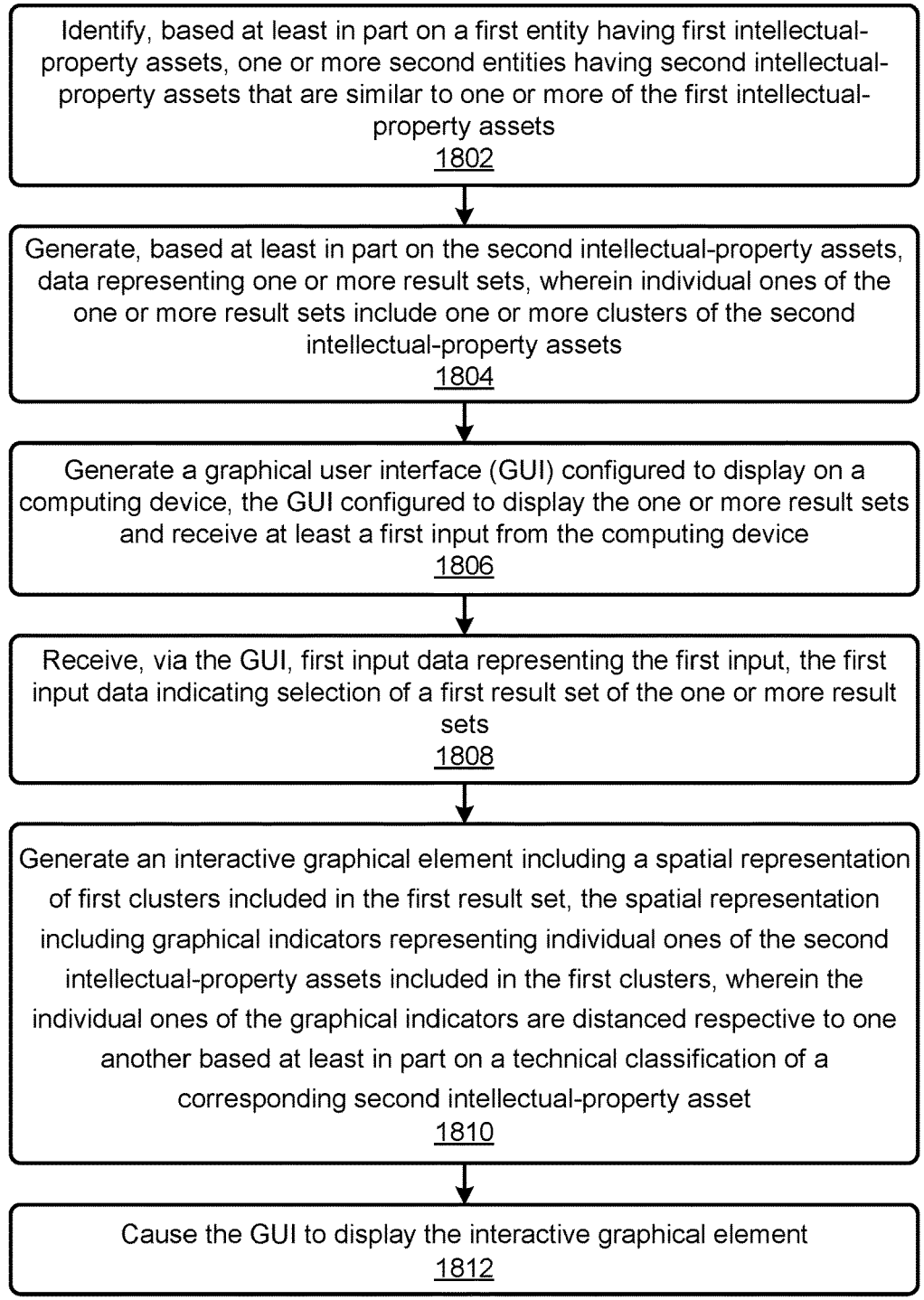
FIG. 18 illustrates an example flow diagram of an example process for generating data representing result sets that include clusters of intellectual-property assets and generating an interactive graphical element that includes a spatial representation of the clusters included in the result sets.

FIG. 18 illustrates an example flow diagram of an example process 1800 for generating data representing result sets that include clusters of intellectual-property assets and generating an interactive graphical element that includes a spatial representation of the clusters included in the result sets. The order in which the operations or steps are described is not intended to be construed as a limitation, and any number of the described operations may be combined in any order and/or in parallel to implement process 1800. The operations described with respect to the process 1800 are described as being performed by an electronic device and/or a remote computing resource associated with the IP landscaping platform. However, it should be understood that some or all of these operations may be performed by some or all of components, devices, and/or systems described herein.

At block 1802, the process 1800 may include identifying, based at least in part on a first entity having first intellectual-property assets, one or more second entities having second intellectual-property assets that are similar to one or more of the first intellectual-property assets.

At block 1804, the process 1800 may include generating data representing one or more result sets. In some examples, the data representing the one or more result sets may be based at least in part on the second intellectual-property assets. In some examples, individual ones of the one or more result sets may include one or more clusters of the second intellectual-property assets.

At block 1806, the process 1800 may include generating a graphical user interface (GUI) configured to display on a computing device. In some examples, the GUI may be configured to display the one or more result sets. Additionally, or alternatively, the GUI may be configured to receive at least a first input from the computing device. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

At block 1808, the process 1800 may include receiving, via the GUI, first input data representing the first input. In some examples, the first input data may indicate selection of a first result set of the one or more result sets.

At block 1810, the process 1800 may include generating an interactive graphical element including a spatial representation of first clusters included in the first result set. In some examples, the spatial representation may include graphical indicators representing individual ones of the second intellectual-property assets included in the first clusters. In some examples, the individual ones of the graphical indicators may be distanced respective to one another. In some examples, the graphical indicators may be distanced respective to one another based at least in part on a technical classification of a corresponding second intellectual-property asset.

At block 1812, the process 1800 may include causing the GUI to display the interactive graphical element. Additionally, or alternatively, the GUI may include one or more additional elements for interacting with the interactive graphical element.

Additionally, or alternatively, the first clusters may include a first cluster and/or a second cluster. Additionally, or alternatively, the first clusters may include first keywords associated with the first cluster. In some examples, the first keywords may be based at least in part on first words included in a text portion of the second intellectual-property assets included in the first cluster. Additionally, or alternatively, the first clusters may include second keywords associated with the second cluster. In some examples, the second keywords may be based at least in part on second words included in the text portion of the second intellectual-property assets included in the first cluster. Additionally, or alternatively, the graphical indicators may include first graphical indicators corresponding to the second intellectual-property assets included in the first cluster. Additionally, or alternatively, the graphical indicators may include second graphical indicators corresponding to the second intellectual-property assets included in the second cluster.

Additionally, or alternatively, the first graphical indicators comprise a first color. Additionally, or alternatively, the second graphical indicators comprise a second color that is different from the first color. Additionally, or alternatively, the interactive graphical element may include the first keywords being displayed at a first central location of the first graphical indicators associated with the first cluster. In some examples, the first keywords are represented in the first color. Additionally, or alternatively, the interactive graphical element may include the second keywords being displayed at a second central location of the second graphical indicators associated with the second cluster. In some examples, wherein the second keywords are represented in the second color.

Additionally, or alternatively, the process 1800 may include receiving, via the GUI, second input data representing a second user input. In some examples, the second input data may indicate a selection of a filter for the spatial representation. Additionally, or alternatively, the process 1800 may include determining that the selection of the filter is associated with at least one of the first cluster of the second cluster. Additionally, or alternatively, the process 1800 may include causing the spatial representation to hide at least one of the first graphical indicators associated first cluster or the second graphical indicators associated with the second cluster on the interactive graphical element based at least in part on the second user input.

Additionally, or alternatively, the individual ones of the graphical indicators may comprise a first color corresponding to a cluster of the first clusters in which a respective second intellectual-property asset is included and/or a second color corresponding to an entity of the respective second intellectual-property asset. Additionally, or alternatively, the process 1800 may include receiving, via the GUI, second input data representing a second user input. In some examples, the second input data may indicate a selection of at least one of a cluster view of the spatial representation or an entity view of the spatial representation. Additionally, or alternatively, the process 1800 may include causing the individual ones of the graphical indicators included in the spatial representation to be represented in one of the first color or the second color based at least in part on the second user input.

Additionally, or alternatively, the process 1800 may include receiving, via the GUI, second input data representing a second input. In some examples, the second input data may indicate a selection of a first graphical indicator of the graphical indicators. Additionally, or alternatively, the process 1800 may include identifying information associated with a first intellectual-property asset of the second intellectual-property assets that corresponds to the first graphical indicator. In some examples, the information may include a score associated with the first intellectual-property asset. In some examples, the score may be based at least in part on first words included in a first text portion of the first intellectual-property asset with respect to second words included in second portions of the second intellectual-property assets. Additionally, or alternatively, the information may include a title of the first intellectual-property asset, an identification number associated with the first intellectual-property asset, keywords associated with a cluster of the first clusters that the first intellectual-property asset is included in, a technical classification code associated with the first intellectual-property asset, an abstract associated with the first intellectual-property asset, a publication status associated with the first intellectual-property asset, a priority date associated with the first intellectual-property asset, and/or an entity associated with the first intellectual-property asset. Additionally, or alternatively, the process 1800 may include causing the GUI to display the information associated with the first intellectual property asset based at least in part on receiving the second input.

Additionally, or alternatively, the process 1800 may include determining, for the individual ones of the second intellectual-property assets, a relevance score representing a relevance of the individual ones of the second intellectual-property assets with respect to individual ones of the first intellectual-property assets. In some examples, the relevance score of the second intellectual-property assets may be determined with respect to one another. Additionally, or alternatively, a size in which the individual ones of the graphical indicators are represented on the interactive graphical element may be based at least in part on the relevance score of a corresponding second intellectual-property asset.

Additionally, or alternatively, the spatial representation may be a first spatial representation. Additionally, or alternatively, the process 1800 may include receiving, via the GUI, second input data representing a second input. In some examples, the second input data may indicate a zoom gesture. Additionally, or alternatively, the process 1800 may include determining a zoom percentage associated with the zoom gesture. Additionally, or alternatively, the process 1800 may include generating the interactive graphical element including a second spatial representation of the first clusters. In some examples, the second spatial representation of the first clusters may be based at least in part on the zoom percentage. Additionally, or alternatively, the second spatial representation may include at least a portion of the graphical indicators included in the first spatial representation. Additionally, or alternatively, the process 1800 may include causing the GUI to display the second spatial representation of the first clusters on the interactive graphical element based at least in part on receiving the second input data.

Additionally, or alternatively, the process 1800 may include causing the GUI to display a slider control configured to receive at least a second input from the computing device. In some examples, the slider control may include at least a lower bound control associated with a first priority date and/or an upper bound control associated with a second priority date. Additionally, or alternatively, the process 1800 may include receiving, via the slider control displayed on the GUI, second input data representing a second user input. In some examples, the second input data may indicate selection of at least one of the lower bound control or the upper bound control. Additionally, or alternatively, the process 1800 may include identifying, for the individual ones of the second intellectual-property assets included in the first clusters, a third priority date. Additionally, or alternatively, the process 1800 may include causing the interactive graphical element to hide the graphical indicators associated with the second intellectual-property assets having the third priority date that is at least one of prior to the first priority date or subsequent to the second priority date.

Additionally, or alternatively, the process 1800 may include identifying a first range of priority dates being defined by a lower bound priority date and/or an upper bound priority date. In some examples, the first range may include a first number of priority dates. Additionally, or alternatively, the process 1800 may include determining a second range of priority dates being defined by the first priority date and/or the second priority date. In some examples, the second range may include a second number of priority dates. In some examples, the second number of priority dates may be less than or equal to the first number of priority dates. Additionally, or alternatively, the process 1800 may include redefining the second range of priority dates to an animation starting point. In some examples, redefining the second range may include setting the first priority date equal to the lower bound priority date and/or setting the second priority date equal to a fourth priority date that is calculated by adding the second number of priority dates to the first priority date. Additionally, or alternatively, the process 1800 may include generating an animation sequence. In some examples, generating the animation sequence may be based at least in part on the first range of priority dates and the second range of priority dates. Additionally, or alternatively, the animation sequence may include populating the interactive graphical element with the individual ones of the graphical indicators being associated with second intellectual-property assets having the third priority date that is included in the second range of priority dates, causing the interactive graphical element to hide the individual ones of the graphical indicators being associated with second intellectual-property assets having the third priority date that is included in the first range of priority dates and not included in the second range of priority dates, incrementing the first priority date and the second priority date, and/or based at least in part on determining that the second priority date is equal to the upper bound priority date, redefining the second range of priority dates to the animation starting point. Additionally, or alternatively, the process 1800 may include causing the GUI to display an animation control configured to receive a third input from the computing device. Additionally, or alternatively, the process 1800 may include receiving, via the animation control displayed on the GUI, third input data representing a third user input. In some examples, the third input data may indicate an action of the animation sequence associated with the animation control. Additionally, or alternatively, the process 1800 may include causing the interactive graphical element to begin display of the animation sequence. In some examples, the animation sequence may be configured to repeat until receiving, via the animation control displayed on the GUI, fourth input data representing a fourth user input. In some examples, the fourth input data may indicate the action of the animation sequence associated with the animation control.

Figure 19:
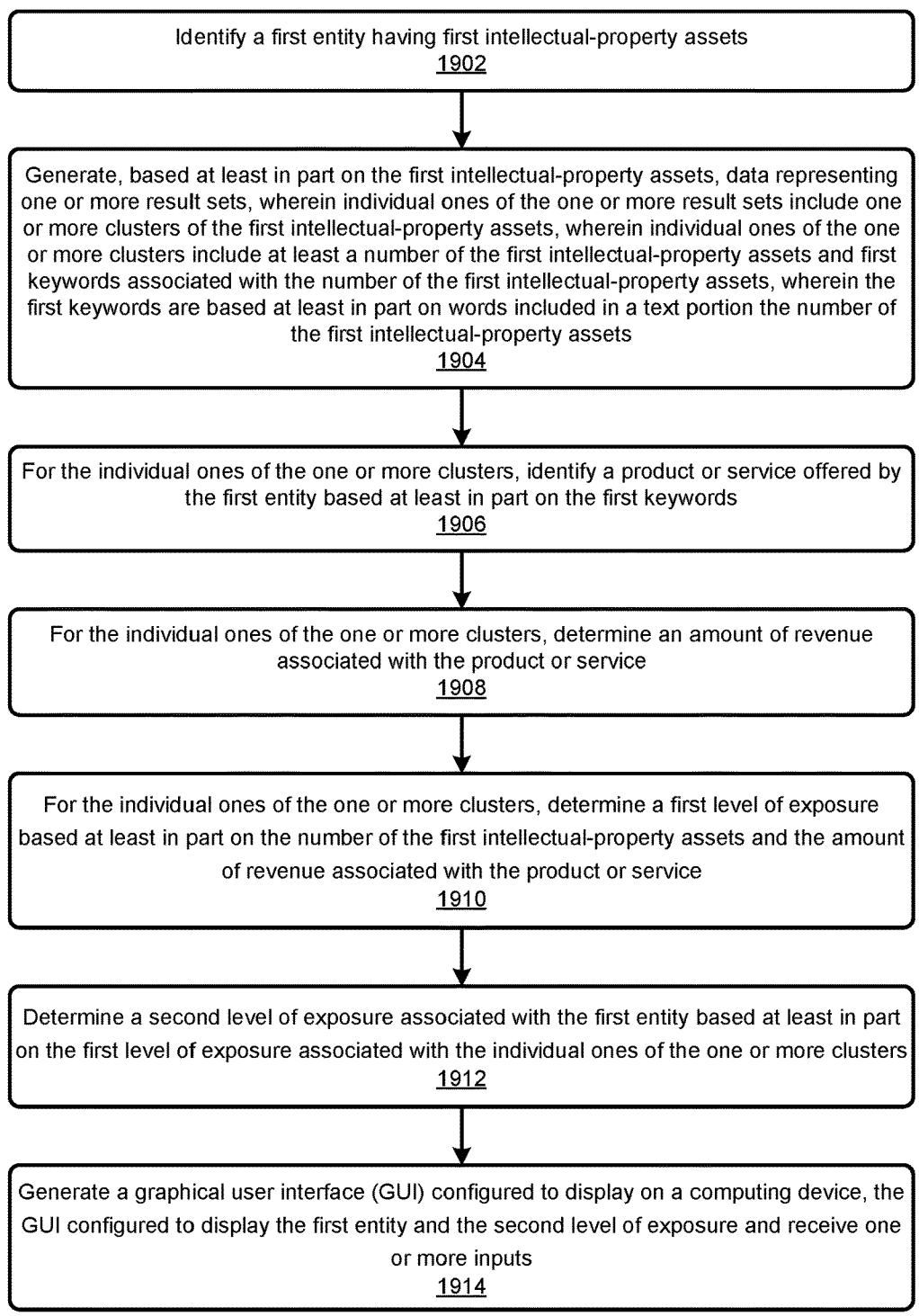
FIG. 19 illustrates an example flow diagram of an example process for generating data representing result sets that include clusters of intellectual-property assets that map to products or services offered by a targeted entity to assess and determine an overall level of exposure associated with the targeted entity.

FIG. 19 illustrates an example flow diagram of an example process 1900 for generating data representing result sets that include clusters of intellectual-property assets that map to products or services offered by a targeted entity to assess and determine an overall level of exposure associated with the targeted entity. The order in which the operations or steps are described is not intended to be construed as a limitation, and any number of the described operations may be combined in any order and/or in parallel to implement process 1900. The operations described with respect to the process 1900 are described as being performed by an electronic device and/or a remote computing resource associated with the IP landscaping platform. However, it should be understood that some or all of these operations may be performed by some or all of components, devices, and/or systems described herein.

At block 1902, the process 1900 may include identifying a first entity having first intellectual-property assets.

At block 1904, the process 1900 may include generating data representing one or more result sets. In some examples, the data representing the one or more result sets may be based at least in part on the first intellectual-property assets. In some examples, individual ones of the one or more result sets include one or more clusters of the first intellectual-property assets. In some examples, individual ones of the one or more clusters may include a number of the first intellectual-property assets. Additionally, or alternatively, the individual ones of the one or more clusters may include first keywords. In some examples, the first keywords may be associated with the number of the first intellectual-property assets. In some examples, the first keywords may be based at least in part on words included in a text portion the number of the first intellectual-property assets.

At block 1906, the process 1900 may include identifying, for the individual ones of the one or more clusters, a product or service offered by the first entity. In some examples, identifying the product or service offered by the first entity may be based at least in part on the first keywords.

At block 1908, the process 1900 may include determining, for the individual ones of the one or more clusters, an amount of revenue associated with the product or service.

At block 1910, the process 1900 may include determining, for the individual ones of the one or more clusters, a first level of exposure. In some examples, the first level of exposure may be based at least in part on the number of the first intellectual-property assets. Additionally, or alternatively, the first level of exposure may be based at least in part on the amount of revenue associated with the product or service.

At block 1912, the process 1900 may include determining a second level of exposure associated with the first entity. In some examples, the second level of exposure may be based at least in part on the first level of exposure associated with the individual ones of the one or more clusters.

At block 1914, the process 1900 may include generating a graphical user interface (GUI) configured to display on a computing device. In some examples, the GUI may be configured to display the first entity. Additionally, or alternatively, the GUI may be configured to display the second level of exposure. Additionally, or alternatively, the GUI may be configured to receive one or more inputs. The computing device may be any of the electronic devices 102 and/or remote computing resources 104 described with respect to FIG. 1. Additionally, or alternatively, the GUI may include any of the example user interfaces 300-1100 described with respect to FIGS. 3-11.

Additionally, or alternatively, the process 1900 may include receiving, via the GUI, first input data representing a first input. In some examples, the first input data may indicate selection of a first result set of the one or more result sets. Additionally, or alternatively, the process 1900 may include generating an interactive graphical element. In some examples, the interactive graphical element may include a first spatial representation of first clusters included in the first result set. In some examples, the first spatial representation may include first graphical indicators representing individual ones of the first intellectual-property assets included in the first clusters. In some examples, the individual ones of the first graphical indicators may be distanced respective to one another. In some examples, the individual ones of the first graphical indicators may be distanced respective to one another based at least in part on a technical classification.

Additionally, or alternatively, the process 1900 may include receiving, via the GUI, second input data representing a second input. In some examples, the second input data may indicate a selection of a first graphical indicator of the first graphical indicators. Additionally, or alternatively, the process 1900 may include identifying information associated with a first intellectual-property asset of the first intellectual-property assets. In some examples, the first intellectual-property asset may correspond to the first graphical indicator. In some examples, the information may include the first level of exposure of the first cluster associated with the first graphical indicator. Additionally, or alternatively, the information may include the technical classification of the first intellectual-property asset. Additionally, or alternatively, the information may include a first product or service offered by the first entity and associated with the first cluster. Additionally, or alternatively, the information may include the amount of revenue associated with the product or service. Additionally, or alternatively, the process 1900 may include causing the GUI to display the information associated with the first intellectual-property asset. In some examples, the GUI may be caused to display the information associated with the first intellectual-property asset based at least in part on receiving the second input.

Additionally, or alternatively, the process 1900 may include identifying portions of the first spatial representation of the first clusters having the first level of exposure exceeding a threshold level of exposure. Additionally, or alternatively, the process 1900 may include causing the first spatial representation to include an indication of the portions. In some examples, the indication of the portions may be represented by a shaded area included on the first spatial representation.

Additionally, or alternatively, the process 1900 may include generating a second graphical indicator. In some examples, the second graphical indicator may represent a gap in coverage between individual ones of the first clusters. Additionally, or alternatively, the process 1900 may include identifying one or more first graphical indicators being within a threshold proximity of the second graphical indicator. Additionally, or alternatively, the process 1900 may include generating second keywords associated with the second graphical indicator. In some examples, the second keywords associated with the second graphical indicator may be based at least in part on the words included in the text portion of the first intellectual-property assets corresponding to the first graphical indicators being within the threshold proximity of the second graphical indicator. Additionally, or alternatively, the process 1900 may include causing the interactive graphical element to display the second graphical indicator and the second keywords.

Additionally, or alternatively, the process 1900 may include associating the first entity with a first insurance grouping of insurance groupings. In some examples, associating the first entity with the first insurance grouping of insurance groupings may be based at least in part on the second level of exposure. Additionally, or alternatively, individual ones of the insurance groupings may include a coverage amount. Additionally, or alternatively, the process 1900 may include displaying, on the GUI, an indication of the first insurance grouping. Additionally, or alternatively, the GUI may include a first coverage amount associated with the first insurance grouping.

Additionally, or alternatively, the process 1900 may include determining, for a first result set of the one or more result sets, a first level of relevance. In some examples, the first level of relevance may be based at least in part on a first number of the one or more clusters included in the first result set and/or the product or service associated with the individual ones of the one or more clusters included in the first result set Additionally, or alternatively, the process 1900 may include determining, for a second result set of the one or more result sets, a second level of relevance. In some examples, the second level of relevance may be based at least in part on a second number of the one or more clusters included in the second result set and/or the product or service associated with the individual ones of the one or more clusters included in the second result set Additionally, or alternatively, the process 1900 may include determining that the first level of relevance is more favorable than the second level of relevance. Additionally, or alternatively, the process 1900 may include adjusting the second level of exposure. In some examples, adjusting the second level of exposure may be based at least in part on determining that the first level of relevance is more favorable than the second level of relevance.

Additionally, or alternatively, the process 1900 may include identifying historical data associated with the first entity. In some examples, the historical data may be based at least in part on a priority date associated with individual ones of the first intellectual-property assets and/or an expiration date associated with the individual ones of the first intellectual-property assets. In some examples, the historical data may indicate one or more trends associated with the first entity. Additionally, or alternatively, the second level of exposure may be based at least in part on the historical data.

Additionally, or alternatively, the process 1900 may include identifying a first trend of the one or more trends. In some examples, the first trend may indicate a first change in the amount of revenue associated with the product or service over a period of time. Additionally, or alternatively, the process 1900 may include identifying a second trend of the one or more trends. In some examples, the second trend may indicate a second change in the number of first intellectual-property assets that are associated with the product or service over the period of time. Additionally, or alternatively, the process 1900 may include determining a change ratio associated with the first entity. In some examples, the change ratio may be based at least in part on the first trend and/or the second trend. In some examples, the change ratio may indicate the first change in the amount of revenue with respect to the change in the number of first intellectual-property assets over the period of time. Additionally, or alternatively, the second level of exposure may be based at least in part on the change ratio.

Additionally, or alternatively, the historical data may indicate a litigation history associated with the first intellectual-property assets. Additionally, or alternatively, the first level of exposure of the individual ones of the one or more clusters may be based at least in part on the litigation history of the number of first intellectual-property assets.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A system comprising:
   one or more processors; and
   one or more non-transitory computer-readable media comprising instructions that, when executed by the one or more processors, cause the one or more processors to perform operations comprising:
   generating a graphical user interface (GUI) configured to display on a computing device, the GUI configured to receive an input from the computing device;
   receiving, via the GUI, input data representing the input, the input data indicating an identification number of a first intellectual-property asset;
   identifying one or more second intellectual-property assets that are similar to the first intellectual-property asset, the one or more second intellectual-property assets being associated with respective first entities;
   identifying a first entity from the respective first entities as a target entity based at least in part on a number of the one or more second intellectual-property assets that are associated with the first entity satisfying a threshold number;
   generating a first vector representation of the target entity based at least in part on the one or more second intellectual-property assets that are associated with the target entity;

identifying one or more second entities having one or more third intellectual-property assets that are similar to the one or more second intellectual-property assets;

generating, for individual ones of the one or more second entities, a second vector representation based at least in part on the one or more third intellectual-property assets;

determining a ranking of the one or more second entities based at least in part on comparing the first vector representation to the second vector representation of the individual ones of the one or more second entities; and causing the GUI to display the one or more second entities according to the ranking.

2. The system of claim 1, wherein the input data further indicates an identification of third entity, and the operations further comprising:

identifying one or more fourth intellectual-property assets associated with the third entity; and wherein identifying the one or more second entities comprises identifying the one or more second entities having the one or more third intellectual-property assets that are similar to the one or more fourth intellectual-property assets.

3. The system of claim 1, wherein the input data further indicates an identification of a target product, and the operations further comprising:

identifying a technological categorization of the target product; and wherein identifying the one or more second entities comprises identifying the one or more second entities having one or more third intellectual-property assets that are associated with the technological categorization of the target product.

4. The system of claim 3, the operations further comprising:

identifying a description associated with the target product;

determining that text included in the description is similar to text included in at least a portion of the one or more third intellectual-property assets associated with the one or more second entities; and identifying the one or more second entities based at least in part on determining that the text included in the description associated with the target product is similar to the text included in at least the portion of the one or more third intellectual-property assets.

5. The system of claim 1, the operations further comprising:

determining that the first entity is associated with a most favorable number of the one or more second intellectual-property assets; and identifying the first entity from the respective first entities as the target entity based at least in part on determining that the first entity is associated with the most favorable number of the one or more second intellectual-property assets.

6. The system of claim 1, wherein the input data is first input data, and the operations further comprising:

receiving, via the GUI, second input data indicating a selection of a second entity of the one or more second entities;

identifying one or more fourth intellectual-property assets associated with the second entity;

determining, for individual assets of the one or more fourth intellectual-property assets, if the individual asset is associated with a litigation dispute; and generating an exportable file including a list of the individual assets of the one or more fourth intellectual-property assets that are associated with the litigation dispute and information associated with the litigation dispute for the respective individual asset.

7. The system of claim 1, the operations further comprising:

identifying, based at least in part on the one or more second intellectual-property assets, a technological categorization associated with the target entity, wherein the technological categorization includes a technology or a product associated with at least one of the one or more second intellectual-property assets or the target entity; and identifying the one or more second entities having the one or more third intellectual-property assets that are similar to the one or more second intellectual-property assets based at least in part on the technological categorization associated with the target entity.

8. A method comprising:

generating a graphical user interface (GUI) configured to display on a computing device, the GUI configured to receive an input from the computing device;

receiving, via the GUI, input data representing the input, the input data indicating an identification of a target product;

identifying a technical feature associated with the target product;

identifying one or more first intellectual-property assets associated with product based at least in part on the technical feature, the one or more first intellectual-property assets being associated with respective first entities;

determining, from the respective first entities, that a first entity is associated with a most favorable number of the one or more first intellectual-property assets;

identifying the first entity as a target entity based at least in part on determining that the first entity is associated with the most favorable number of the one or more first intellectual-property assets;

generating a first vector representation of the target entity based at least in part on the one or more first intellectual-property assets that are associated with the target entity;

identifying one or more second entities having one or more second intellectual-property assets that are similar to the one or more first intellectual-property assets;

generating, for individual ones of the one or more second entities, a second vector representation based at least in part on the one or more second intellectual-property assets;

determining a ranking of the one or more second entities based at least in part on comparing the first vector representation to the second vector representation of the individual ones of the one or more second entities; and causing the GUI to display the one or more second entities according to the ranking.

9. The method of claim 8, wherein the input data further indicates an identification of a third entity, and the method further comprising:

identifying one or more third intellectual-property assets associated with the third entity; and wherein identifying the one or more second entities comprises identifying the one or more second entities having the one or more second intellectual-property assets that are similar to the one or more third intellectual-property assets.

10. The method of claim 8, wherein:

the input data further indicates an identification of a target intellectual-property asset; and identifying the one or more second entities comprises identifying the one or more second entities having one or more second intellectual-property assets that are similar to the target intellectual-property asset.

11. The method of claim 8, wherein the input data is first input data, and the method further comprising:

receiving, via the GUI, second input data indicating a selection of a second entity of the one or more second entities;

identifying one or more third intellectual-property assets associated with the second entity;

determining, for individual assets of the one or more third intellectual-property assets, if the individual asset is associated with a litigation dispute; and generating an exportable file including a list of the individual assets associated with the litigation dispute and information associated with the litigation dispute for the respective individual asset.

12. The method of claim 8, further comprising:

identifying a description associated with the target product;

determining that text included in the description is similar to text included in at least a portion of the one or more second intellectual-property assets associated with the one or more second entities; and identifying the one or more second entities based at least in part on determining that the text included in the description associated with the target product is similar to the text included in at least the portion of the one or more second intellectual property assets.

13. The method of claim 8, further comprising:

determining that the first entity is associated with a number of the one or more first intellectual-property assets that satisfies a threshold number; and identifying the first entity from the respective first entities as the target entity based at least in part on determining that the first entity is associated with the number of the one or more first intellectual-property assets that satisfy the threshold number.

* * * * *